United States Patent [19]

Hughes et al.

[11] Patent Number: 4,481,578

[45] Date of Patent: Nov. 6, 1984

[54] DIRECT MEMORY ACCESS DATA TRANSFER SYSTEM FOR USE WITH PLURAL PROCESSORS

[75] Inventors: Jodie K. Hughes; Sekine Hagiwara, both of San Jose, Calif.

[73] Assignee: Pitney Bowes Inc., Stamford, Conn.

[21] Appl. No.: 380,962

[22] Filed: May 21, 1982

[51] Int. Cl.³ .............................................. G06F 3/00
[52] U.S. Cl. .................................................. 364/200
[58] Field of Search ....................... 364/200 MS File

[56] References Cited

U.S. PATENT DOCUMENTS 4,099,236  7/1978  Goodman et al. .............. 364/200

Primary Examiner—Raulfe B. Zache
Attorney, Agent, or Firm—Robert H. Whisker; David E. Pitchenik; William D. Soltow, Jr.

[57] ABSTRACT

Apparatus for transferring data from the memory associated with one processor to the memory associated with another processor. A direct memory access (DMA) controller is connected to each processor and facilitates transfer of bulk data from one memory to the other without the intervention of either or both processors.

10 Claims, 71 Drawing Figures

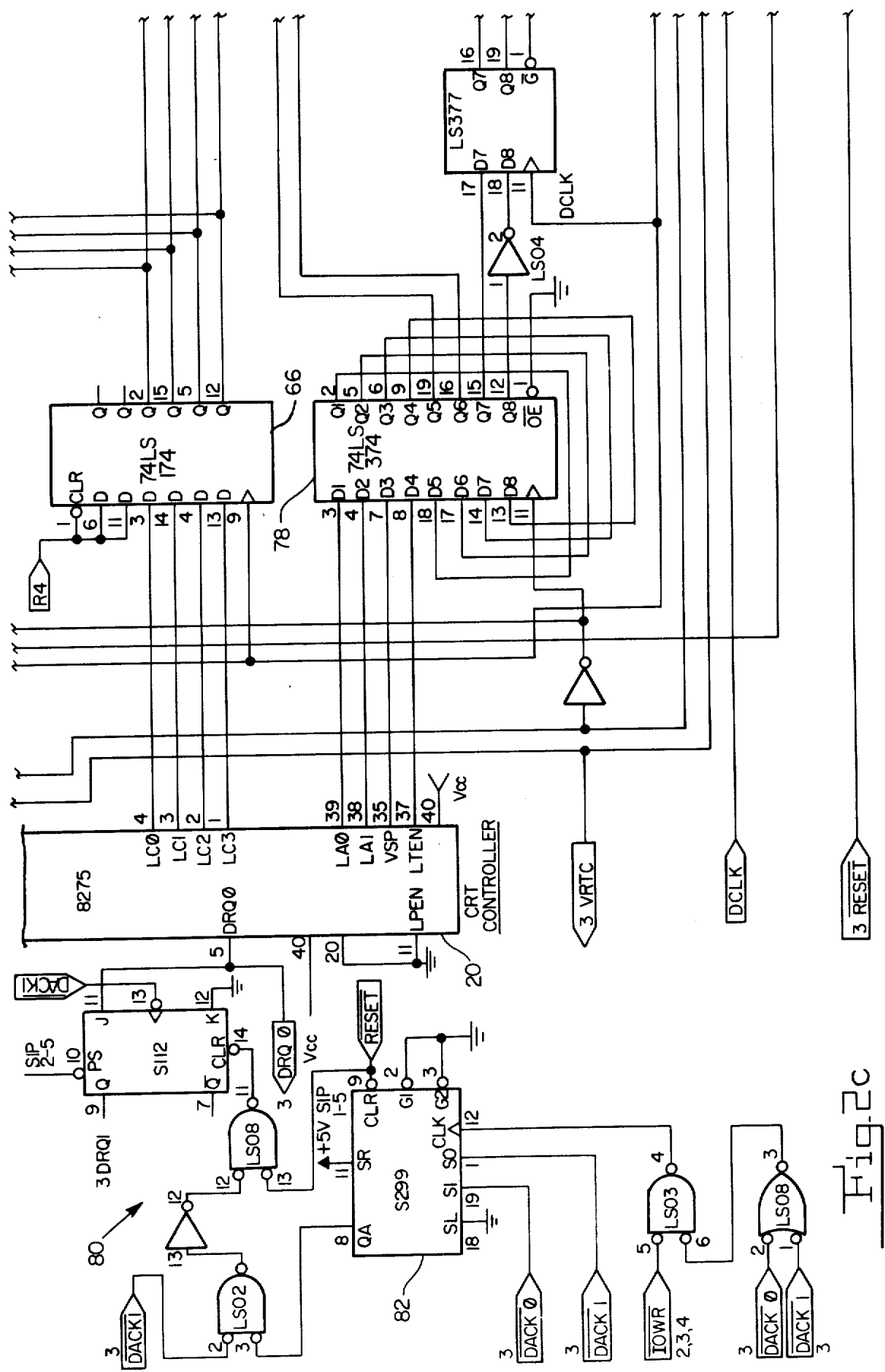

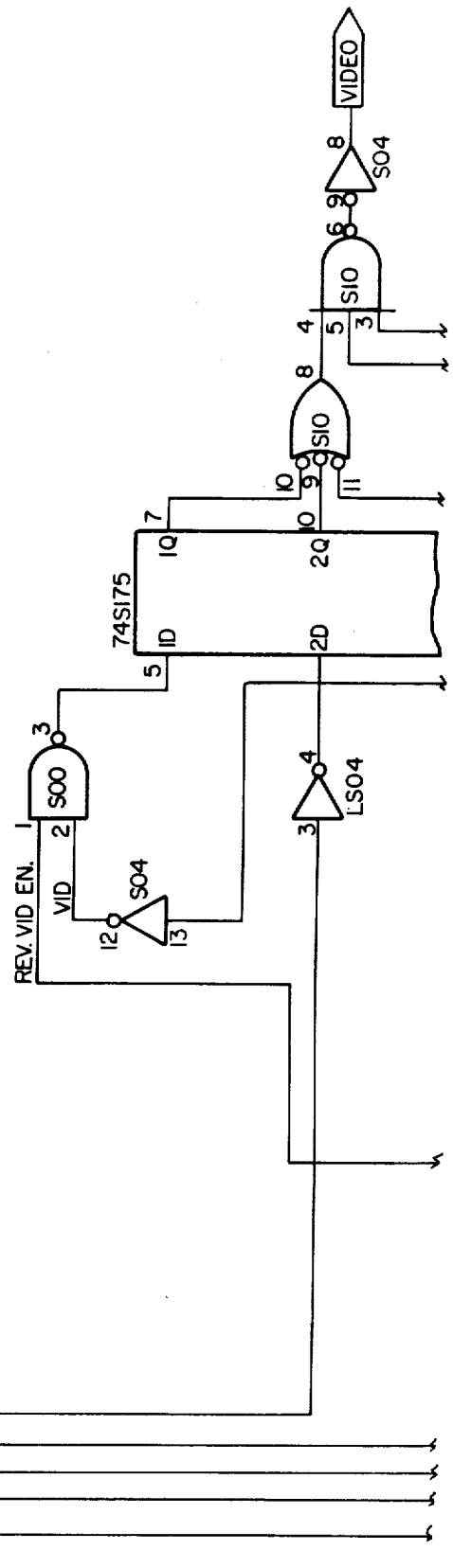

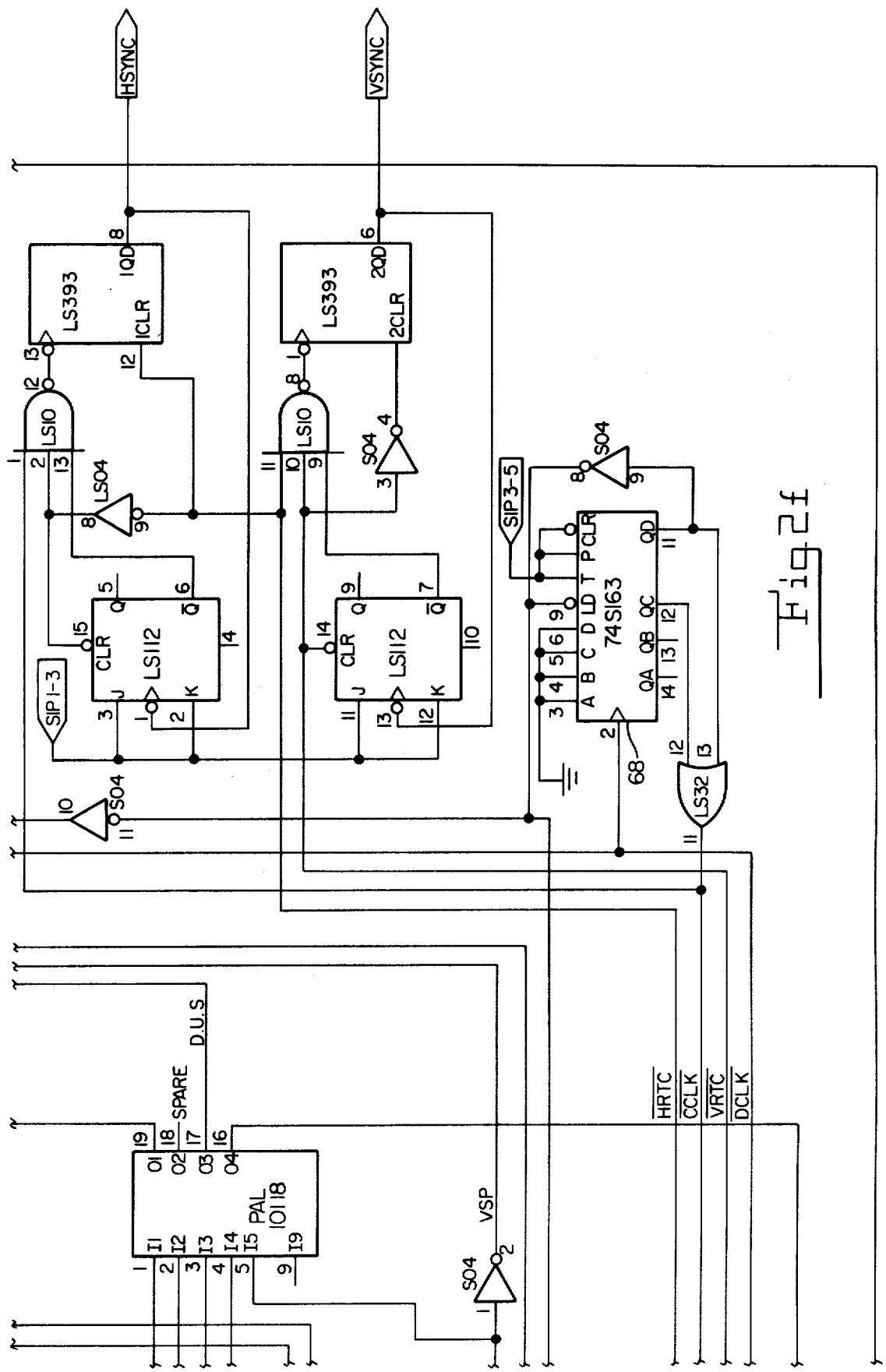

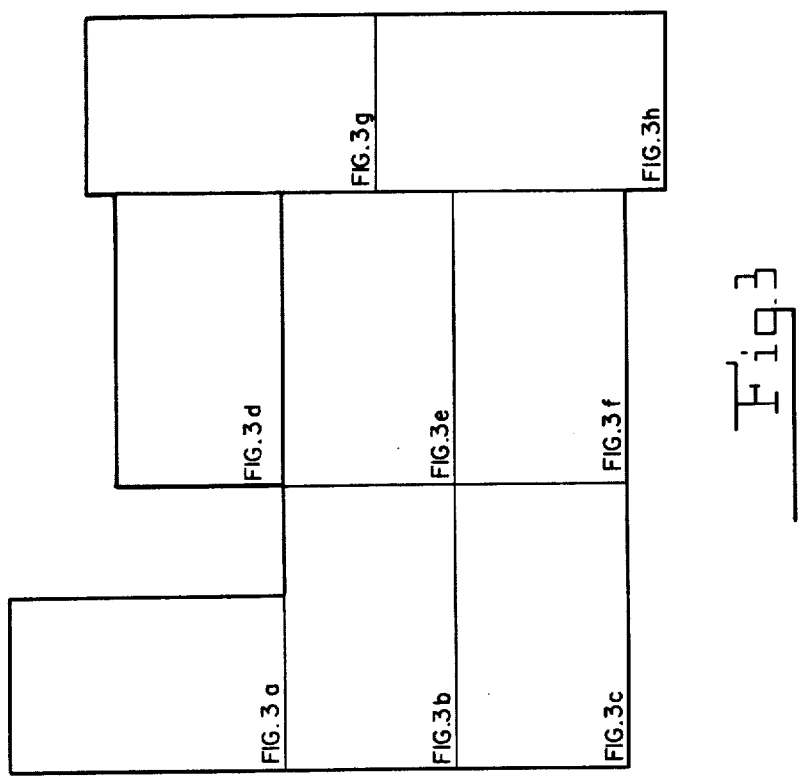

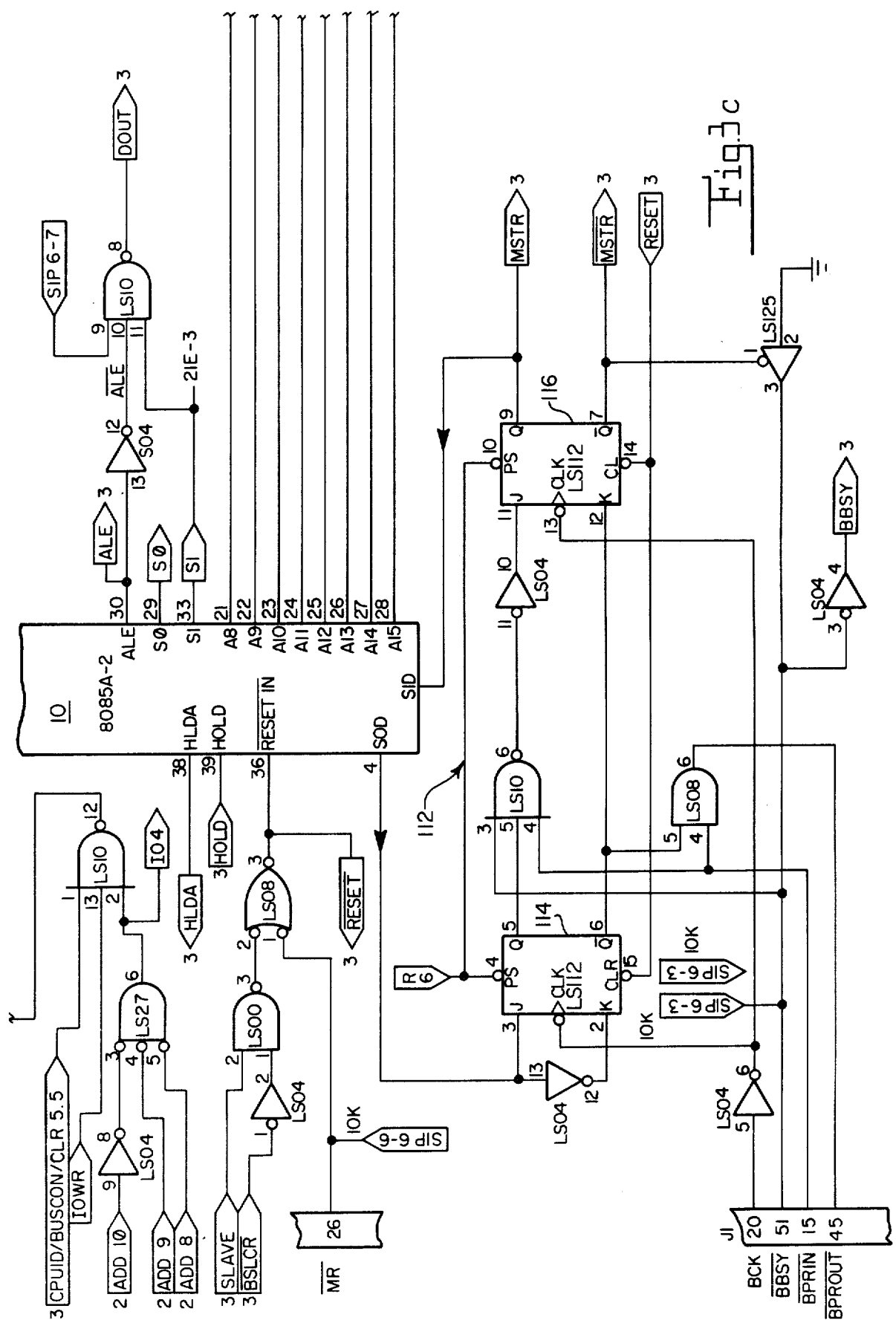

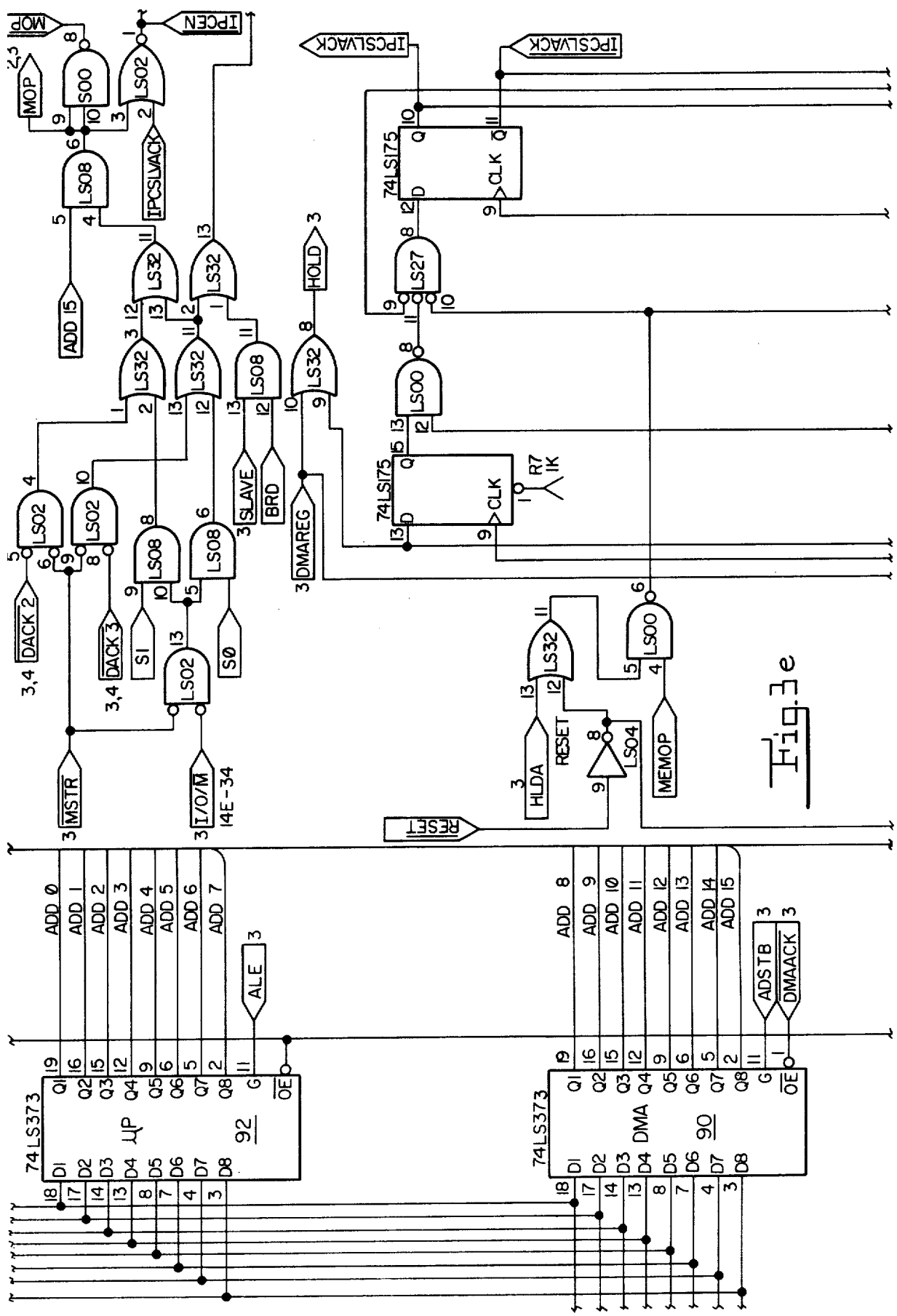

SLAVE ADDRESS COMPARATOR

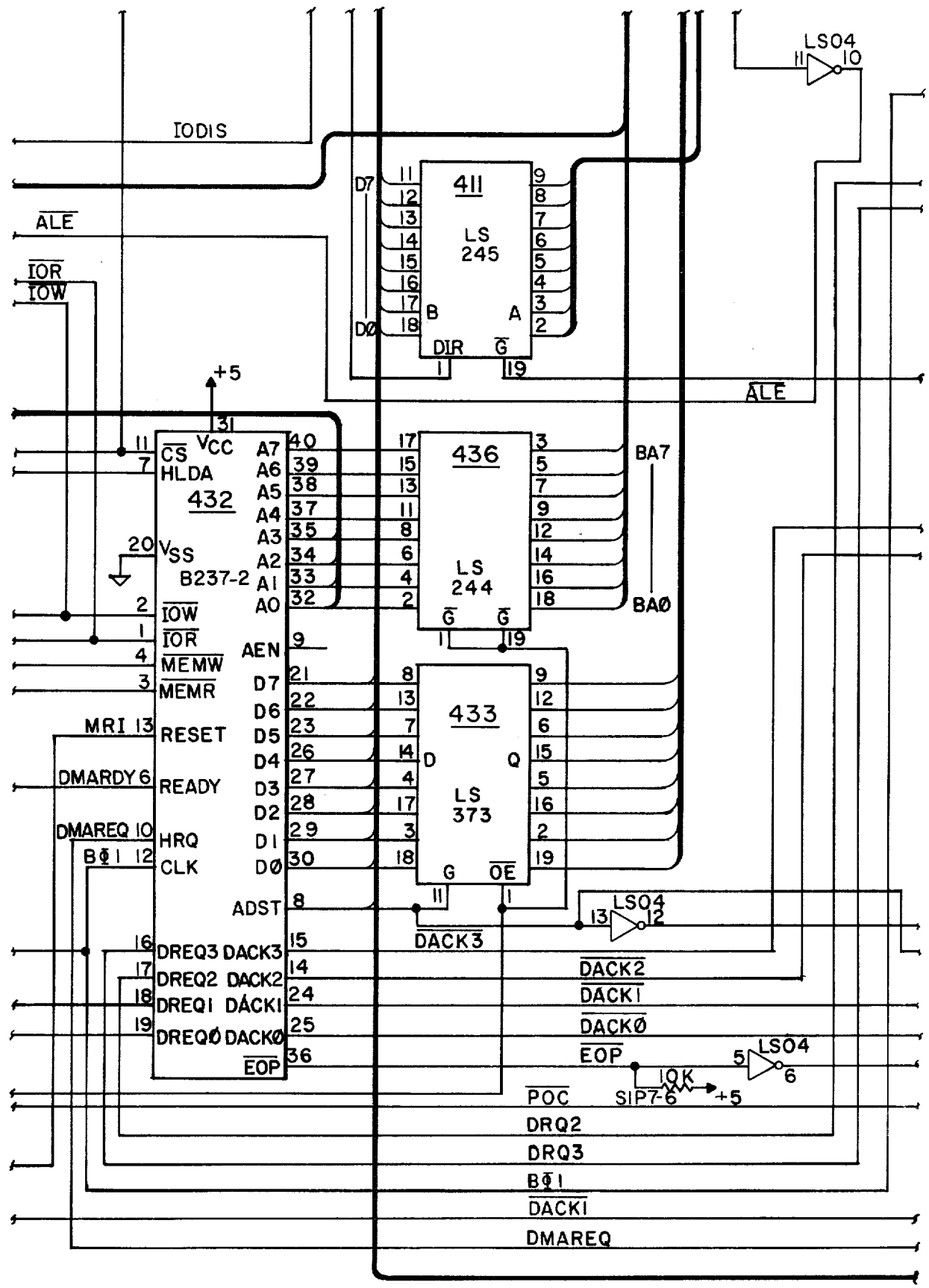

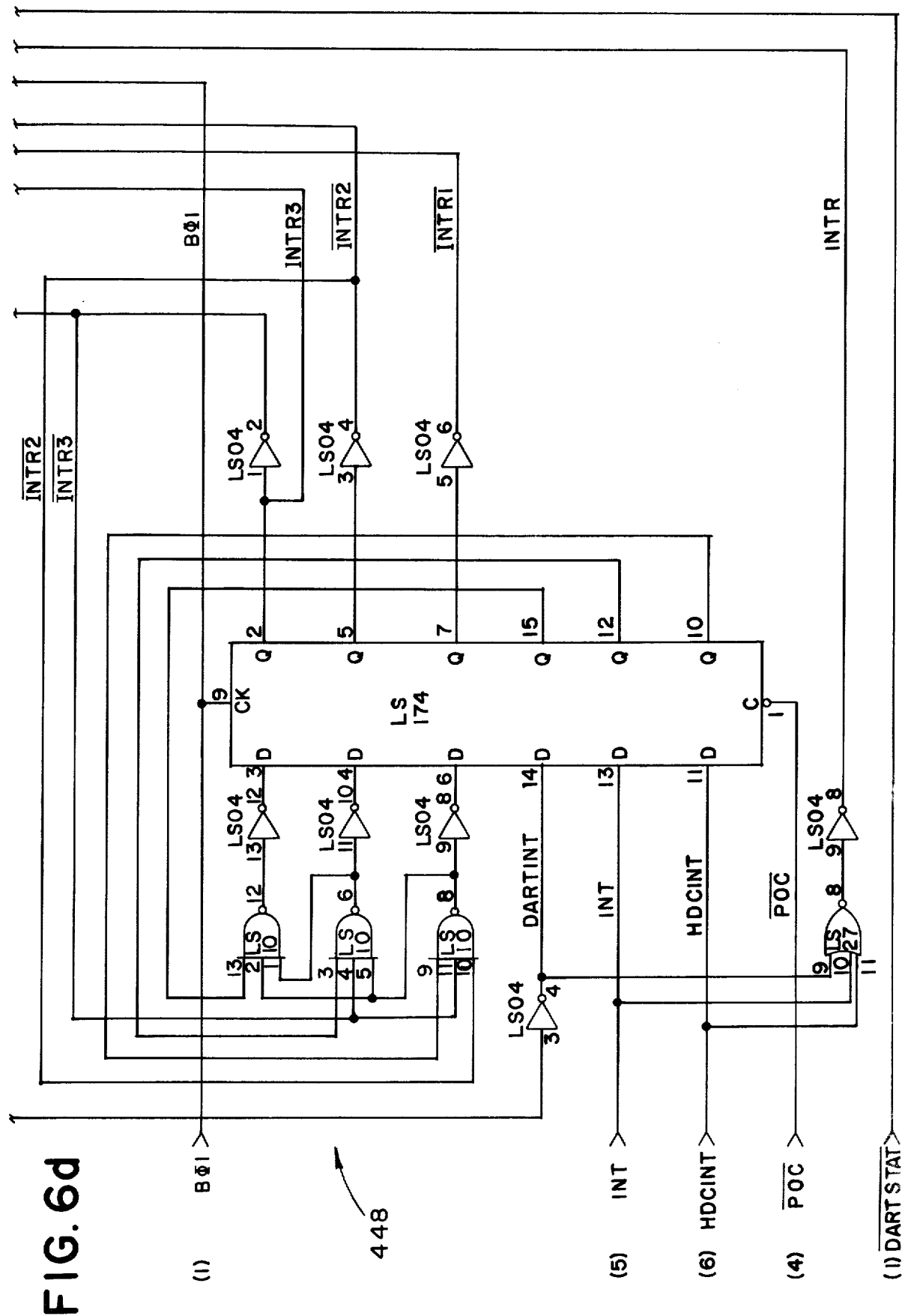

FIG. 8a

DIRECT MEMORY ACCESS DATA TRANSFER SYSTEM FOR USE WITH PLURAL PROCESSORS

BACKGROUND OF THE INVENTION

1. Field of the Invention

The present invention relates to direct memory access (DMA) data transfer operations and more particularly to DMA data transfer operations among a plurality of independent processors.

2. Description of the Prior Art

In computing systems and more particularly in word processing systems, it has heretofore been the practice to move data from one memory to another on a byte-by-byte basis. When more than one processor accesses data, one of the processors requests information from another one and receives such information one byte at a time. An alternative method to this byte-by-byte transfer has been a common memory, wherein one processor accesses a memory and writes data into it. A second processor can then read the data from the same common memory. It is possible in this latter system to use direct memory access to access data from or to the common memory.

Prior to the present invention, however, there has been no method for usng direct memory access to transfer data from one independent processor system to another. Moreover, direct memory access methods have been used primarily until now to transfer data within components of a one processor system. Prior to the present invention, no system has been devised for transferring data between processors on a DMA basis.

In transferring data on a DMA basis between independent processors, the most important advantage over byte-by-byte transfers is greatly increased speed.

In transferring data, any amount of data can be accessed by DMA operations. If memory accessing is done by a processor instead of a DMA controller, certain overhead operations are required. For example, in transferring data from one processor's memory to another memory, the first processor would have to map the other processor's memory into the initiating processor's memory. The first processor determines the address in the memory from which data is to be accessed and also stipulates the number of bytes of data to be transferred. A memory read cycle is then performed and the data is stored in a temporary register. The data is read from the temporary register and written into the destination memory. While this procedure is being performed on a byte-by-byte basis, the address register is incremented while the word count register is decremented. The values of these two variables are tested every machine cycle. In DMA operations, however, the same function is performed but without the necessity of using the processor to keep track of the status of these variables. In other words, the memory transfer operation is done independently of the processor and transparently thereto.

SUMMARY OF THE INVENTION

In accordance with the present invention, there is provided apparatus for transferring data from the memory associated with one processor to the memory associated with another processor. A direct memory access (DMA) controller is connected to each processor and facilitates transfer of bulk data from one memory to the other without the intervention of either or both processors.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 2:
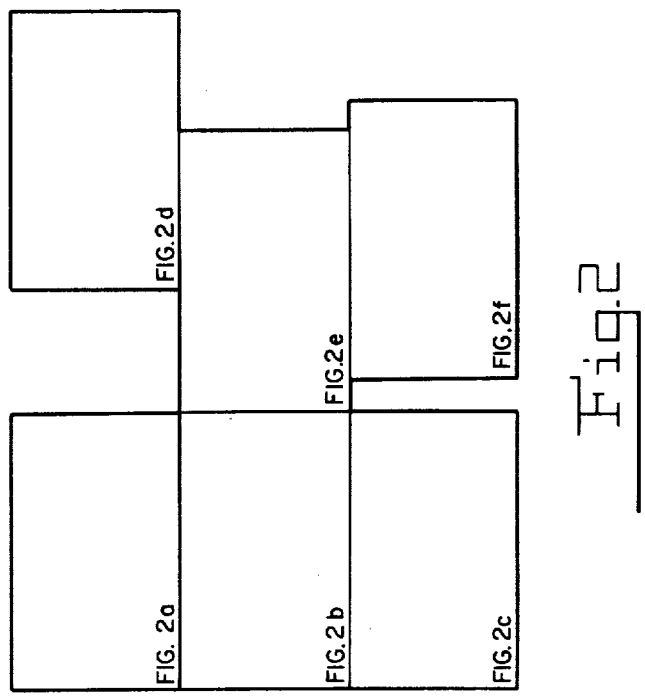
FIG. 2 is an interconnection diagram of FIGS. 2a-2f which when taken together are a schematic representation of the CRT controller and external attribute register of the present invention.

The word processing system of the present invention consists primarily of two processing units: a CRT processor and a floppy disk processor.

CRT Processor

The CRT controller formats data from a memory into a video signal suitable for driving a CRT monitor or screen. The structure and operation of the CRT processor of the present invention can best be understood by referring to FIG. 1 which contains an Intel Corp. Model No. 8085A-2 microprocessor or central processing unit (CPU) 10 (hereinafter a microprocessor), 64K bytes of dynamic memory 12, supplied, for example, by the Intel Corp. in a 16K × 1 format as Model No. 2118, an 8-bit data bus 14 and a 16-bit address bus 16, connected between the microprocessor 10 and the memory 12. To one or more of these internal buses are connected an Intel Corp. 8275 programmable CRT controller 20 and a General Instruments Co. Model No. AY-3-1015D serial to parallel universal asynchronous receiver/transmitter (UART) 22. The UART 22 communicates serially with a keyboard 24, the microprocessor 10 and the memory 12. A memory state controller 28 performs a refresh function to the memory 12 and performs an arbitration function between contending devices, as hereinbelow described.

An Intel Corp. Model No. 8237-2 direct memory access (DMA) controller 25 is connected to the data bus 14, and the address bus 16. When so connected, the DMA controller 25 refreshes memory 12 once per character line displayed on a screen, hereinbelow described. The DMA controller 25 has two registers per channel. One register is used to count the number of bytes transferred. The other is used as an address pointer.

An IPC interface 26 is connected via an IPC bus 30 to other processing units 32 within a word processing system, including a disk processor 34 which in turn can be suitably connected via serial lines to a printing device 36, such as a Ricoh Corp. Model No. RP1600 printer.

The CRT controller 20 is directly connected to a CRT monitor or display screen 38, such as a Motorola Corp. Model No. MD3000-140 monitor.

A crystal 42 is connected to an input port of the microprocessor 10 to operate at a fixed and precisely determined frequency. An oscillator 40 is connected to the memory state controller 28 which drives the memory 12 and produces a character clock for the CRT controller 20. In operation, data is transferred from memory 12 to the CRT controller 20 via the DMA controller 25.

The CRT controller 20 is programmable. Consequently, the number of lines of alphanumeric information to be displayed on the screen 38, the number of characters to be displayed in a line, and the number of scan lines used to display a single row of characters can all be selected with appropriate modifications to the oscillator 40 and crystal 42.

In one embodiment, one of two standard display formats can be selected by specifying either one of two oscillators 40 and each having a different frequency. The oscillators 40 and crystal 42 can be installed at the factory or in the field by service personnel. Naturally the size of the displayed characters can be specified by a user with appropriate structural modifications to locate the crystal for convenient access for replacement. In one embodiment, two preferred crystal oscillator rates are 35.04 MHz and 35.38 MHz. In the preferred embodiment, the character size is nine vertical lines by seven horizontal dots, whereas the character font size is 12 lines by eight dots and the character block size is 12 lines by nine dots.

The IPC interface 26 is functionally equivalent to the IPC interface shown and described in detail in co-pending U.S. patent application Ser. No. 177,319, filed Aug. 12, 1980, for "Communications Systems for a Word Processing System Employing Distributed Processing Circuitry".

The CRT processor forms only part of a single data processing station. The other part of the circuitry is contained on the disk processor 34, which is connected to as many as four floppy disk drives, not shown, and to a printer. The disk processor 34 controls disk I/O functions and performs print formatting operations.

To transfer information from the keyboard 24 once one of its keys is depressed, a character corresponding to the depressed key is transmitted across the serial line from the keyboard 24 to the CRT controller 20 via the UART 22 which converts the data from serial form to parallel form. Once the UART 22 receives the character, it signals the microprocessor 10 by raising the interrupt RESTART (RST) 7.5 line on the microprocessor 10. The microprocessor 10 then discontinues processing and interrogates the UART 22. The character is moved to the accumulator of the microprocessor 10. From the accumulator, a keyboard handler program or subroutine residing in the program memory 12 transfers that piece of data to a buffer in the memory 12 of the CRT processor.

The CRT controller 20 issues a DMA request signal to the DMA controller 25 to fill the CRT controller's 20 internal data buffers. Likewise, the attribute control logic 21 issues DMA request signals to the DMA controller 25 to fill the attribute registers 21. The DMA controller 25 issues a HOLD request to the microprocessor 10. The microprocessor 10 completes its current machine cycle and acknowledges the request with a HOLD ACK signal to the DMA controller 25. The DMA controller 25 gets control of the address bus 16 (by issuing an address) and the control bus 18 (by activating the memory read and the I/O WRITE lines of the control bus), moving a byte of data from memory 12 into the destination register. Once the transfer is completed the HOLD line is lowered, allowing the microprocessor 10 to resume execution. The DMA controller 25 issues an interrupt signal to the microprocessor 10 at the end of each display line. The microprocessor 10 acknowledges the interrupt signal by reinitializing the DMA controller 25, instructing it to point address pointers therein to a new line of text.

Once the microprocessor 10 returns from its interrupt handler routine, it enters a program to format the CRT screen 38 and the new character is moved into a position in memory 12 so that it can be displayed on the screen 38.

Two line buffers, one for input and one for output, are provided within the CRT controller 20 and may be used in accordance with initialization parameters in the CRT controller 20. Of course, the initialization parameters and data allocation in memory 12 can be changed to conform to the characteristics of the crystal 42 used by the system. The input line buffer is filled or loaded with data by the DMA controller 25 at the current microprocessor operating rate. The output line buffer circulates once for each CRT scan lire. When the CRT controller 20 completes the display of a lire of text, the function of the input and output buffers is reversed.

When a printer operation is to take place, data from the CRT processor memory 12 is transferred to a memory within the disk processor 34 via the IPC interface 26 and IPC bus 30. This data transfer is shown and described in detail in co-pending U.S. patent application Ser. No. 177,319, as hereinabove referenced. The CRT processor establishes a master/slave relationship with the disk processor 34, and then transfers information to the disk processor 34 one byte at a time. The information, once received by the disk processor 34, is changed by programs within the disk processor 34 to a format acceptable to the printer 36.

When the CRT processor requires information from a disk, it signals the disk processor 34 by again establishing a master/slave relationship across the IPC interface 26 and IPC bus 30. The CRT processor transfers a data request to the disk processor 34. The disk processor 34 then accesses the data from the disk and transfers it to its own memory. The disk processor 34 then signals the CRT processor that it has received the data it requested. The data is then transferred once again across the IPC interface 26 and IPC bus 30 cne byte at a time. All of these transfers are performed under the control of either the disk processor 34 or the CRT processor.

While the IPC interface 26 operates generally as shown and described in co-pending U.S. patent application Ser. No. 177,319, as hereinabove referenced, for each byte that is transferred, the slave microprocessor of the present invention is placed into a hold state. In the system disclosed in the aforementioned patent application, a memory interleaving scheme was constructed to utilize the full bandwidth of the memory. That is not required in the present invention. Circuitry is simplified such that when data is transferred to the slave microprocessor, it is placed in the hold state for the duration of the transfer for each byte that is transferred. The use of this procedure reduces the number of components required to enable master/slave operations.

Figure 1:
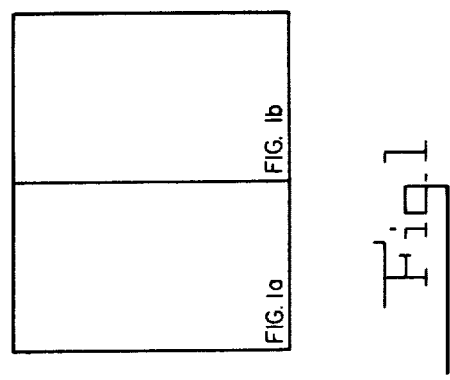
FIG. 1 is an interconnection diagram of FIGS. 1a and 1b which when taken together are a block diagram of a word processing system with external attribute logic embodying the present invention.
Figure 1A:
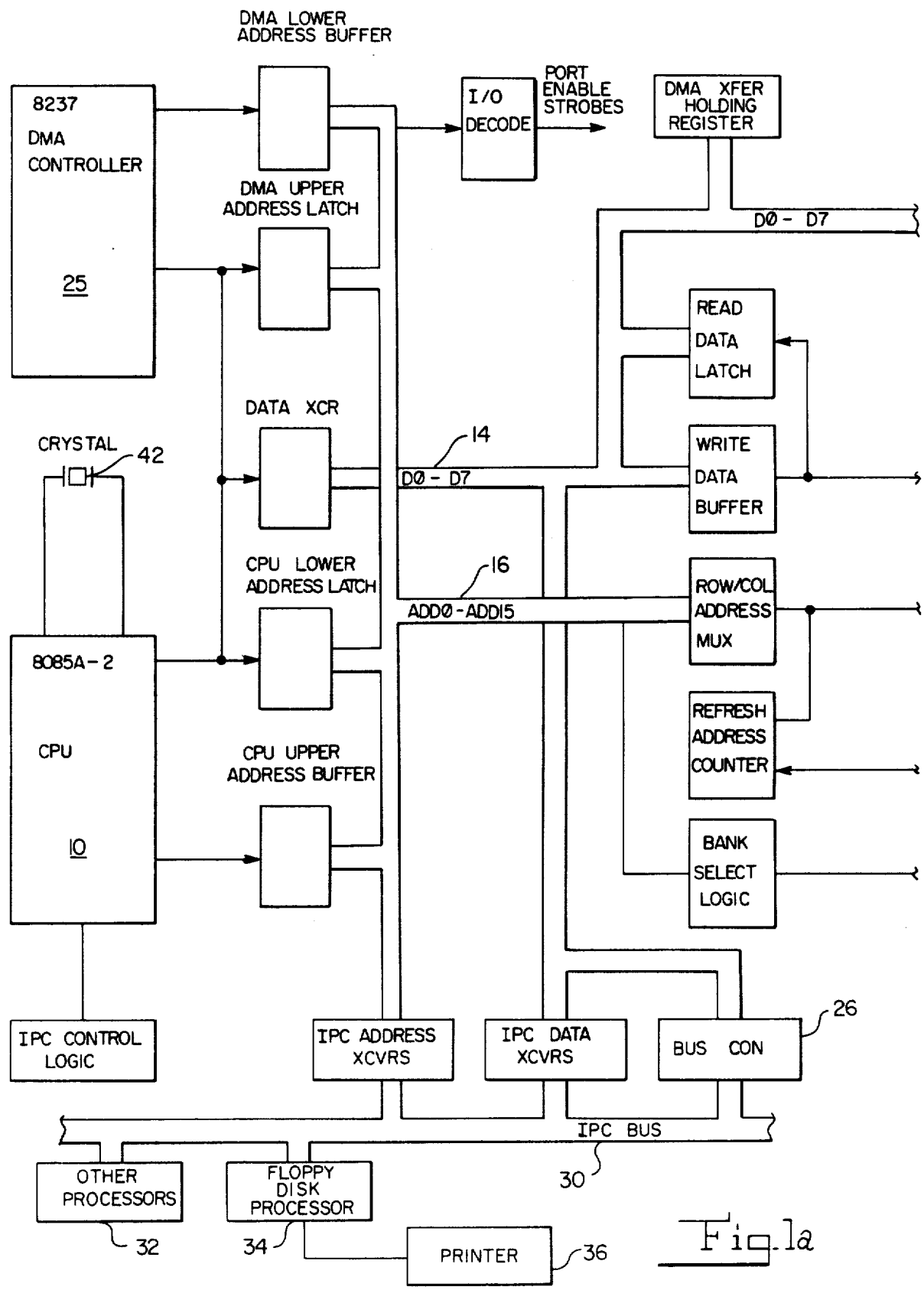
Figure 1B:
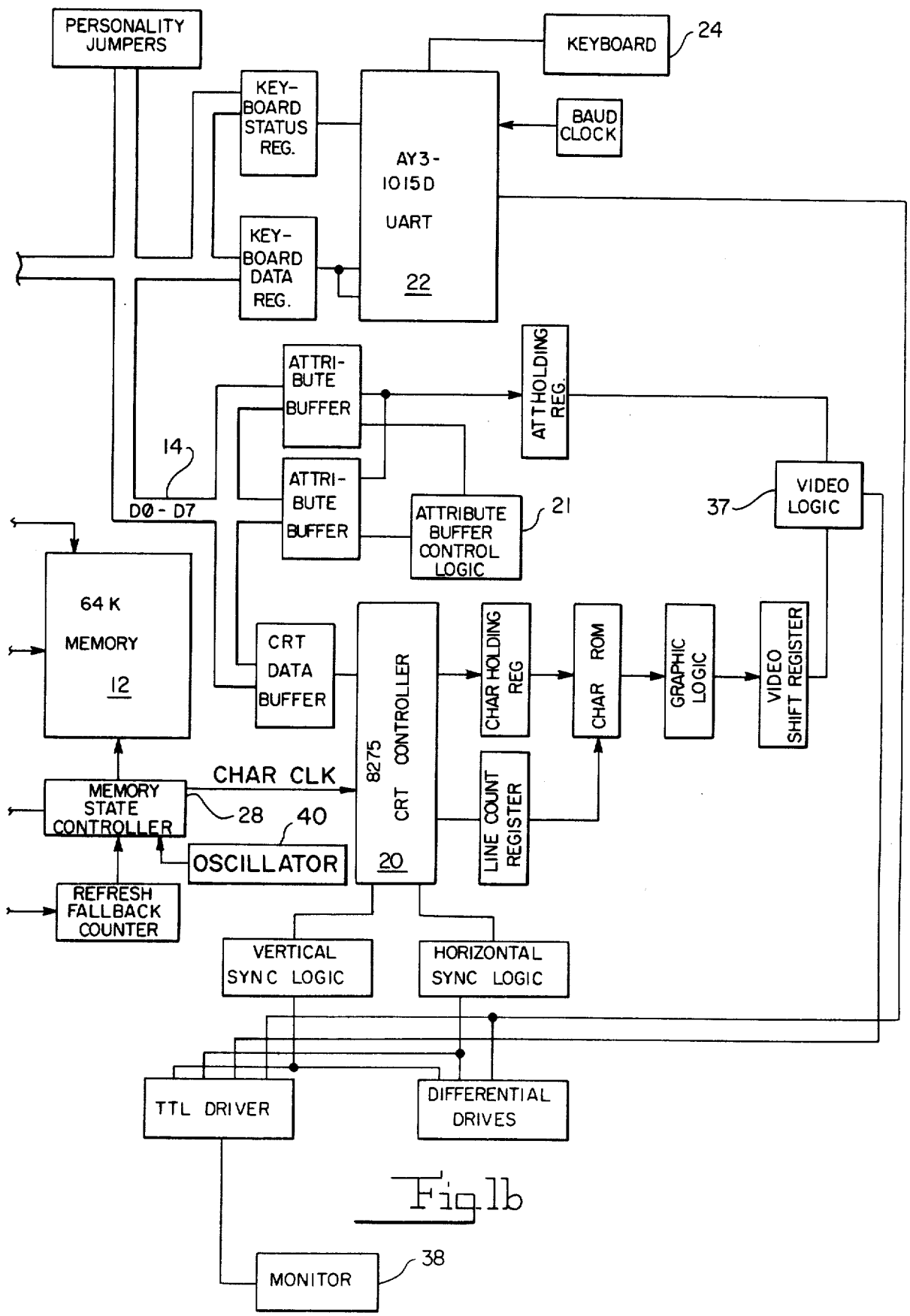
Figure 2A:
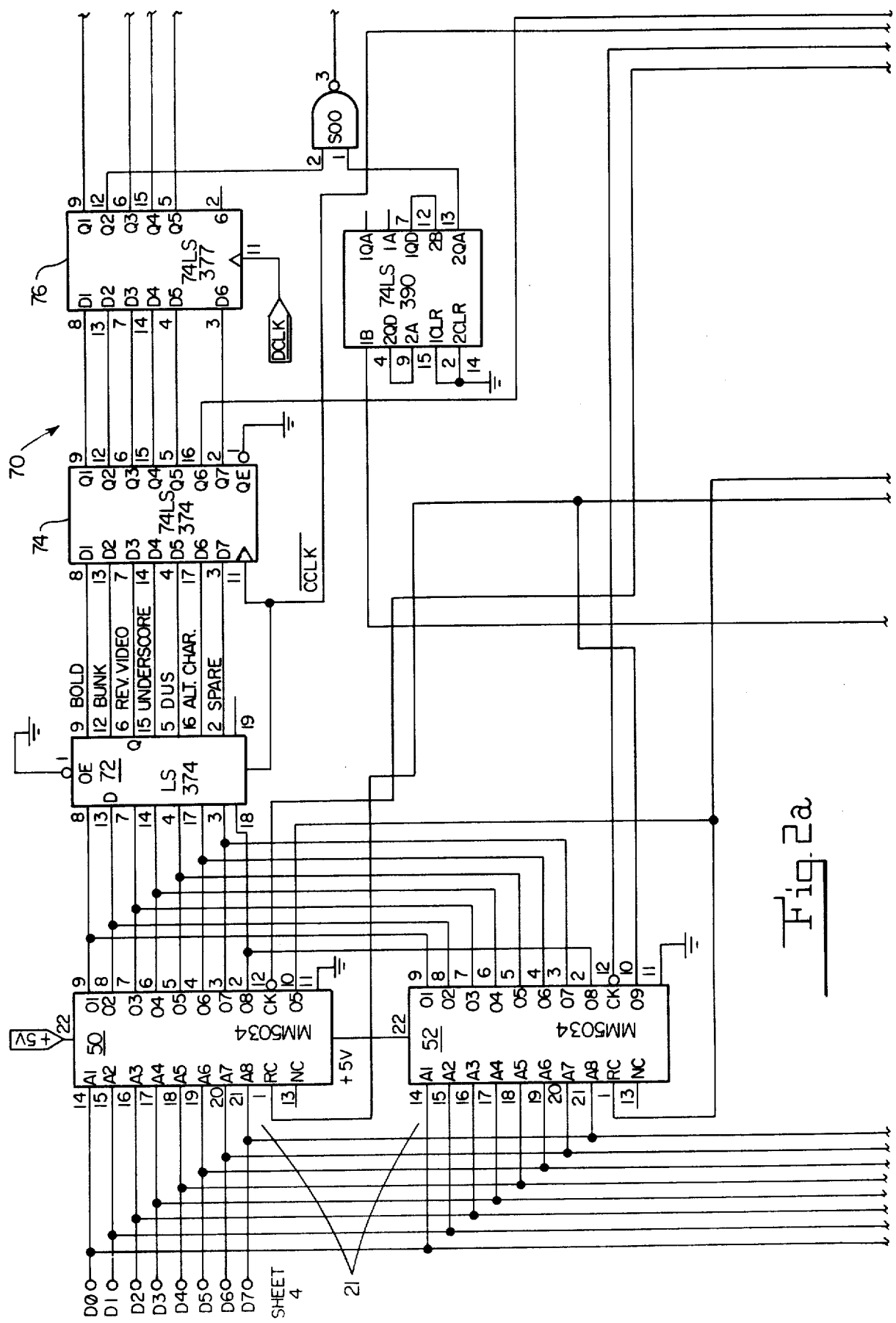
Figure 2B:
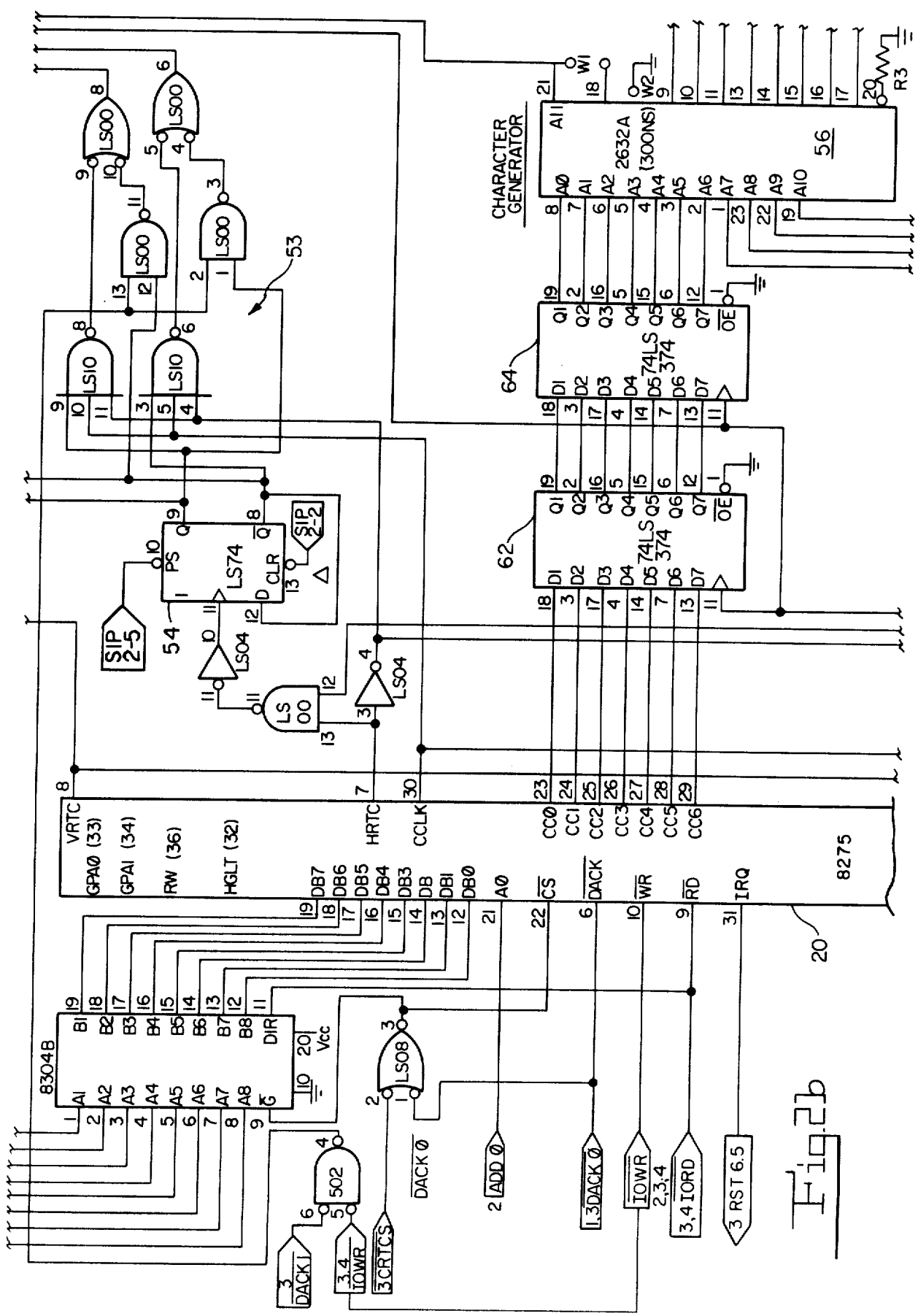
Figure 2E:
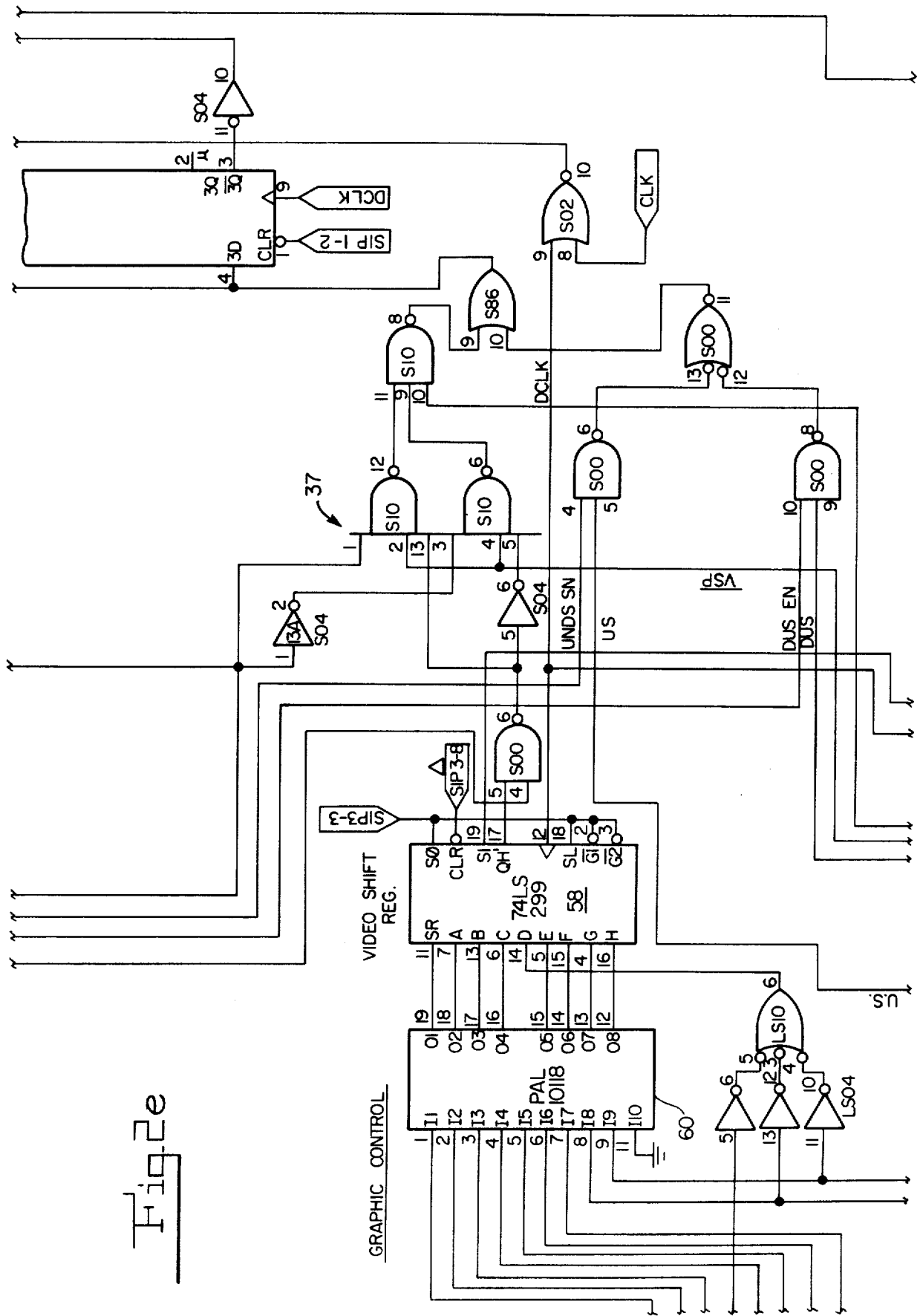
Figure 3A:
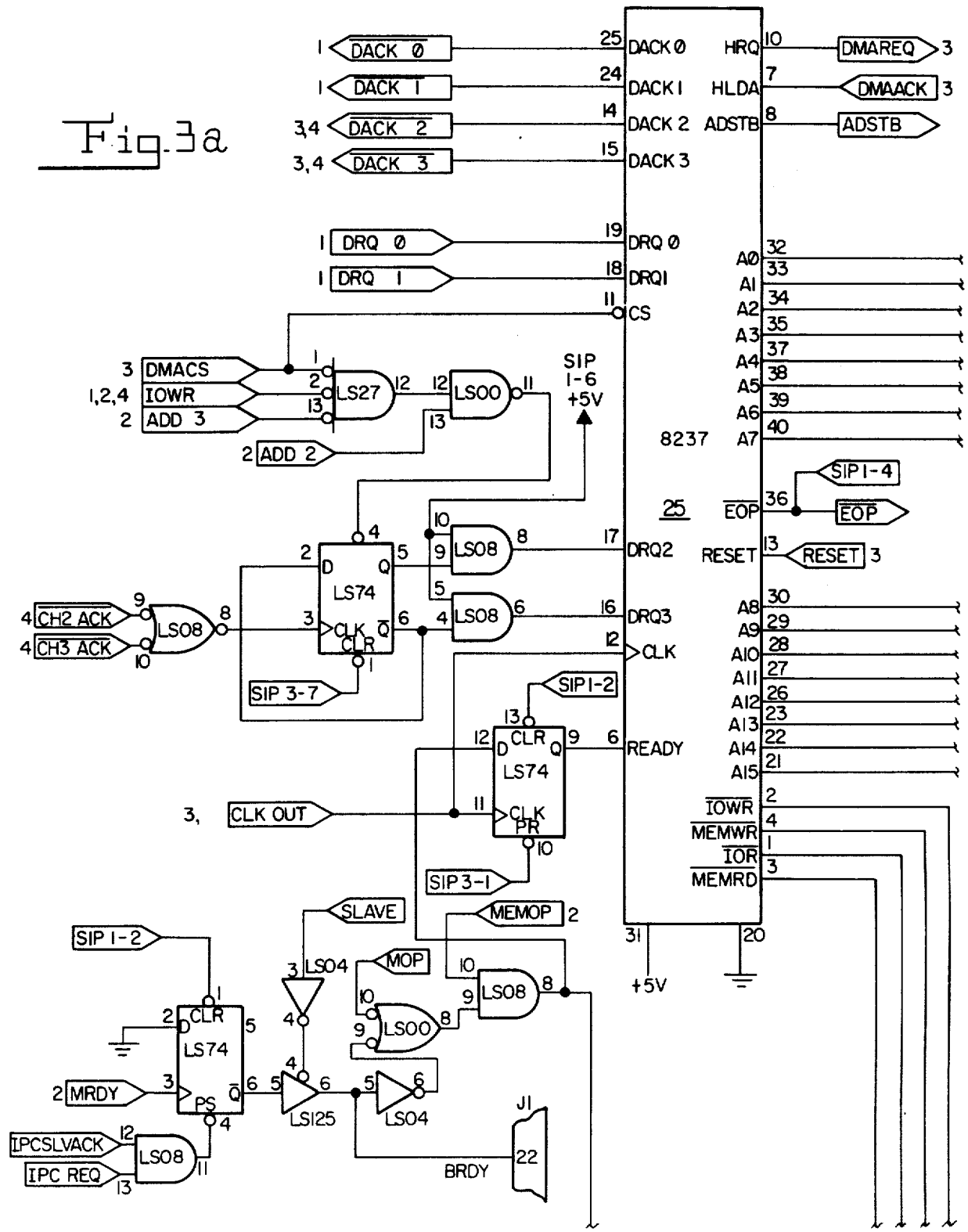
FIG. 3 is an interconnection diagram of FIGS. 3a-3h which when taken together are a schematic representation of the CRT microprocessor and its associated DMA controller of the present invention.
Figure 3B:
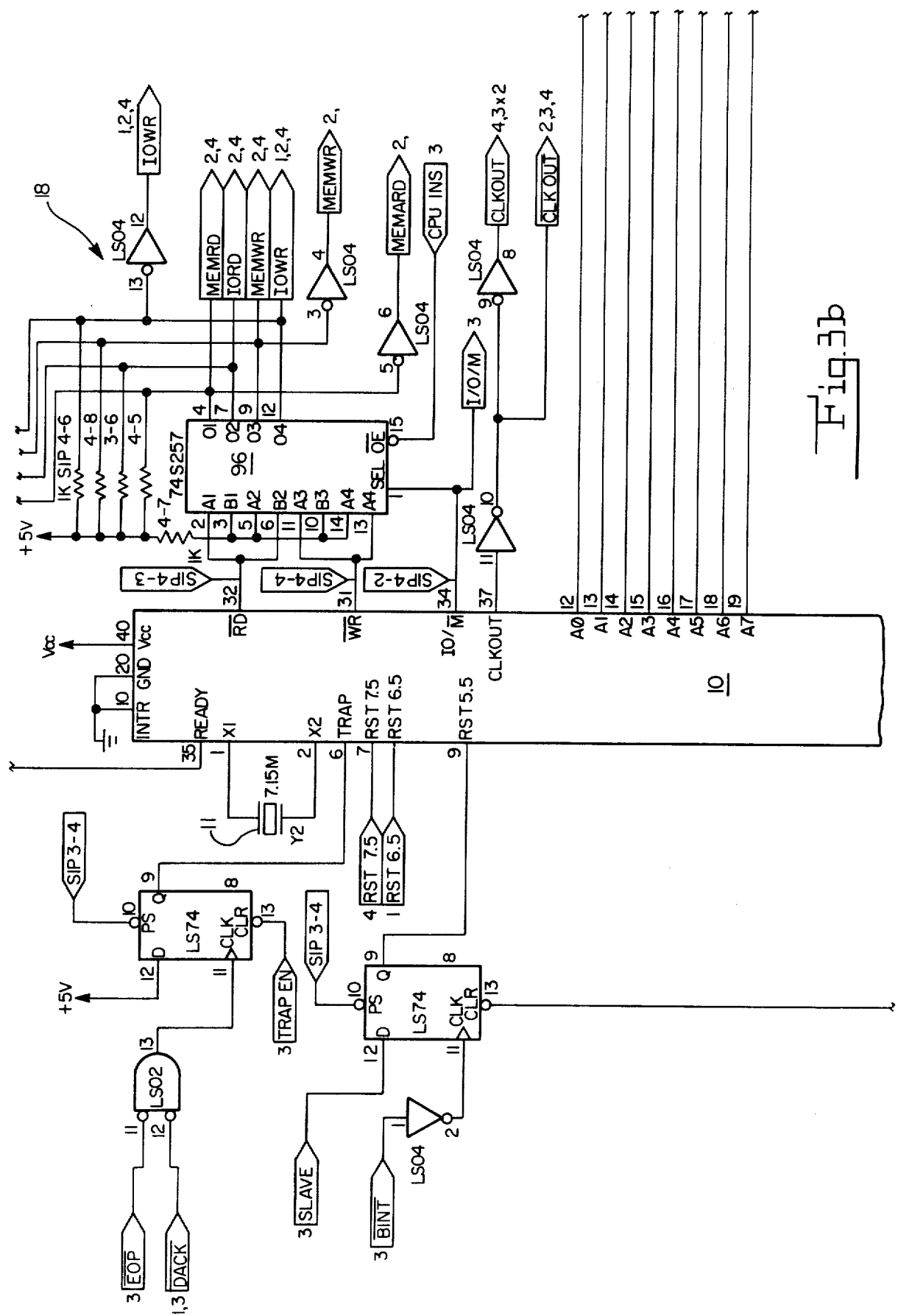
Figure 3D:
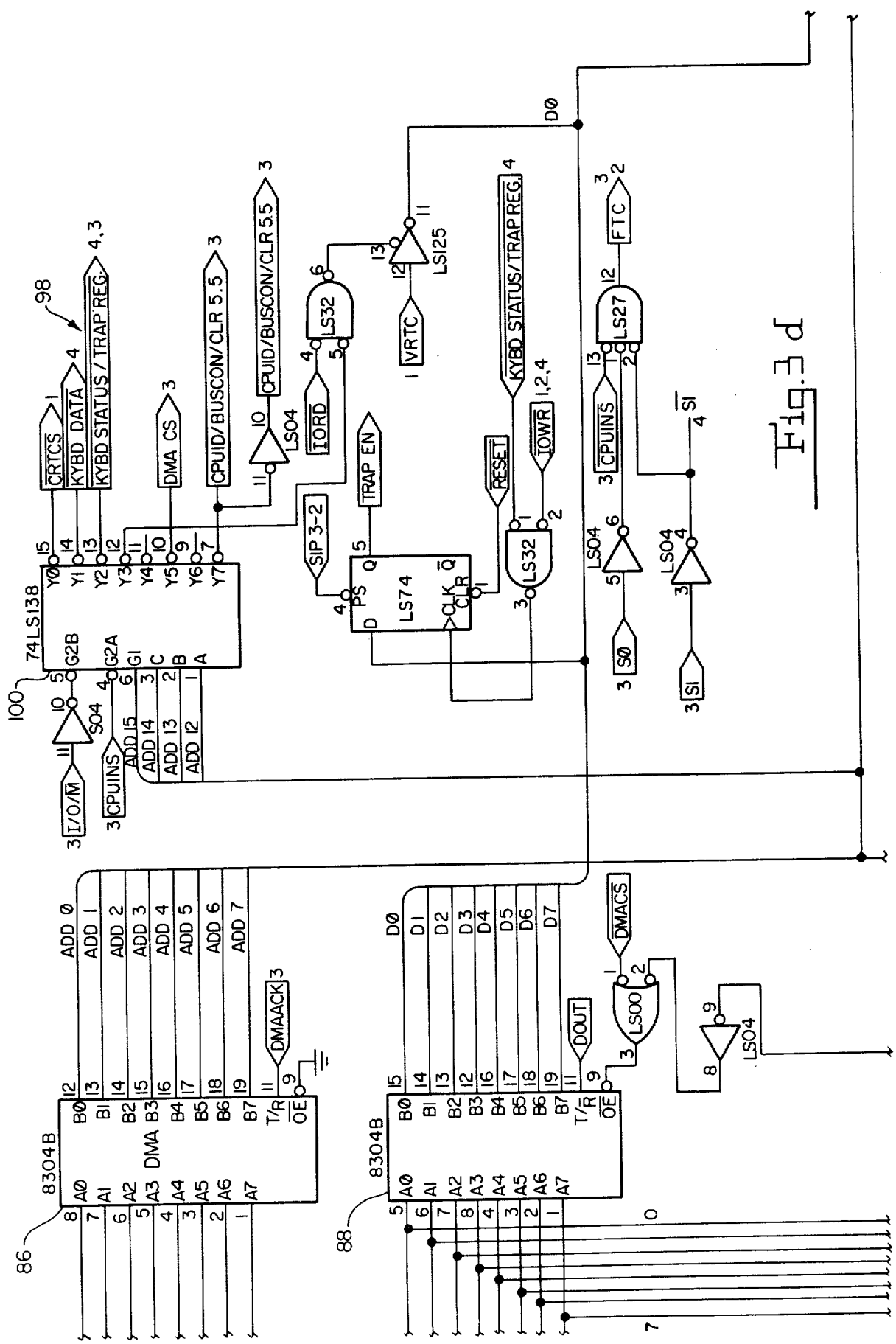
Figure 3F:
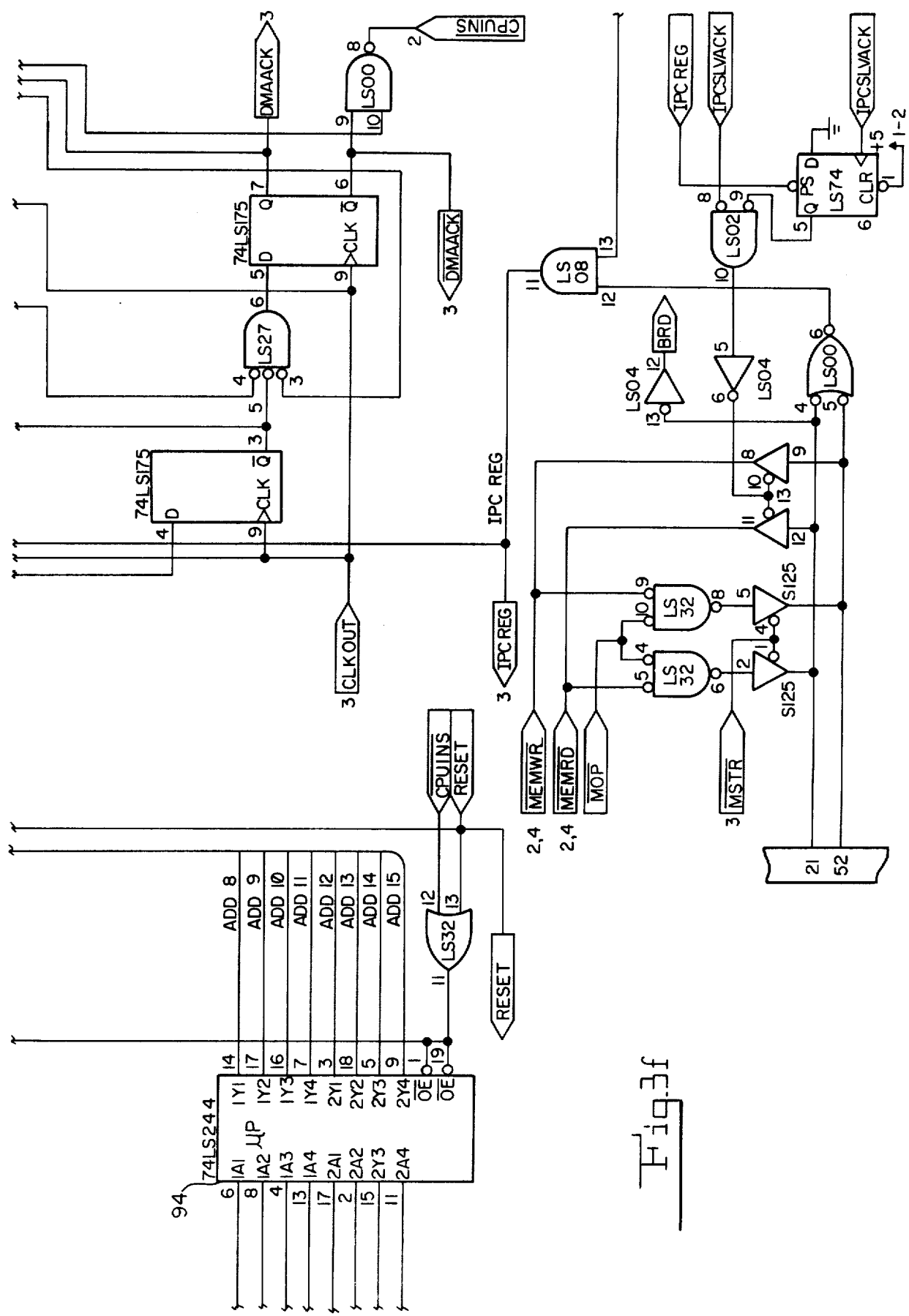
Figure 3G:
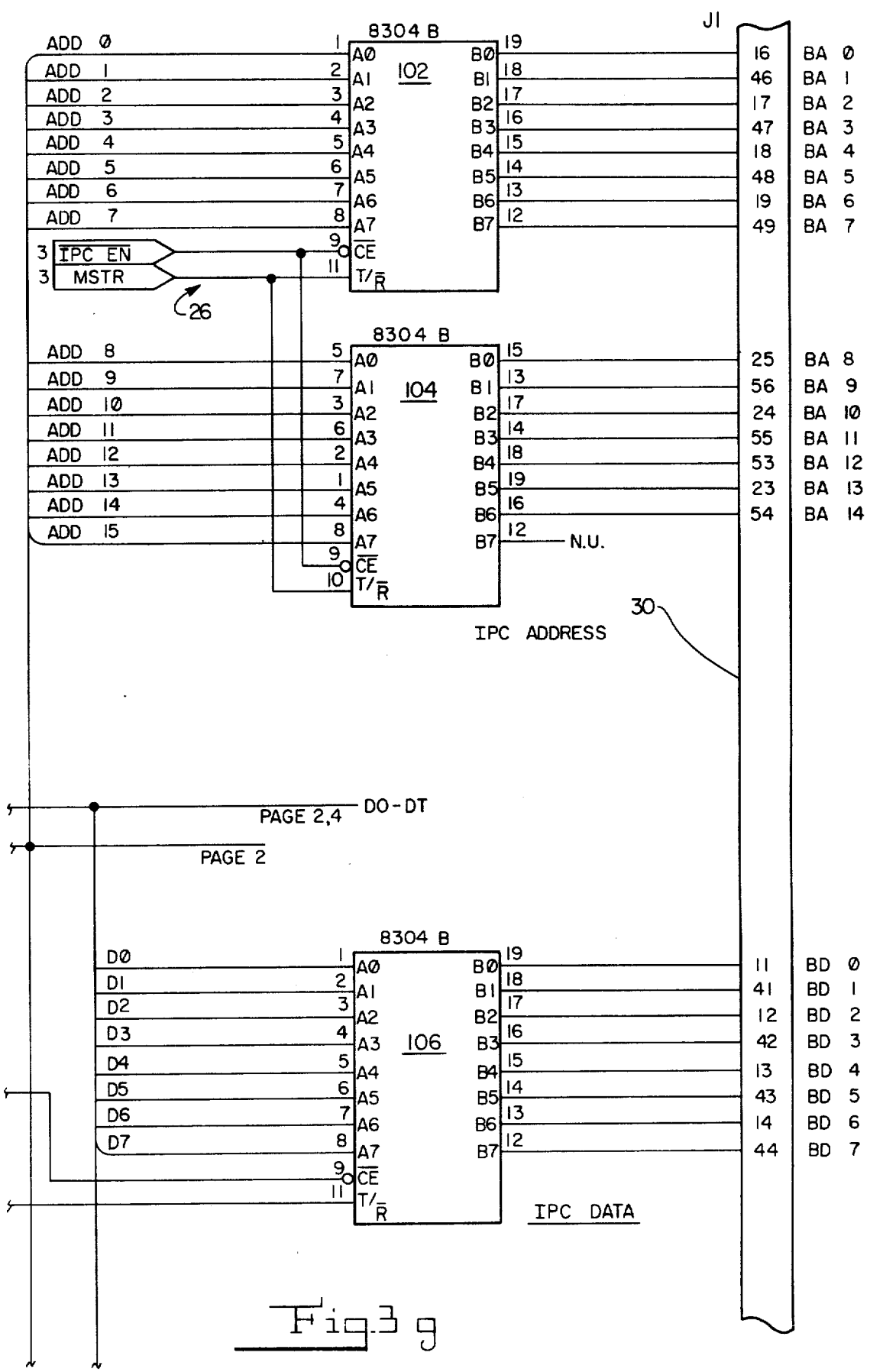
Figure 3H:
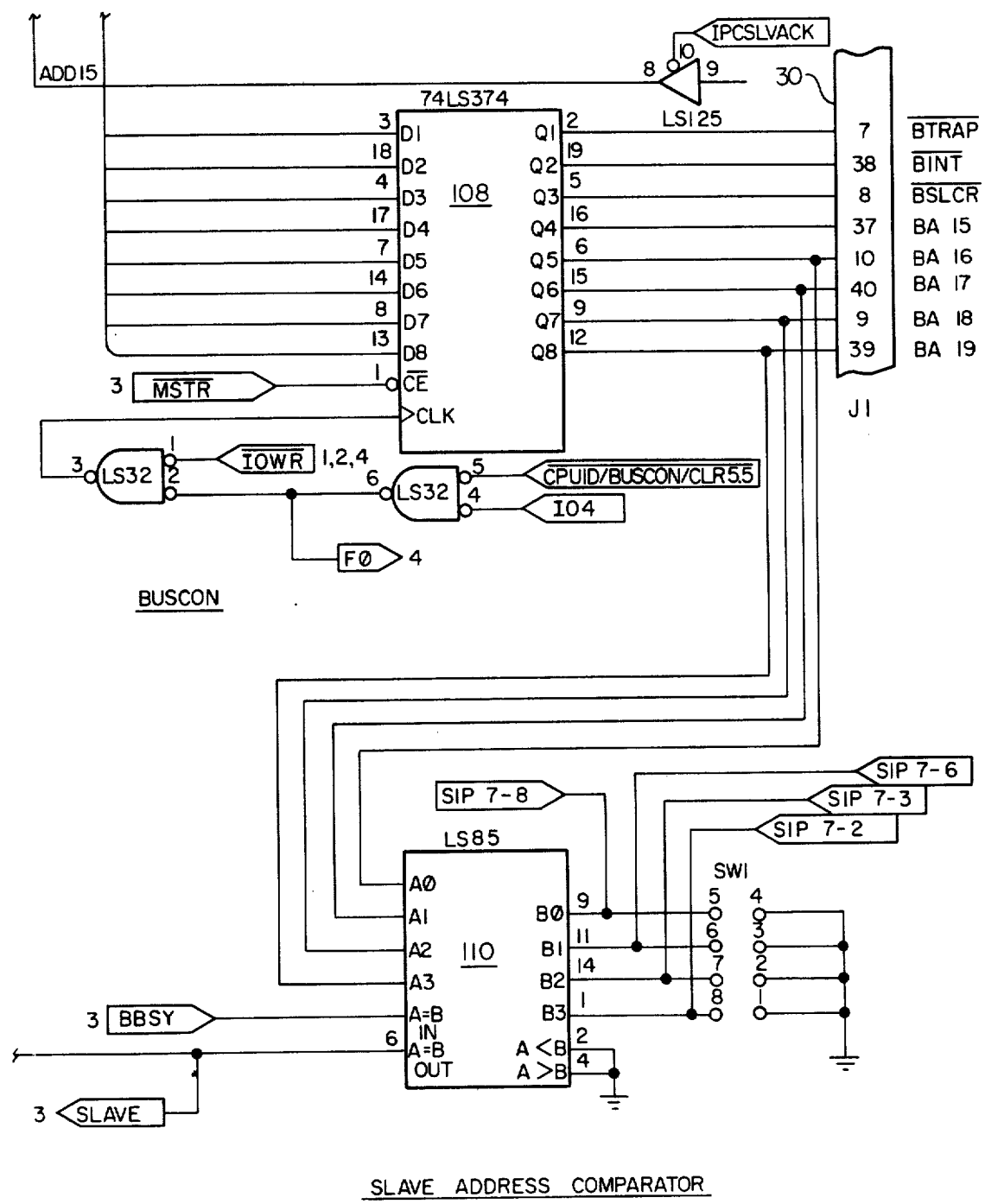

FIG. 2 is a detailed view of the CRT controller 20 as shown in FIG. 1, and also includes attribute registers shown generally at 21 and video logic shown generally at 37.

Referring now also to FIG. 2, a portion of a CRT processor card including the CRT controller and circuitry associated therewith, is shown. Reference numeral 21 refers generally to devices marked 50 and 52 which are 80-byte long, 8-bit wide external attribute registers, manufactured by the National Semiconductor Corp. as Model No. MM5034. These circulating dynamic shift registers 50 and 52 store attribute information that is associated with each character to be displayed on a line of the display.

Each character code has associated with it an eight-bit attribute. The bits of this attribute are defined as shown below.

| Bit | Attribute |
|-----|-----------|
| 0 | BOLD |
| 1 | BLINK |
| 2 | REVERSE VIDEO |
| 3 | UNDERSCORE |
| 4 | DOUBLE UNDERSCORE |
| 5 | ALTERNATE CHARACTER SET |
| 6 | NOT USED |
| 7 | NOT USED |

Each attribute is selectable independently of the others and is valid only for the single character associated therewith. Any character can have any combination of attributes.

The BOLD attribute specifies a 25% increase in brightness for the displayed character associated therewith. The BLINK attribute specifies a character blink rate of 1.2 Hz. The REVERSE VIDEO attribute causes the corresponding 12-line by nine-dot character block associated with the character to become a reverse video field. A cursor is produced by actuating the REVERSE VIDEO attribute associated with a blank character. The UNDERSCORE attribute provides a single underline one line from the bottom of the character block. The DOUBLE UNDERSCORE attribute provides a double width underline using the bottom two lines of the character block. The ALTERNATE CHARACTER SET attribute selects logic to decode the character code from the alternate 128-symbol character set, not from the conventional 128-symbol character set.

The two external attribute registers 50 and 52 function in parallel with one register being filled from a direct memory access (DMA) channel in the system bus while the second register outputs information through the video circuitry 37.

At the end of a particular display line the two registers 50 and 52 exchange functions. Thus, the external attribute register pair 50 and 52 is used in a ping-pong arrangement, one register of which is connected to the DMA channel while the other register outputs information to the video circuitry 37. After a line is displayed, the DMA function is performed by the second external attribute register 50 or 52 while the information is displayed through the first external attribute register 52 or 50 via video circuitry.

Information enters the register pair 21 on lines D0 through D7 which is a common data communications bus. The data from lines D0–D7 is clocked into either external attribute register 50 or external attribute register 52 by clock signals that are derived by the circuitry associated with the attribute buffer control, shown generally at reference numeral 53.

A flip flop 54 selects which external attribute register 50 or 52 is associated with the DMA channel and which with the video section. The external attribute register 50 or 52 associated with the DMA channel is clocked at the end of each DMA transfer. There are 80 DMA transfers for each display line.

The external attribute register 50 or 52 associated with the video circuitry is clocked at the video refresh rate, as controlled by the memory refresh controller 28, in conjunction with the CRT controller 20. Both the CRT controller 20 and the external attribute register 50 or 52 that is associated with the video refresh circuitry are synchronized to the refresh rate which is derived from the oscillator 40. As characters are assembled and exit from the CRT controller 20, over lines CC0 through CC6, the attributes are presented from the external attribute register 50 or 52 in synchronism. Both the character and the corresponding attribute enter a register pipeline so that they arrive at the video circuitry 37 in synchronism.

The video logic 37 of the CRT processor card converts the ASCII character information presented by the CRT controller 20 into a video signal. The conversion is performed by applying the ASCII character to the input of a character generator 56 which generates information corresponding to the dot pattern for a particular character. The character generator 56 is a ROM manufactured by the Intel Corporation as Model No. 2632A. Alternatively, an EPROM such as part number 2732A may be used.

The address input for the character generator 56 consists of both the ASCII character value and the line count. The output of the character generator 56 is a series of dots corresponding to the line being addressed for the specified character. The eight bits of information output by the character generator 56 is latched into a video shift register 58 where it is shifted out serially at the character dot rate of 17.69 MHz in the preferred embodiment.

The remainder of the video circuitry 37 synchronizes the character information with the selected attribute. The outputs of the CRT processor card are the video (VIDEO) output signal, the horizontal sync (HSYNC) output signal and the vertical sync (VSYNC) output signal, used to synchronize the monitor operation of the CRT monitor 38 with the video signal. The CRT controller 20 synchronizes the timing information used to generate the HSYNC and VSYNC signals with the character information which eventually takes the form of the video signal.

As hereinabove mentioned, a number of attributes can be represented by the CRT processor card, such as bold, blink, reverse video, underscore, double underscore, and selection of an alternate set of 128 characters. The CRT processor provides access to 256 characters. The CRT controller 20 provides direct access to 128 characters over the seven lines CC0 through CC6. The CRT controller 20 in conjunction with bit 5 from one of the external attribute registers 21 addresses a set of 256 characters. The character generator 56 can be programmed with 256 characters, i.e., two sets of 128 characters each, in any desired format. Examples of such formats are: elite, gothic, italics, mathematical, scientific, modern, any foreign language, or pica type styles.

As hereinabove stated, the external attribute registers 50 and 52 are circulating dynamic shift registers. They can be loaded with new information or they can be set into a recirculating mode so that they continually recirculate data internal to the device. When one of the external attribute registers 50 or 52 is attached to the DMA channel, information is input; when attached to the video circuitry 37, the external attribute register 50 or 52 recirculates information that is already stored.

A graphics control programmable array logic (PAL) 60 is connected to the character generator 56. The graphics control PAL 60 can be used for generating thin line graphics in any one of 11 right angle patterns.

The CRT controller 20 transmits over lines CC0 through CC6 a signal to a pipeline which consists of two octal latches 62 and 64. The octal latches 62 and 64 synchronize the character codes with the line codes and generate a signal to the character generator 56. Similarly over lines LC0 through LC3, the CRT controller 20 is connected to a hex latch 66 used to synchronize the line count with the horizontal sync signal.

The dot clock (DCLK) signal is applied from the oscillator 40 to a divide-by-9 counter 68. The output from this counter 68 is a character clock (CCLK) signal. The CCLK signal is then applied to the CRT controller 20 which uses the clock signal to output the character codes over lines CC0 through CC6 and lines LC0 through LC3. This CCLK signal is also used to generate the vertical and horizontal sync signals.

Connected to the attribute registers 21 is an attribute pipeline 70 which consists of three octal latches 72, 74 and 76. The attribute pipeline 70 synchronizes the attribute bits with the video signal. The output of the attribute pipeline 70 is applied to the video logic 37.

The graphics control pipeline 78 consists primarily of an octal latch 78 which is connected to the CRT controller 20 over lines LA0, LA1, VSP, and LTEN. Ports LA0 and LA1 select the graphic character to be displayed. The LA0 and LA1 signals are combined with the LTEN signal via the graphics pipeline 78 to the graphics control PAL 60. The graphics control PAL 60 then modifies the signal from the character generator 56 to generate the appropriate graphics characters.

DMA arbitration logic is shown generally at reference numeral 80. It consists of a bi-directional 8-bit shift register 82. This arbitration logic 80 ensures that the attribute buffer requests the same amount of data at the same time as does the CRT controller 20. Thus, the CRT controller 20 and the attribute register 21 are in synchronism before entering the video signal.

Referring now also to FIG. 3, the microprocessor 10 receives a clock signal from the crystal 11. The DMA controller 25 is connected to arbitration buffers 86, 88 and 90. Similarly the microprocessor 10 is connected to arbitration buffers 88, 92 and 94. The arbitration buffers 86, 88 and 90 allow either the DMA Controller 25 or the microprocessor 10 to access the information on the address bus 14 and on the data bus 16.

The control bus 18 includes a four bit 2-to-1 multiplexer 96. The purpose of the control bus 18 is to select the function to be performed by the microprocessor 10, which can be memory read, memory write, I/O read or I/O write. I/O decode circuitry is shown generally at reference numeral 98. It consists of a 3-to-8 decoder 100. The purpose of the I/O decoder 98 is to select the appropriate I/O port for the function to be performed.

The DMA controller 25 and the microprocessor 10 operate at the same speed, based on the crystal 11. The interprocessor communications (IPC) interface is shown generally at reference numeral 26. It consists of three buffers 102, 104 and 106. The IPC buffers 102, 104 and 106 are connected to the IPC bus 30 and are bi-directional for transferring data onto or from the IPC bus 30. Master arbitration logic 112 is connected to the microprocessor 10. The master arbitration logic 112 consists of two flip flops 114 and 116, which together determine whether the microprocessor 10 can become a master processor. This is done by determining the status of the IPC bus 30. If the IPC bus 30 is not being used or if it is occupied by a lower priority master microprocessor, then the microprocessor 10 can become a master. A bus master request is issued by setting the serial output data (SOD) line of the microprocessor 10. If the master arbitration logic 112 indicates that the microprocessor 10 can become a master i.e., the microprocessor 10 has an active bus request and has a higher priority than all other processors 32 with active bus requests, the microprocessor 10 polls its serial input data (SID) line to determine whether it has been granted the bus request. At this point the microprocessor 10 may generate signals through the bus control register 108 to address a slave processor. The microprocessor 10 may reset a pending bus request or relinquish its position as bus master by resetting the SOD line.

Once the microprocessor 10 is master, it presents the desired slave processor address to the IPC bus 30 for monitoring by the other processors 32. The processor 32 having the specified four-bit address now becomes the slave processor. A slave address comparator 110 is connected to the IPC bus 30 to indicate when the instant microprocessor 10 is to become the slave processor of another processor 32. In the preferred configuration, the slave processor is the floppy disk processor 34.

Either the upper 32K bytes of memory or the lower 32K bytes of memory of the slave processor is mapped into the upper 32K byte portion of the master microprocessor memory 12. The part of the slave processor memory accessed is determined by the control bus 18 and bus control register 108 associated therewith. To access the memory of a slave processor, the master microprocessor 10 generates read/write signals to the slave. Slave processor program execution is interrupted only while the slave processor memory is being accessed and resumes thereafter.

Two types of memory to memory data transfers are possible in this system. The first is an internal memory transfer. In this case a processor moves part of the data in its memory from one position to another. Such an internal memory move can be accomplished on any part of the 64K memory locations of the microprocessor. The second form of memory to memory transfer occurs between memory devices of two different processors. In this case, the master processor retains the lower 32K bytes of its memory but maps in 32K bytes of slave data into its upper 32K bytes of memory. The slave data may be from the upper or the lower portion of the slave memory. Memory to memory transfers can then occur either between the slave and master portions of the memory, entirely within the master 32K portion, or within the slave 32K portion of memory.

Floppy Disk Processor

Figure 4:
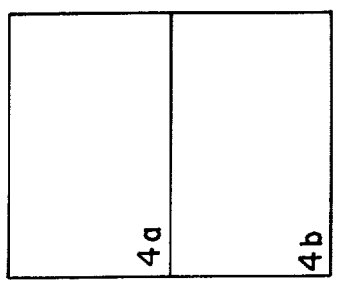
FIG. 4 is an interconnection diagram of FIGS. 4a and 4b which when taken together are a block diagram of the floppy disk processor board embodying the present invention.

Referring now to FIG. 4, there is shown a block diagram of the floppy disk processor in accordance with the present invention. The floppy disk processor circuit is integrated on a printed circuit board on which there are six connectors, J1 through J6. The 60 pin edge connector J1 is the common bus between the floppy disk processor board and CRT processor board through which interprocessor communications are accomplished. The floppy disk processor board provides the interface to 8" or 5¼" floppy disk drives, supporting single density (FM), double density (MFM) and IBM or non-IBM format soft sectored disks. It interfaces up to four single or double sided disk drives in daisy chain configuration. This controller, in conjunction with a fixed disk controller, not shown, also supports 5¼ and 8-inch Winchester disk drives. Connector J2 interfaces up to four daisy chained 8" disk drives. Connector J3 provides a standard RS232 serial interface to a printer with transmission rates from 50 to 19,200 bps. Connector J4 contains all the necessary signals for interfacing to a fixed disk controller to access 5¼ and 8-inch Winchester disk drives. Connector J5 is a standard RS232 general purpose communication line with auto dial capability. Connector J6 is parallel to connector J2 and interfaces to 5¼" disk drives. A microprocessor 410 is connected to a data bus 412 via a buffer 411. Also connected to the microprocessor 410 via a buffer 413 is one portion of an address bus 414 which is used to transfer the upper byte of the address. The microprocessor 410 is also connected via a latch 415 to the part of the address bus 416 used to transfer the lower byte of the address. Both parts of the address bus 414 and 416 are applied to an address multiplexer 418, which in turn is connected to a random access memory (RAM) 420, which is a 64K×8 byte device. Connected to the memory 420 is a latch 421 which is applied to the data bus 412. Connected to the address multiplexer 418 is a memory controller 422 to refresh the memory and to select the appropriate memory devices for data accessing.

Also connected to the data bus 412 is a floppy disk controller 424 such as Model No. FD1791-02 manufactured by Western Digital, Inc.

Connected to the floppy disk controller 424 is a buffer 426. The buffer 426 is connected over a read data line to a data recovery circuit 428, which in turn generates a read window signal to the floppy disk controller 424 in order to frame the data. This process determines which part of the data stream is relevant for a particular operation. A drive select latch 429 is connected between the data bus 412 to a connector 430, the output of which in turn is applied to floppy disk drives, not shown. A buffer 431 is connected between the floppy disk drive connector 430 and the data bus 412 for reading status of the disk drives.

A DMA controller 432 is connected over a local data bus D0-D7 through a latch 433 to the upper eight bits of the address bus 414. The DMA controller 432 is also connected to a temporary memory data holding register 434 which in turn is connected to the data bus 412. The DMA controller 432 is also connected via a buffer 436 and the lower eight bits of the address bus 416 to a boot PROM 438. The boot PROM 438 is also connected to the data bus 412.

A buffer 440 is connected to the data bus 412, and another buffer 442 is connected to the lower eight bits of the address bus 416. A third buffer 444 is connected to the control bus over lines READ and WRITE. All three of these buffers 440, 442 and 444 are connected to the hard disk controller interface connector 446.

An interrupt arbitration circuit 448 is connected to the microprocessor 410. The interrupt arbitration circuit 448 arbitrates interrupt signals that can be generated from either the DMA controller 432, the hard disk controller interface 446, the floppy disk controller 424, or a dual channel asynchronous receiver/transmitter (DART) 452, manufactured by Zilog, Inc. as Model No. Z-8470. The DART 452 provides standard RS232 compatible serial interface ports, one for a daisywheel printer and the other for general purpose communication. Channel A provides the serial interface through connector J5. This port can be used with a modem. Channel B is a subset of RS232-C, which interfaces to a printer through connector J3. The DART 452 can cause an interrupt under program control. A restart vector is supplied from one of the internal registers. This vector is software programmable. Baud rates for channel A and B are controlled by a timer, as hereinbelow described, output 3 and 2 respectively. An additional I/O port is assigned to assist the controls and status readings on Channels A and B.

A Model No. 8253-5 programmable interval timer 450 is connected both to the microprocessor 410 and to the DART 452. The timer 450 generates a system timing clock and two clocks for the DART to provide various baud rates under software control. The frequency of the clock input to all three counters is 1.8432 MHz. The local data bus D0–D7 is also connected to the timer 450 and to the DART 452. The timer 450 provides an interval signal to the microprocessor 410 and two different clock signals, CLOCK1 and CLOCK0 to the DART 452. Connected to the DART 452 is a buffer 454, the output of which in turn is applied to an RS232 interface 456. Another buffer 458 is also connected to the DART 452 and applied to a printer port 460, which is a serial interface in the preferred embodiment.

The floppy disk processor includes provisions to interrupt under the following condition: when a command is successfully completed by the floppy disk controller 424, when a command is aborted by an error condition by the floppy disk controller 424, when the primary byte count register is exhausted during a DMA data transfer, when the processor issues a force interrupt command to the floppy disk controller 424, at the end of a command packet transfer to the fixed disk controller, not shown, at the completion of a command execution from the fixed disk controller, or when an interrupt request is received from the DART 452 as a consequence of one of various conditions set by software. When any of the foregoing conditions occurs, the INT line to the processor is activated. When the processor responds by activating the INTA line, the controller 424 sends a RST1 instruction onto the data bus. The disk software includes an interrupt vector at location 8 (hex). In case of an interrupt from the fixed disk controller, an RST2 instruction is generated, rather than an RST1 signal. The DART 452 causes an RST3 (software) signal in the interrupt sequence.

The processor resets the interrupt logic by interrogating the controller's status registers for the floppy disk controller 424 and the DMA controller 432. Both of the controller's status registers must be examined in the service routine to clear an interrupt which may have been generated by two of the above conditions.

The master processor generates an RST 5.5 interrupt on the slave processor by setting and resetting the control line output port F0, D1. This interrupt is then latched on the slave processor and must be reset by a command via output port F4.

The timer 450 interrupts via a RST 7.5 signal at a specified interval depending on the mode and initial count value.

An interprocessor communciations (IPC) controller 462 is connected to the microprocessor 410 via the microprocessor SOD and SID lines. The IPC controller 462 is also connected to an IPC bus 464. To the IPC bus 464 are connected a buffer 466 from the data bus 412 and upper eight bits of the address bus 414, a latch 468 from the data bus 412, and a buffer 470 also from the data bus 412.

Figure 5:
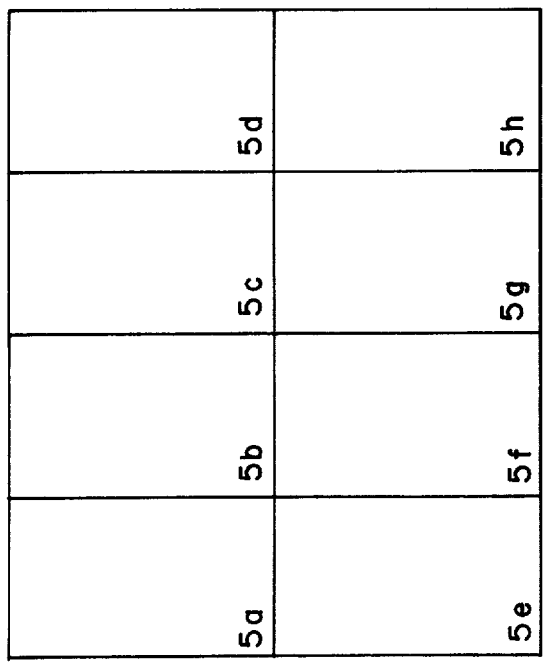
FIG. 5 is an interconnection diagram of FIGS. 5a-5h which when taken together are a schematic representation of the processor, the direct memory access controller and the boot PROM on the floppy disk processor board of the present invention.

Referring now to FIG. 5, there is shown the schematic for the microprocessor 410, the DMA controller 432 and the boot PROM 438.

In operation, when power is first applied to the system, the 512×8 byte boot PROM 438 contains the program which is loaded into the microprocessor 410 over the address bus ports A0-A8. The software code is loaded over data bus ports 01-08 of the boot PROM 438.

During power-up or a system reset condition, a bootstrap operation is performed as follows: A power-up condition or depression of a keyboard RESET button causes the floppy disk controller to activate the POC and MR lines to the processor 410. Processing for the entire system is suspended and all processors are placed in a reset condition. The floppy disk controller activates the BOOT line to the processor 410 and releases the POC line. This causes the floppy disk processor to begin executing code from the boot PROM 438. Bootstrap firmware loads the operating system boot program from the boot PROM 438. The operating system boot program, in turn, loads the operating system, which loads the remaining processor. When all system processors have been loaded, the floppy disk processor releases the MR line. All processors then begin executing from location 0. The bootstrap firmware includes system configuration parameters which it transfers to main memory during the boot operation. Upon completion of the firm bootstrap operation, the bootstrap PROM 438 is inaccessible to the system.

The DMA controller 432 contains four independent channels 0–3, each having four sets of 16-bit registers: base address, current address, base word count and current word count. The base address and base word count registers must be initialized prior to a data transfer operation. Channel 1 is dedicated to floppy disk data transfers. Channel 0 is assigned for a hard disk controller interface. Channels 2 and 3 are used for memory to memory transfer. Additional registers, status, command, temporary, mode, mask and request, are used for other DMA operation controls.

When a data transfer begins, a data request signal is generated to the DMA controller 432 which then sends a HOLD request to the processor 410. The processor 410 responds to the HOLD signal by returning a HOLD acknowledge signal. The DMA controller 432 then transfers a single byte to or from the memory, increments the current address counter, decrements the current word counter and releases the HOLD request line.

The transfer continues until one of the following conditions is met: the floppy disk controller ceases to generate data transfer request, the hard disk controller, not shown, ceases to generate data transfer requests, or the current word count is exhausted.

The DMA controller 432 can be autoinitialized by setting an autoinitialization enable bit in a mode register. The data transfer is performed in the same manner as in the previous mode. When the current word count register is exhausted, the current address and current word count registers are automatically reloaded from the base address and base word count registers, respectively.

Figure 6:
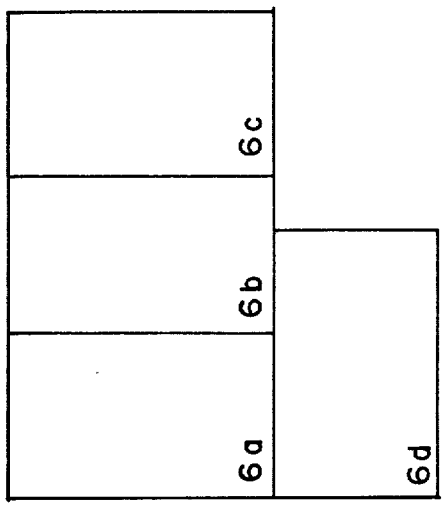
FIG. 6 is an interconnection diagram of FIGS. 6a-6h which when taken together are a schematic representation of the dual asynchronous receiver/transmitter (DART) serial communication controller and the timer on the floppy disk processor board of the present invention.

Referring now to FIG. 6, there is shown the DART 452 which receives two different clock signals from the timer 450. The CLOCK0 signal is output from the timer OUT1 port and is input to the DART TXCA bar and RXCA bar ports. The CLOCK1 signal is output from the timer 450 at port OUT2 and is applied to the DART 452 through input port RXTXCB bar.

The buffer 454 for the RS232 interface is shown generally at reference numeral 454. Similarly the buffer 458 for the printer interface is shown generally at reference numeral 458. Interrupt arbitration circuitry connected to the microprocessor 410 is shown generally at reference numeral 448, and consists primarily of an LS174 latch.

Figure 7:
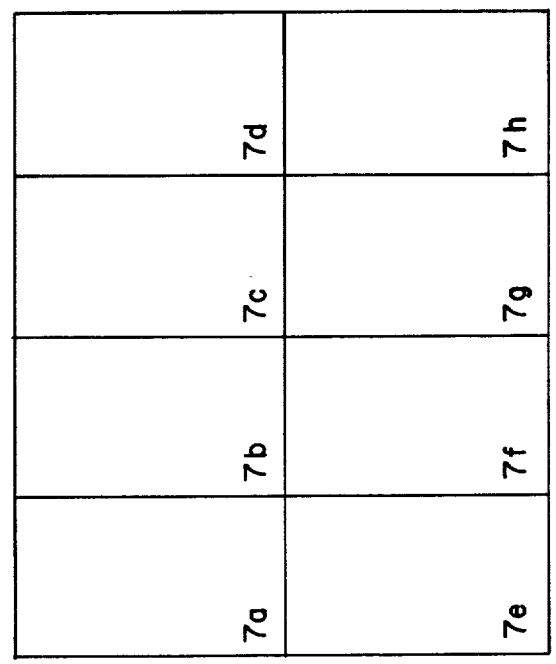
FIG. 7 is an interconnection diagram of FIGS. 7a-7h which when taken together are a schematic representation of the floppy disk processor memory of the present invention.
Figure 4A:
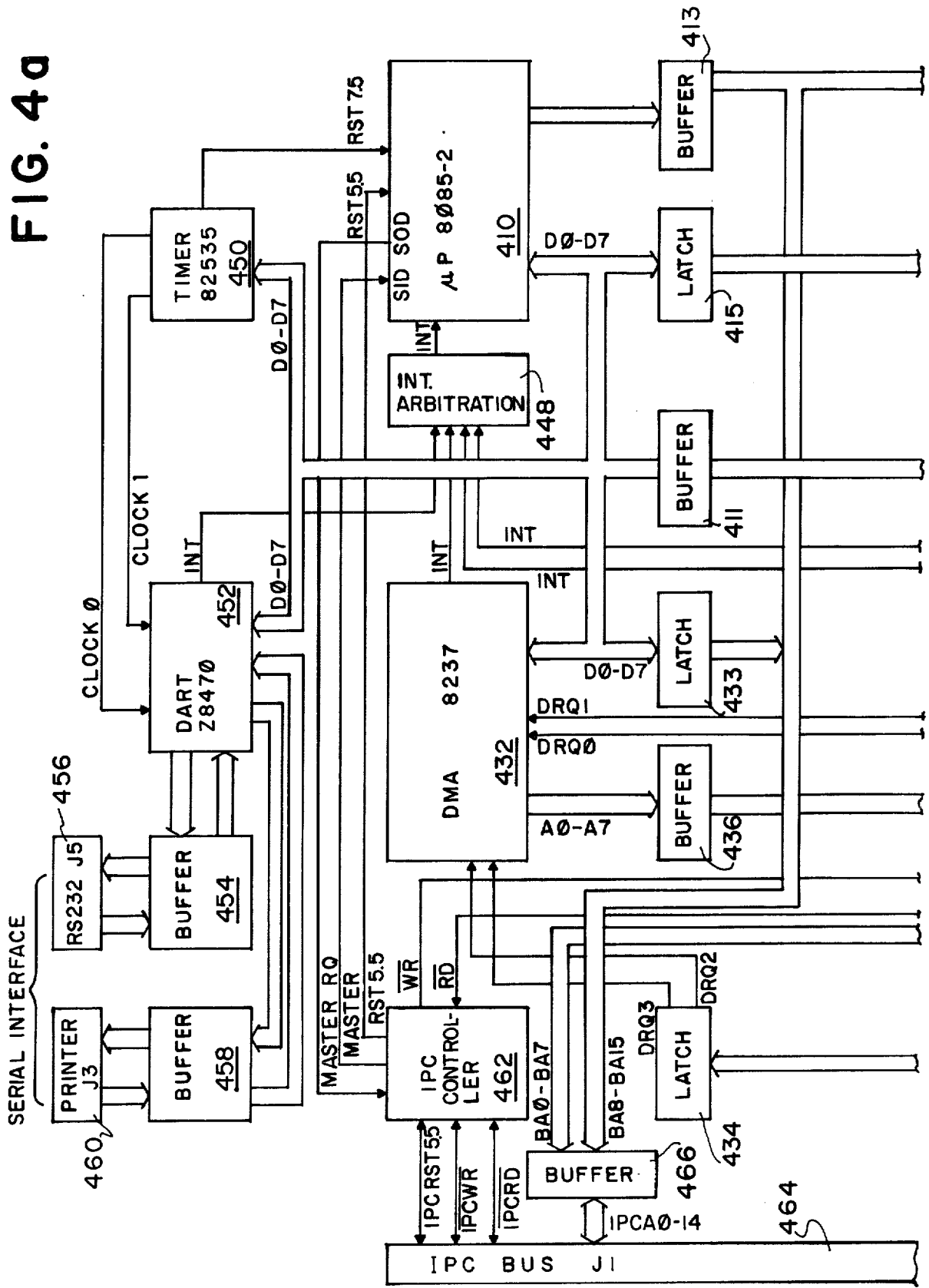
Figure 4B:
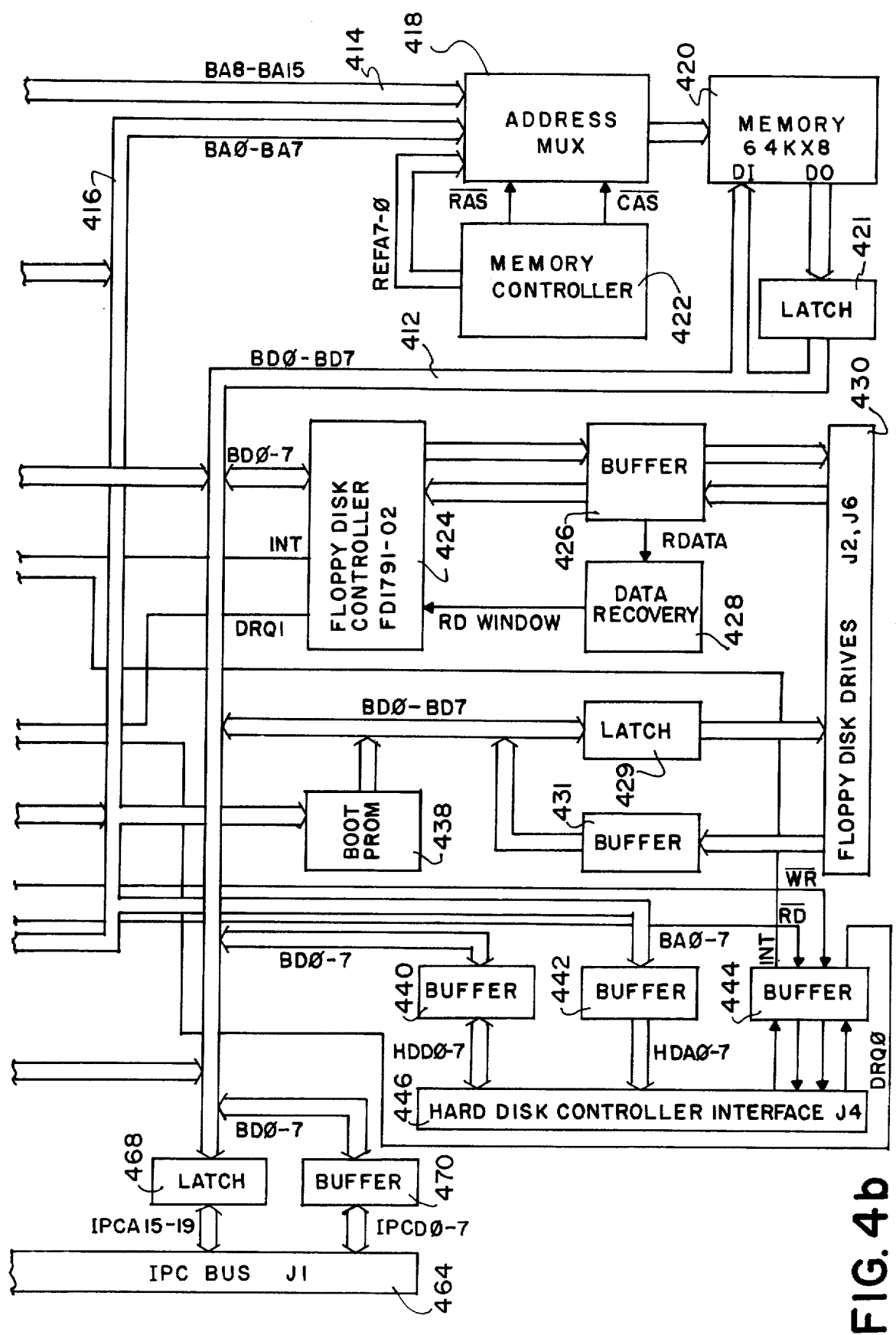
Figure 5A:
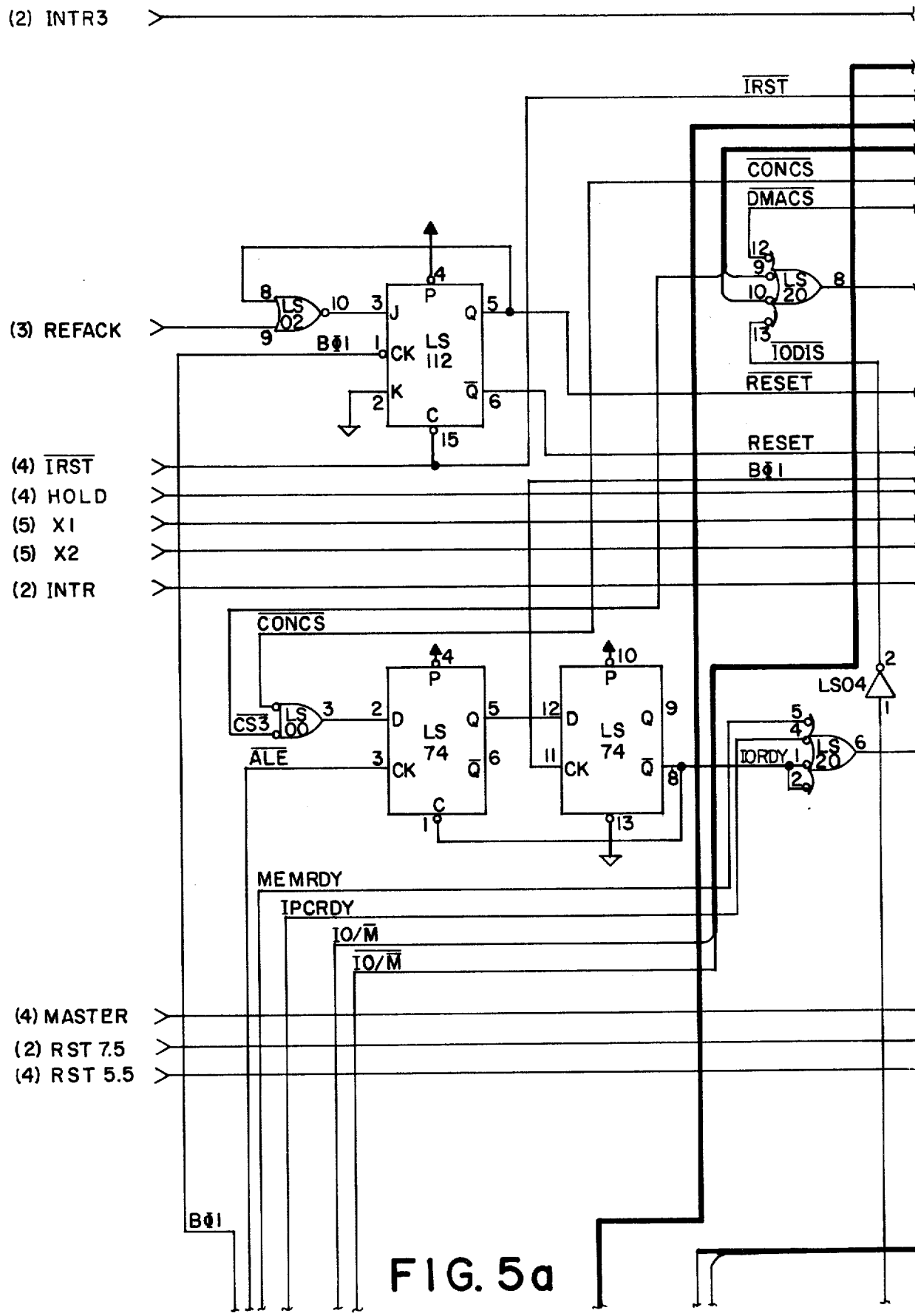
Figure 5B:
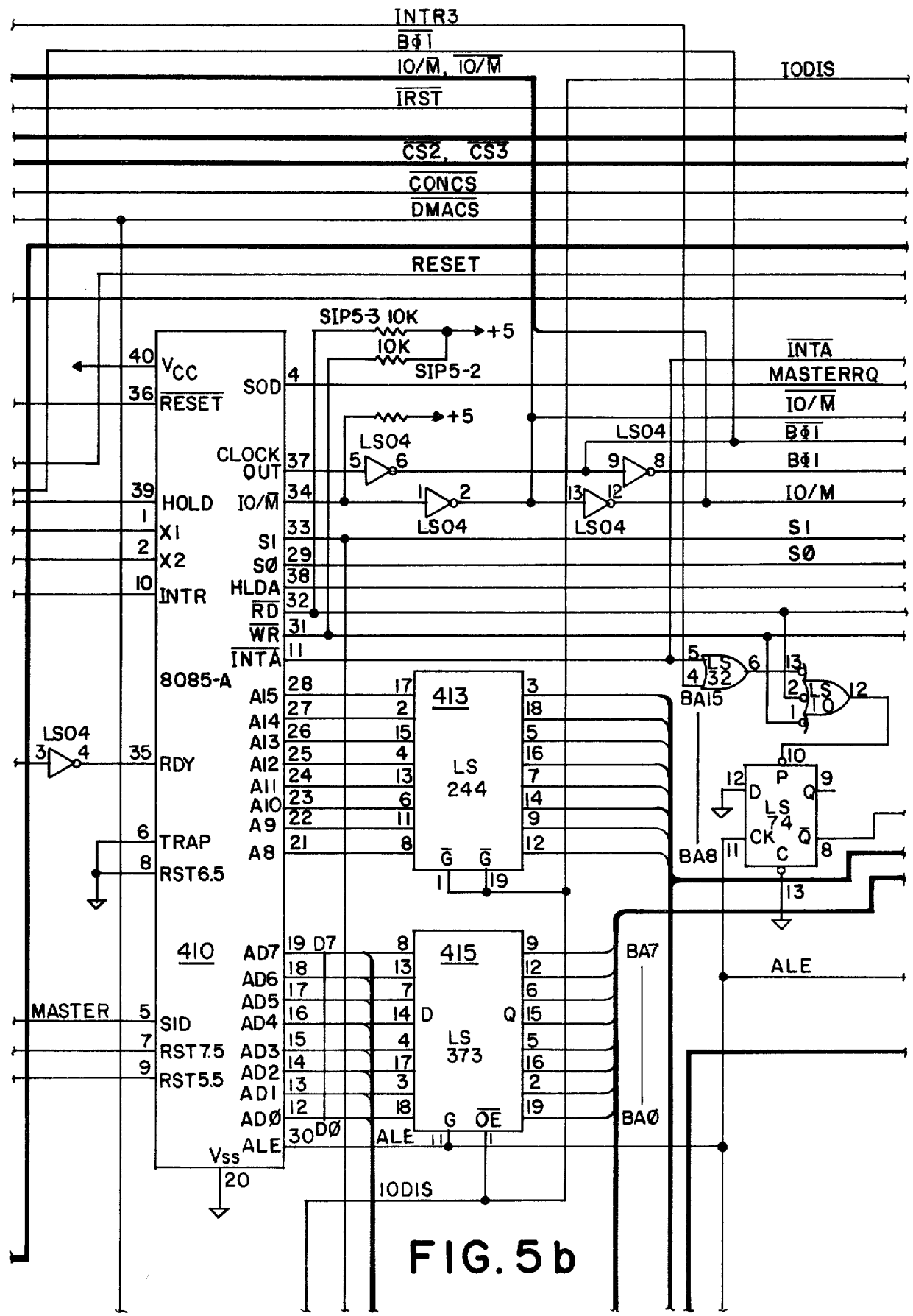
Figure 5C:
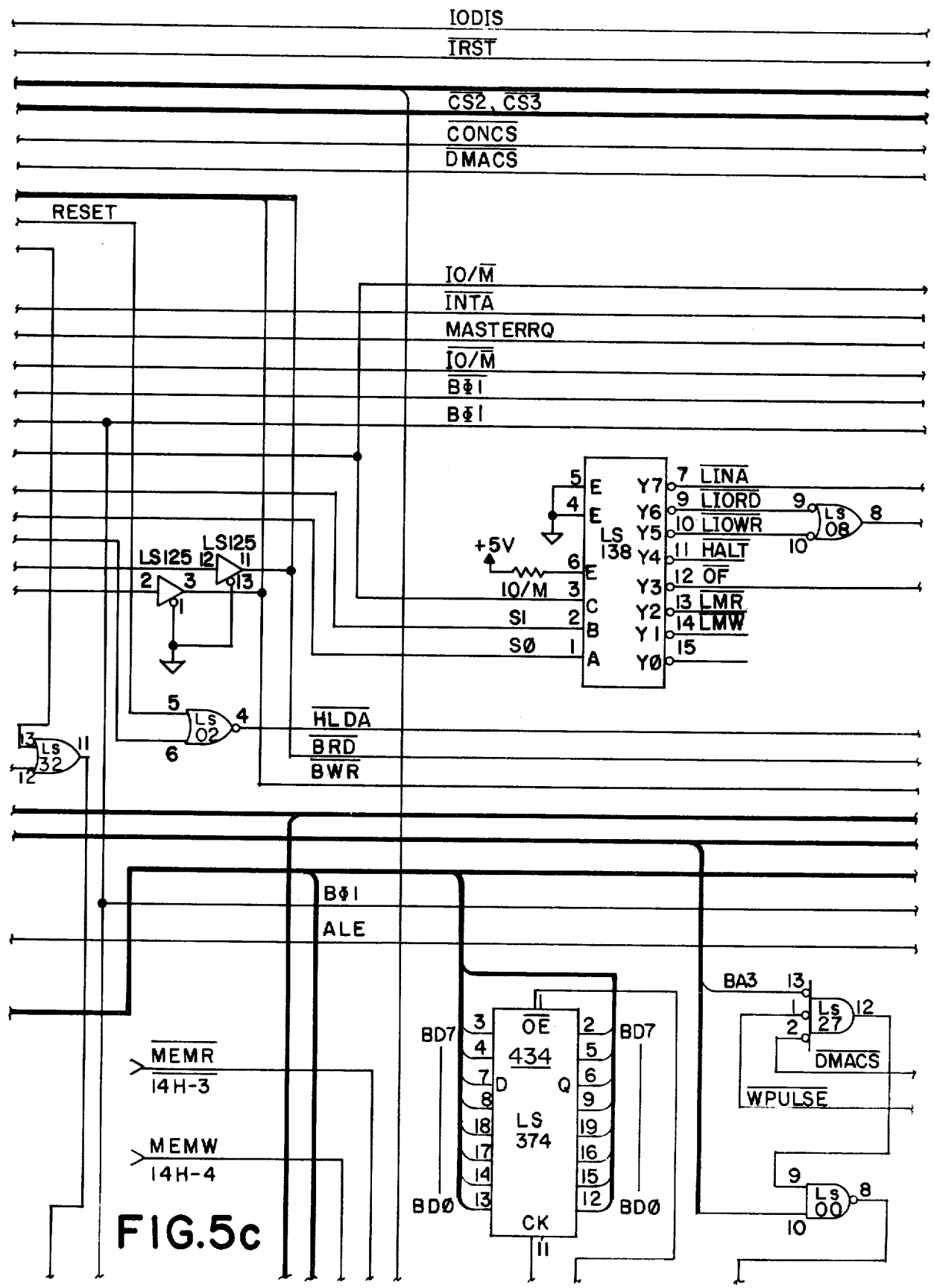
Figure 5D:
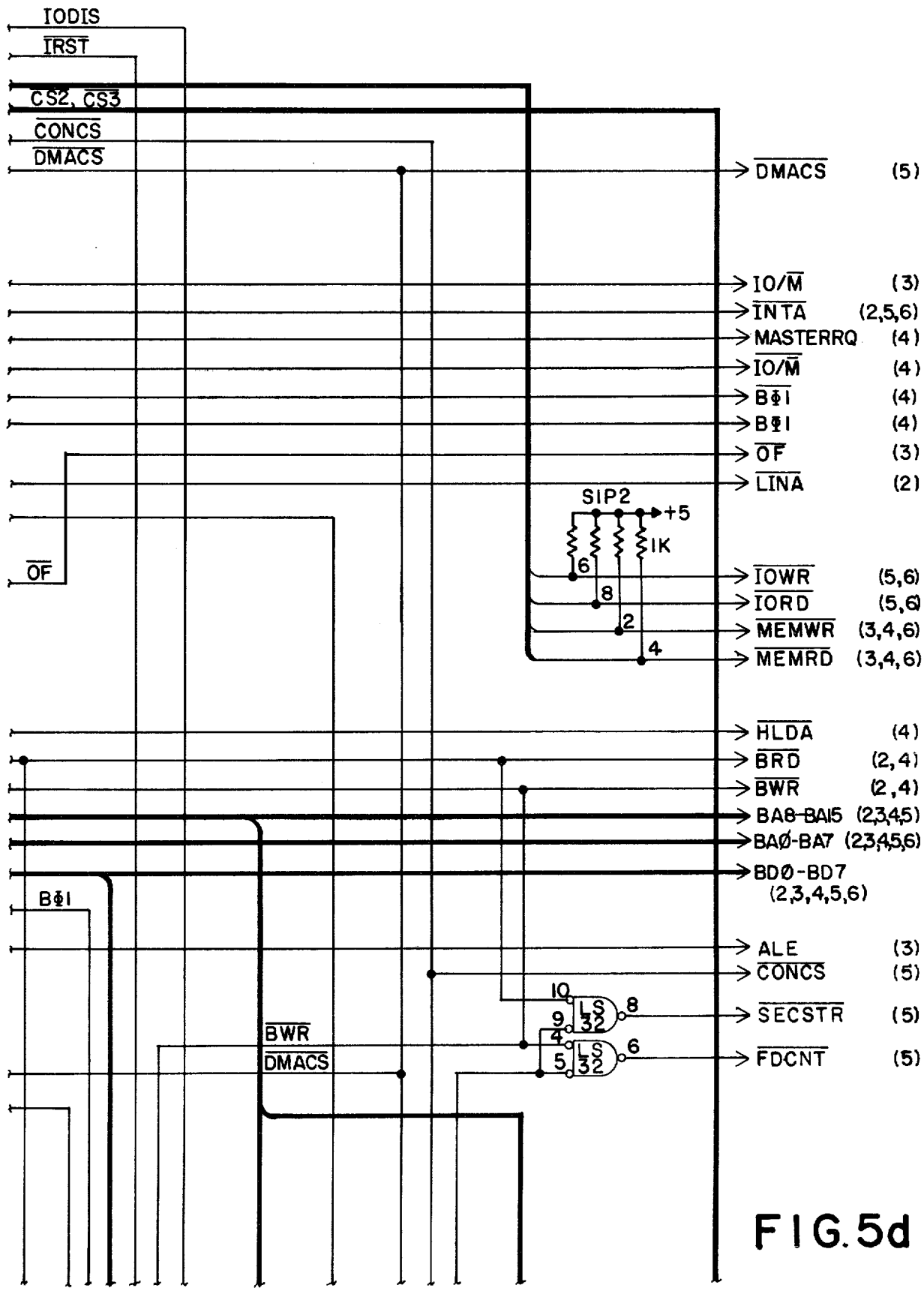
Figure 5E:
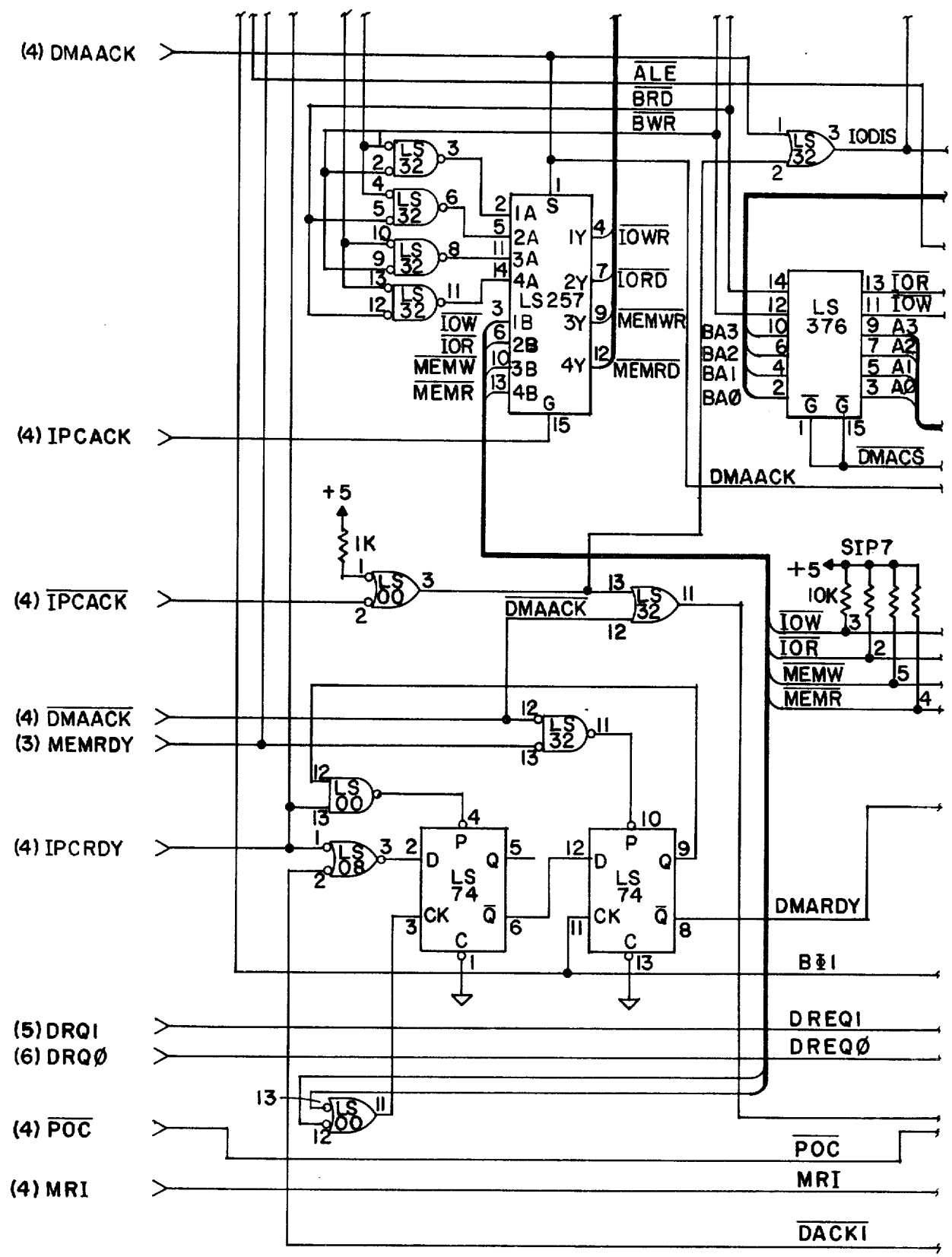
Figure 5A:
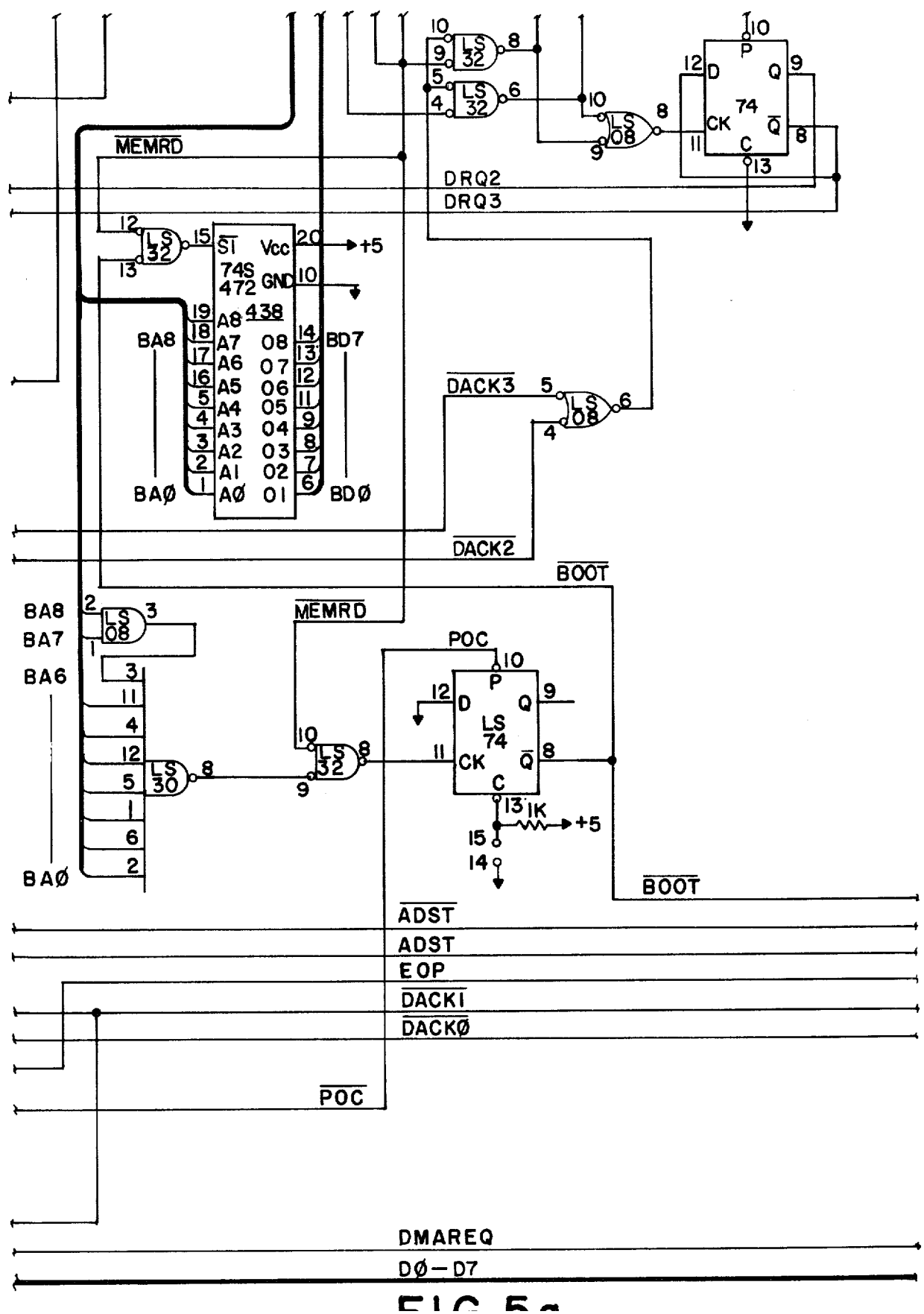
Figure 5H:
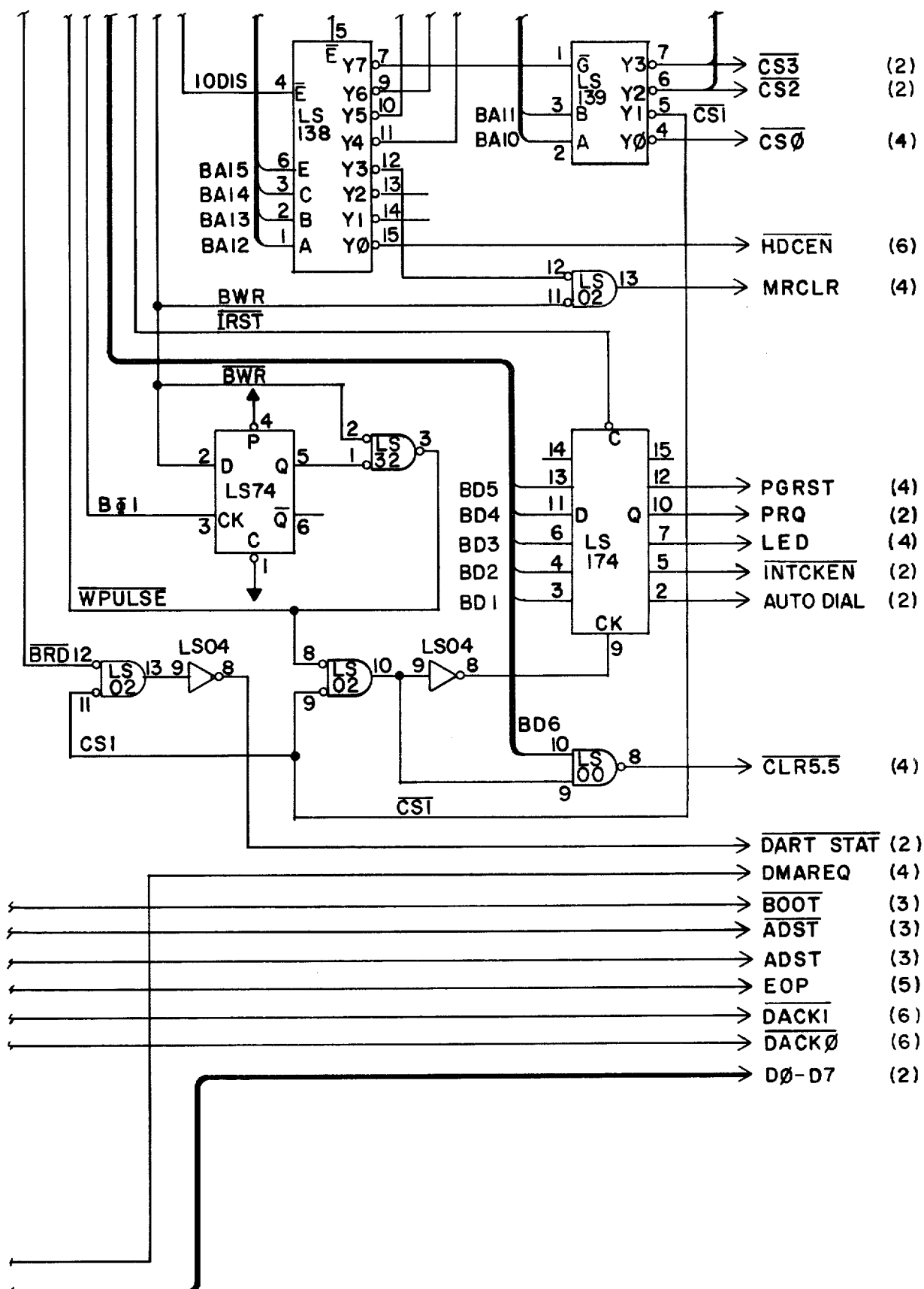
Figure 6A:
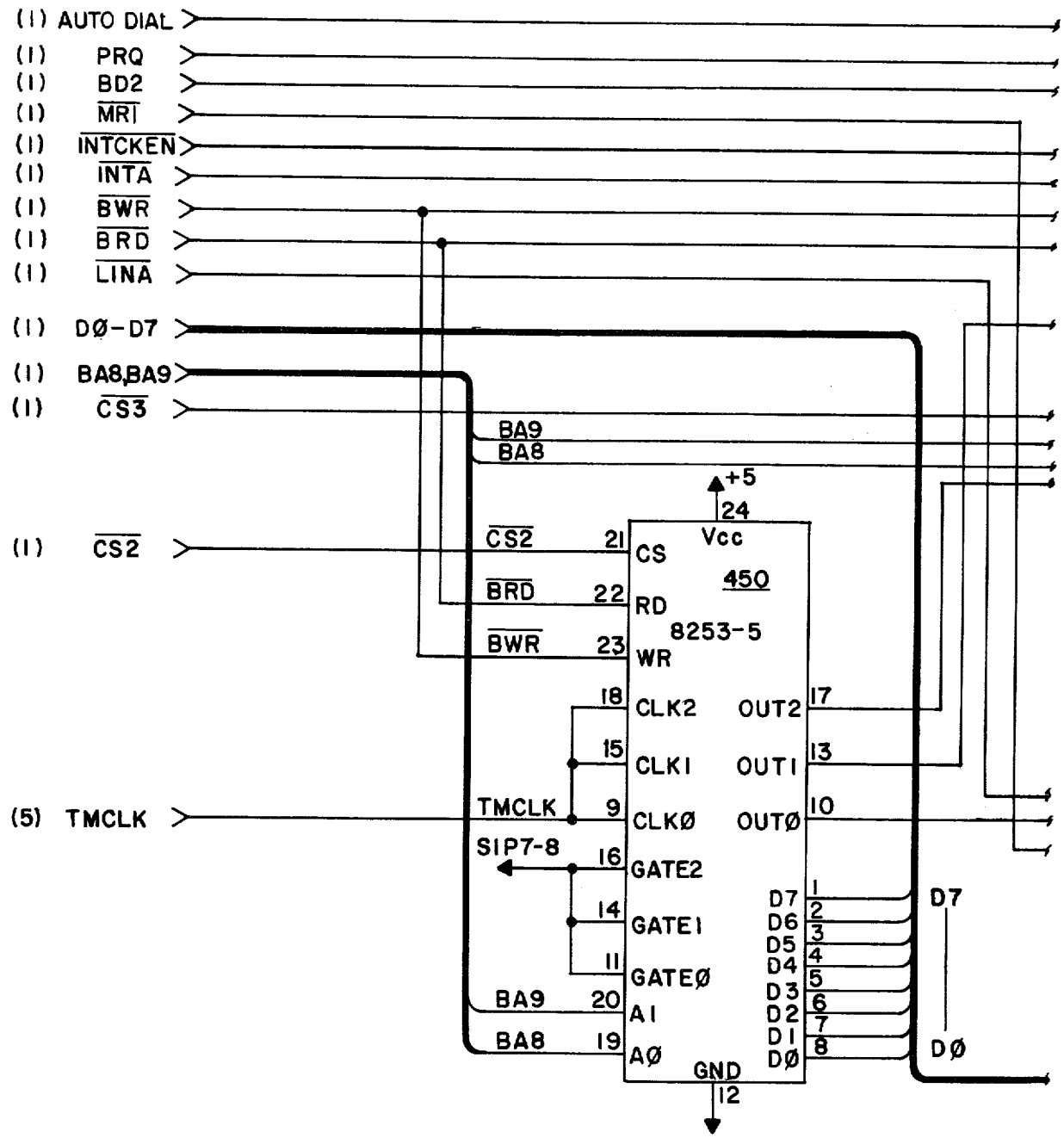
Figure 6B:
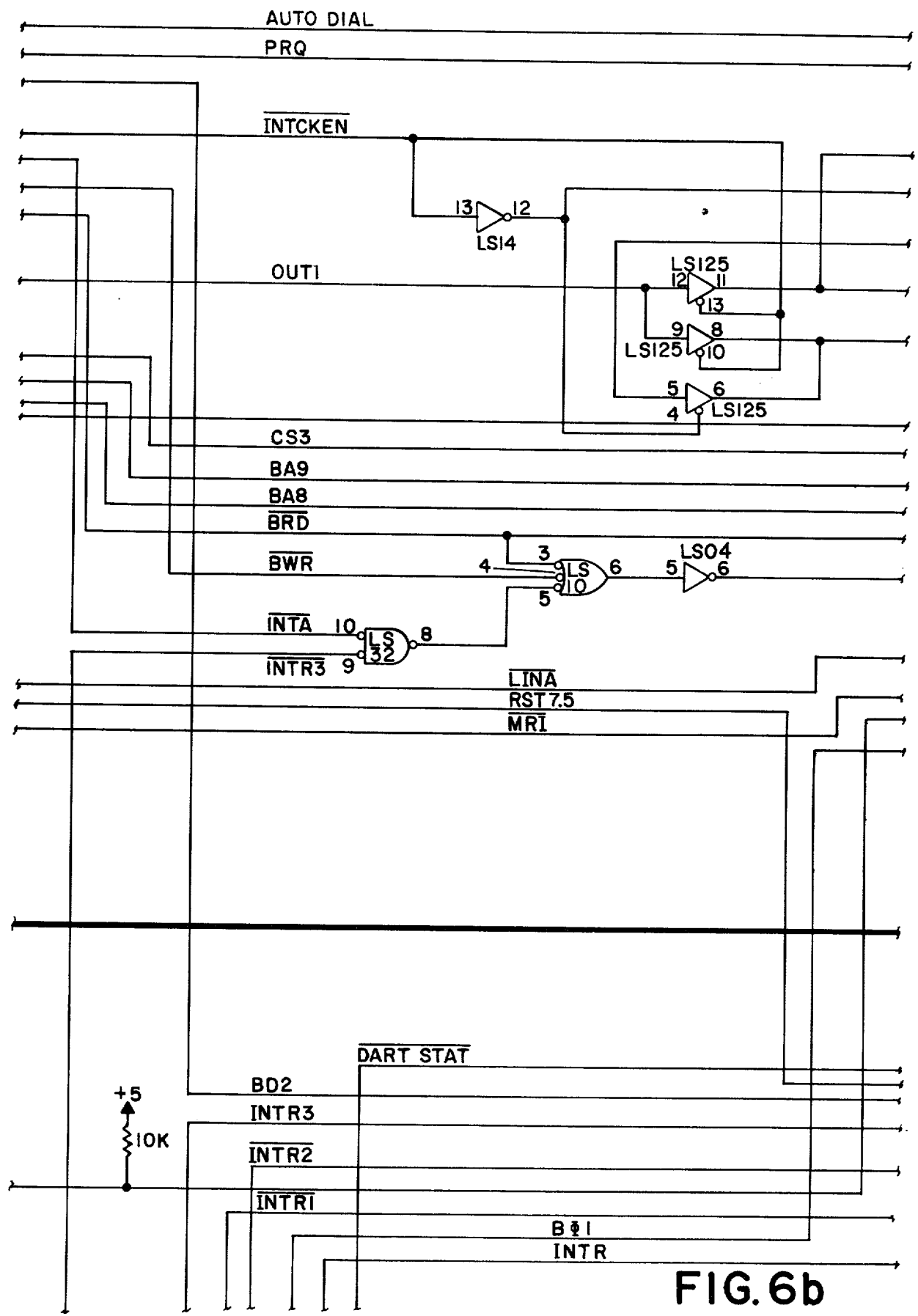
Figure 6C:
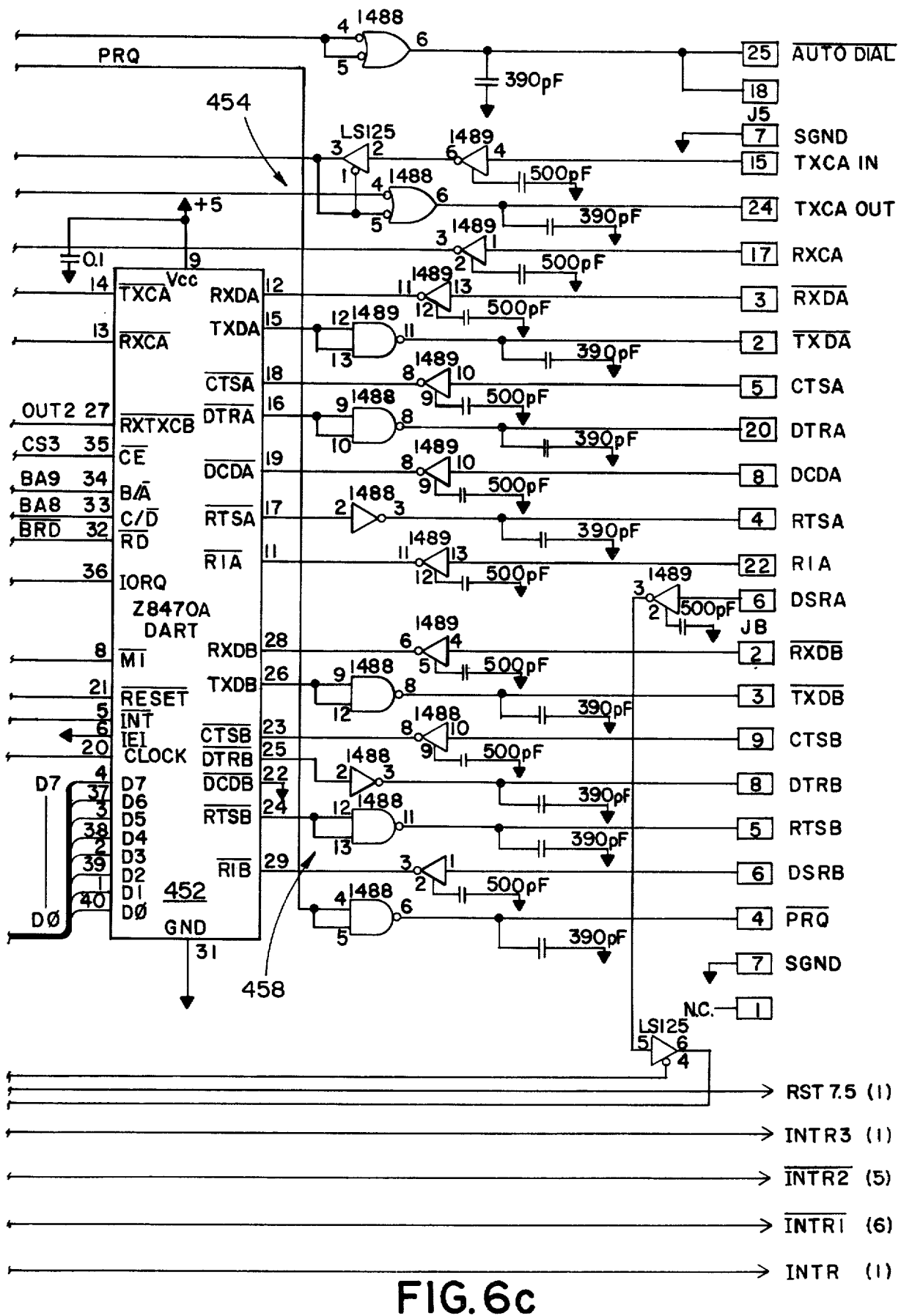
Figure 7A:
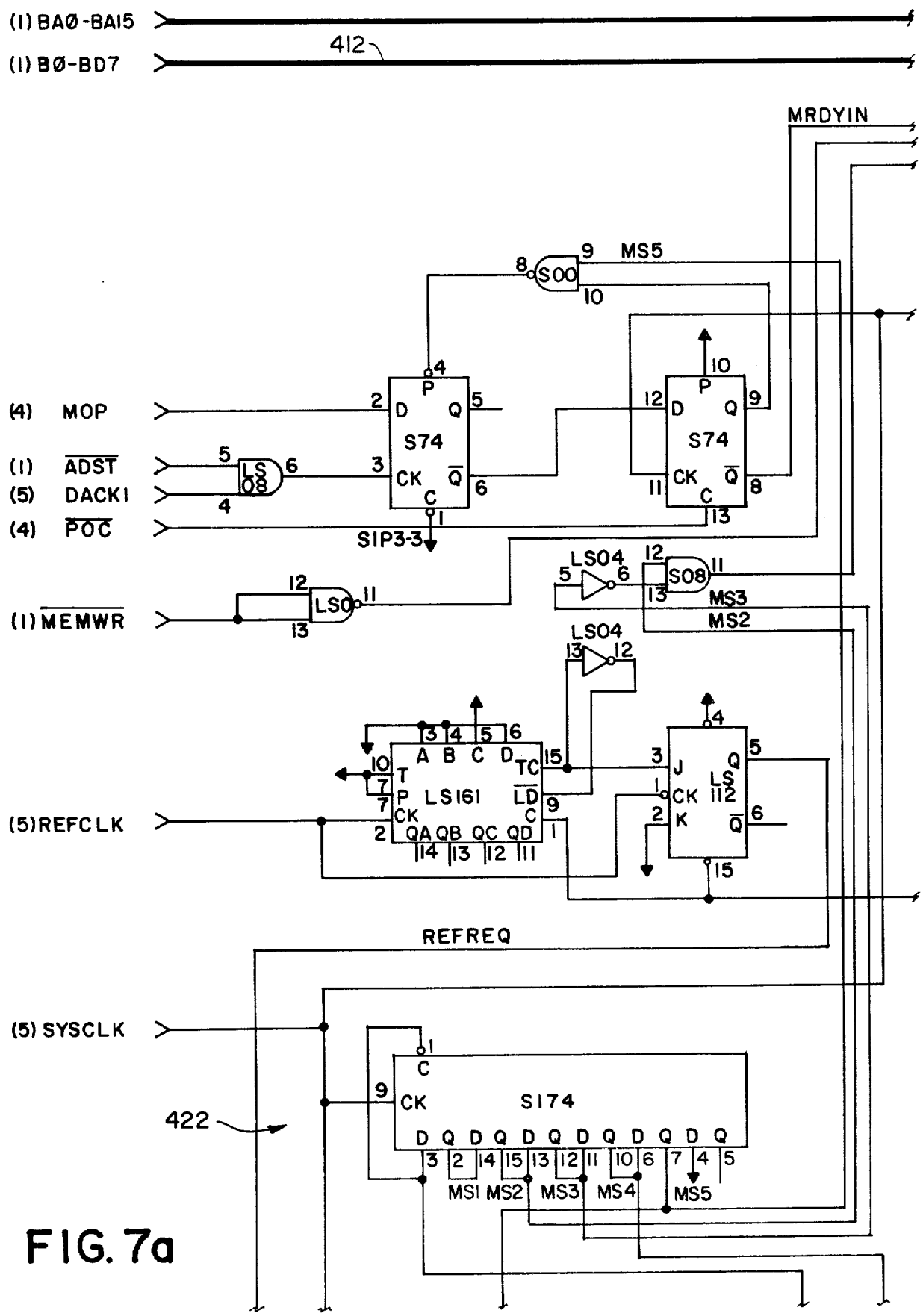
Figure 7B:
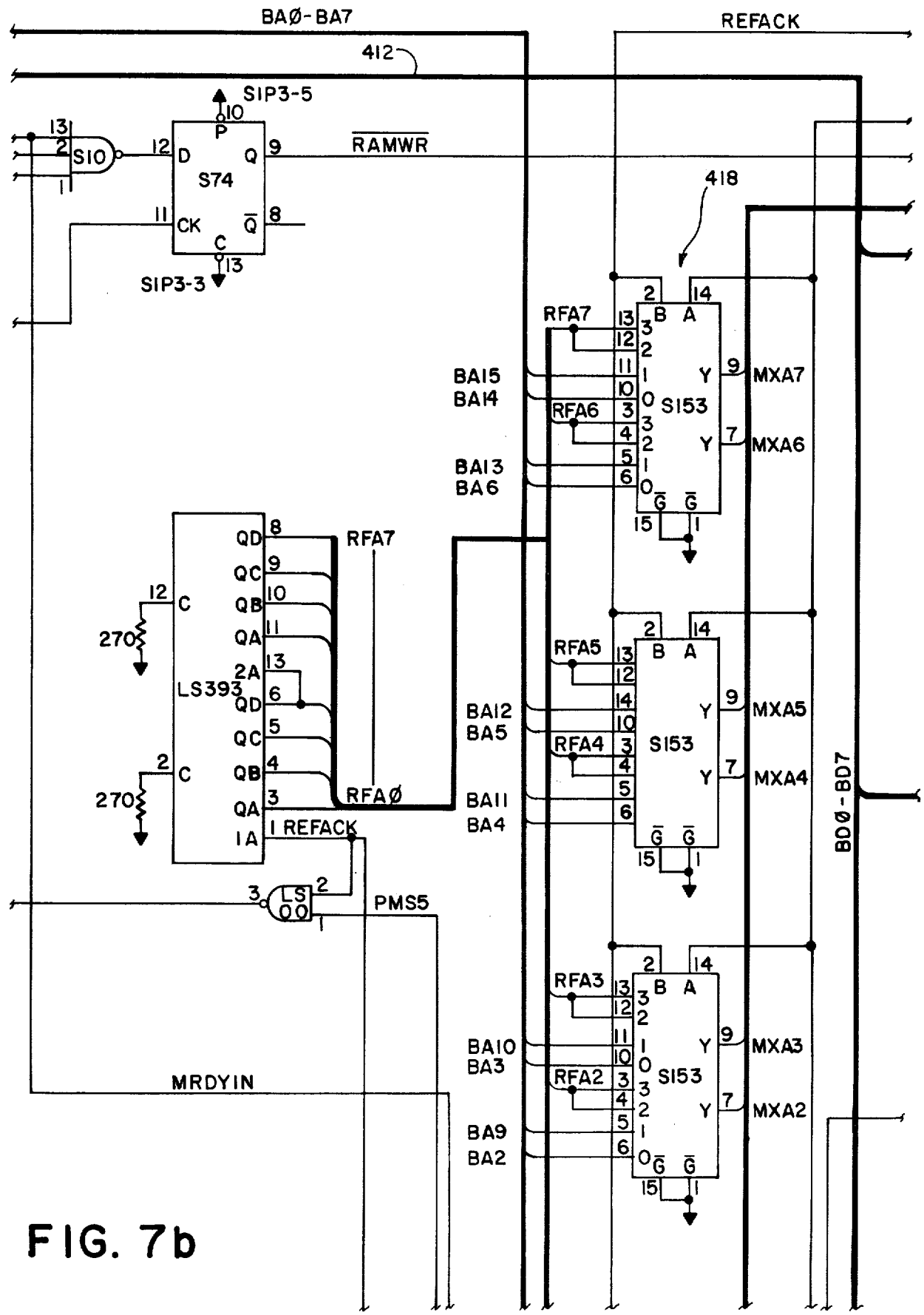
Figure 7C:
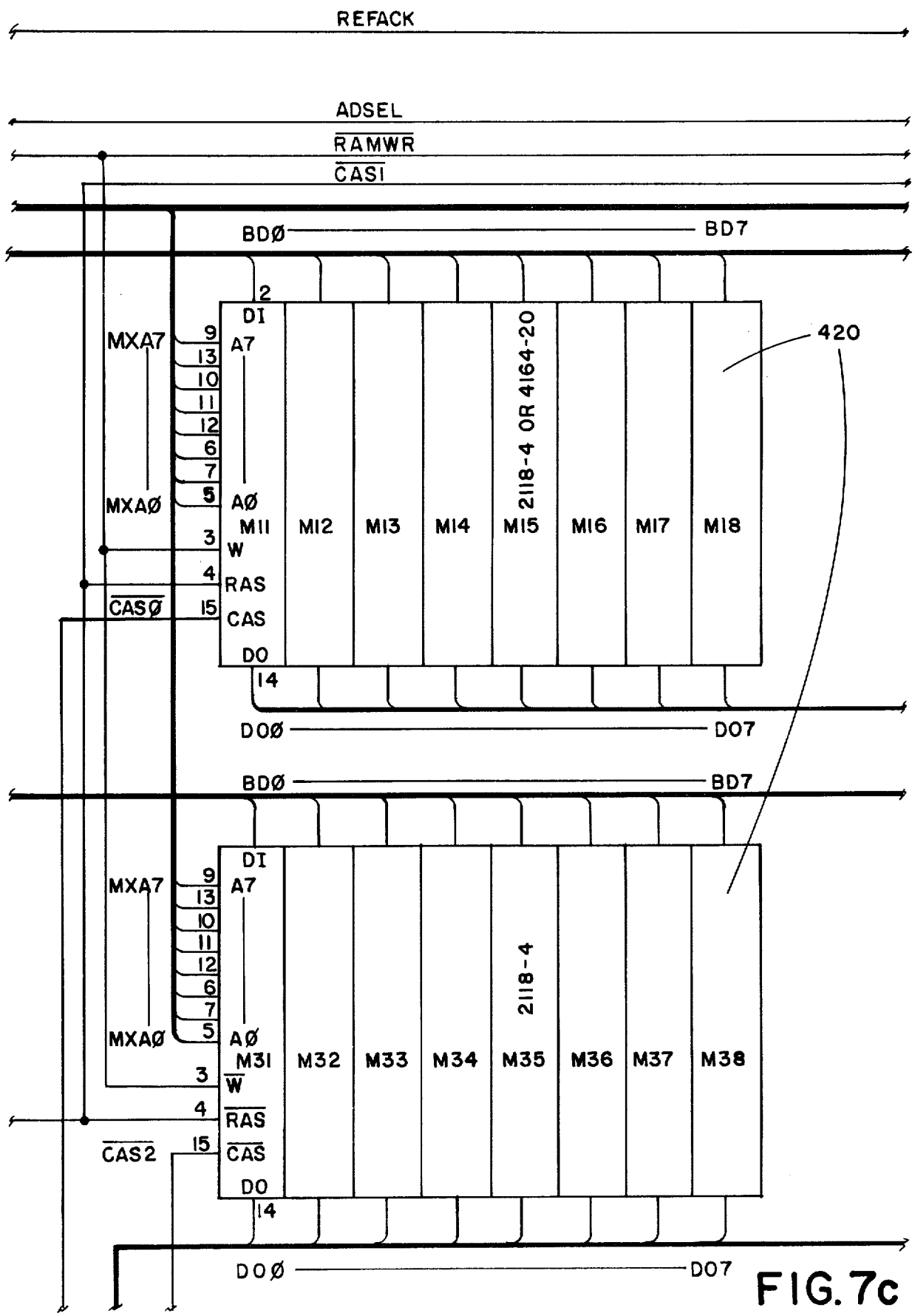
Figure 7D:
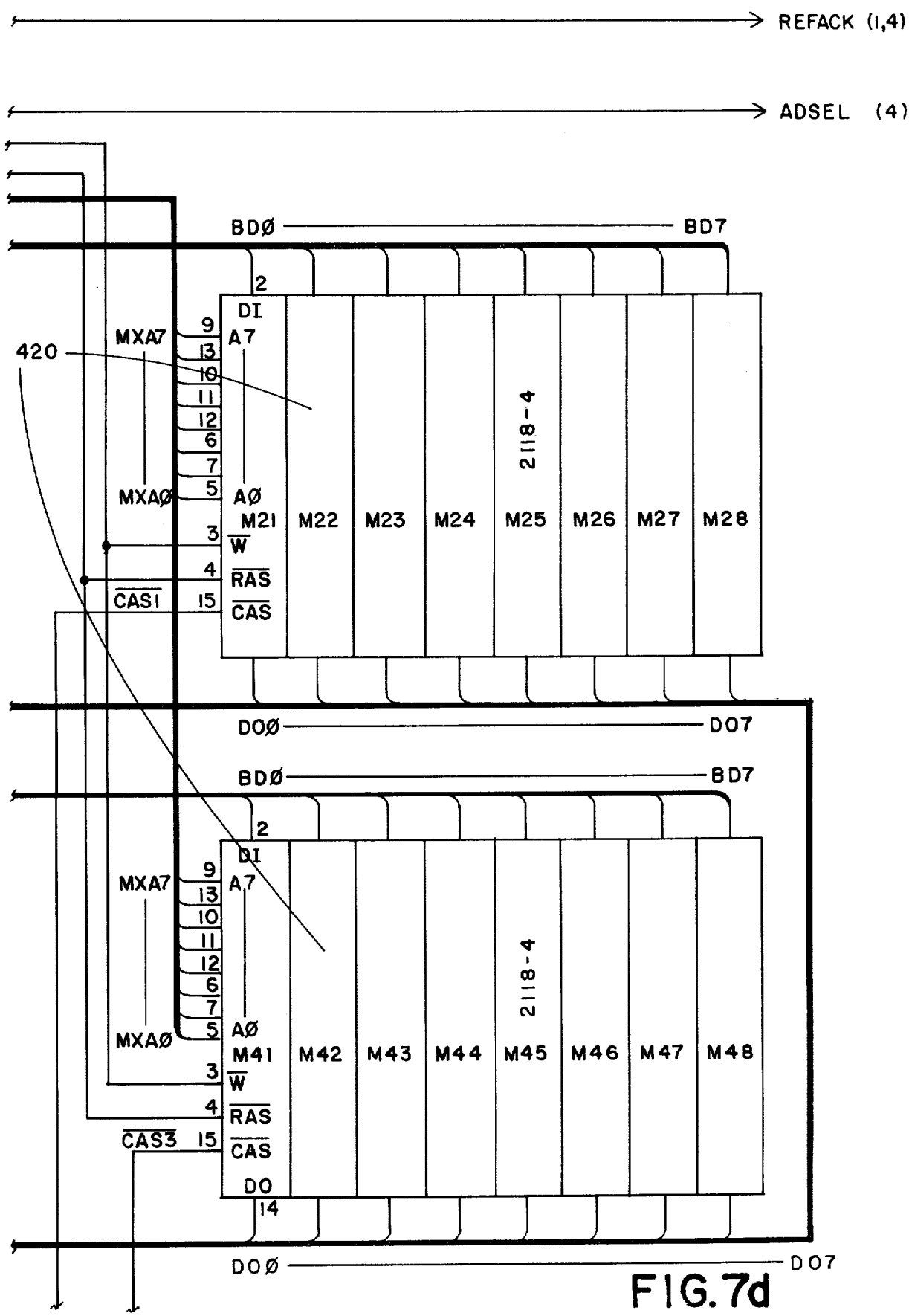
Figure 7E:
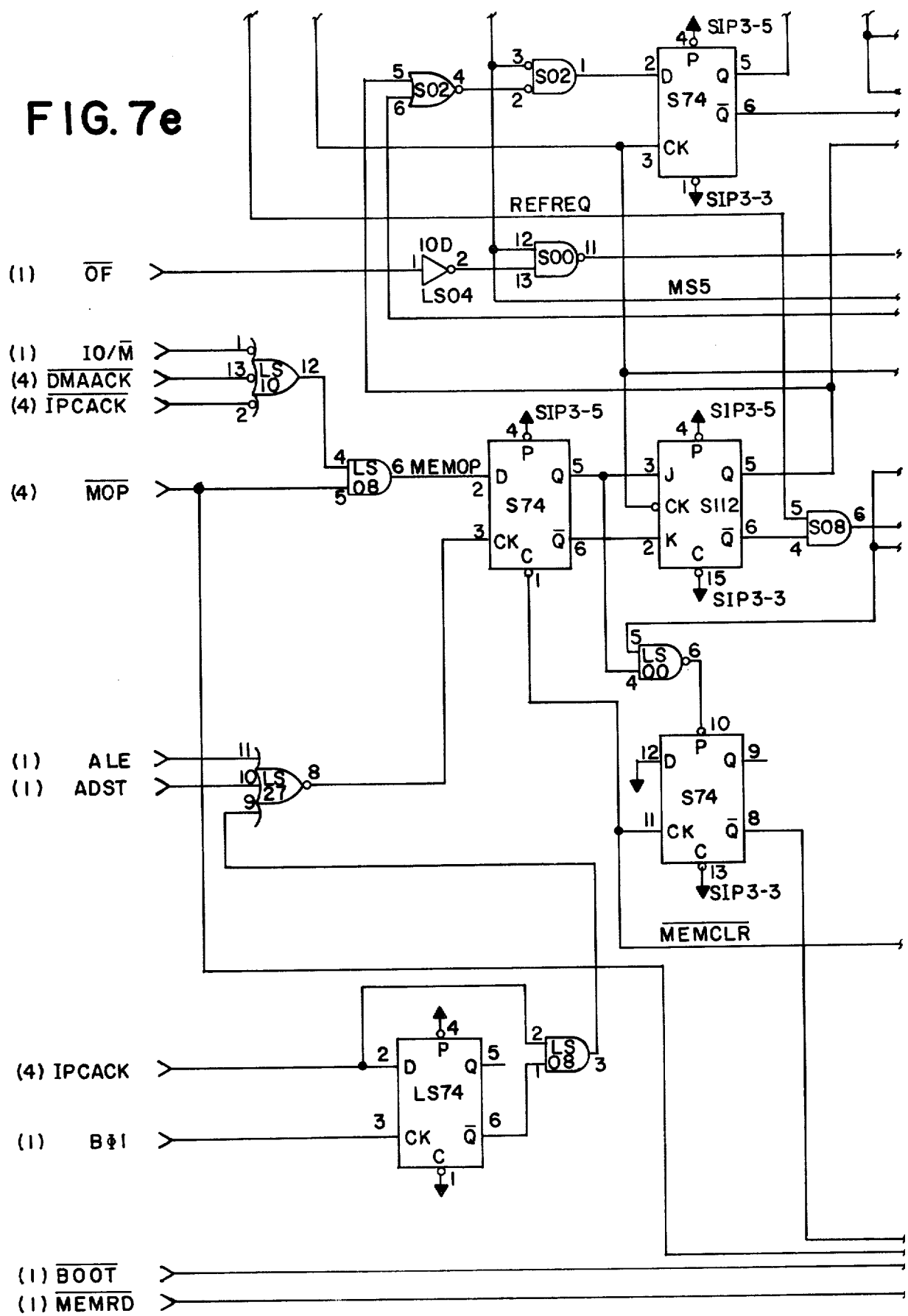
Figure 7F:
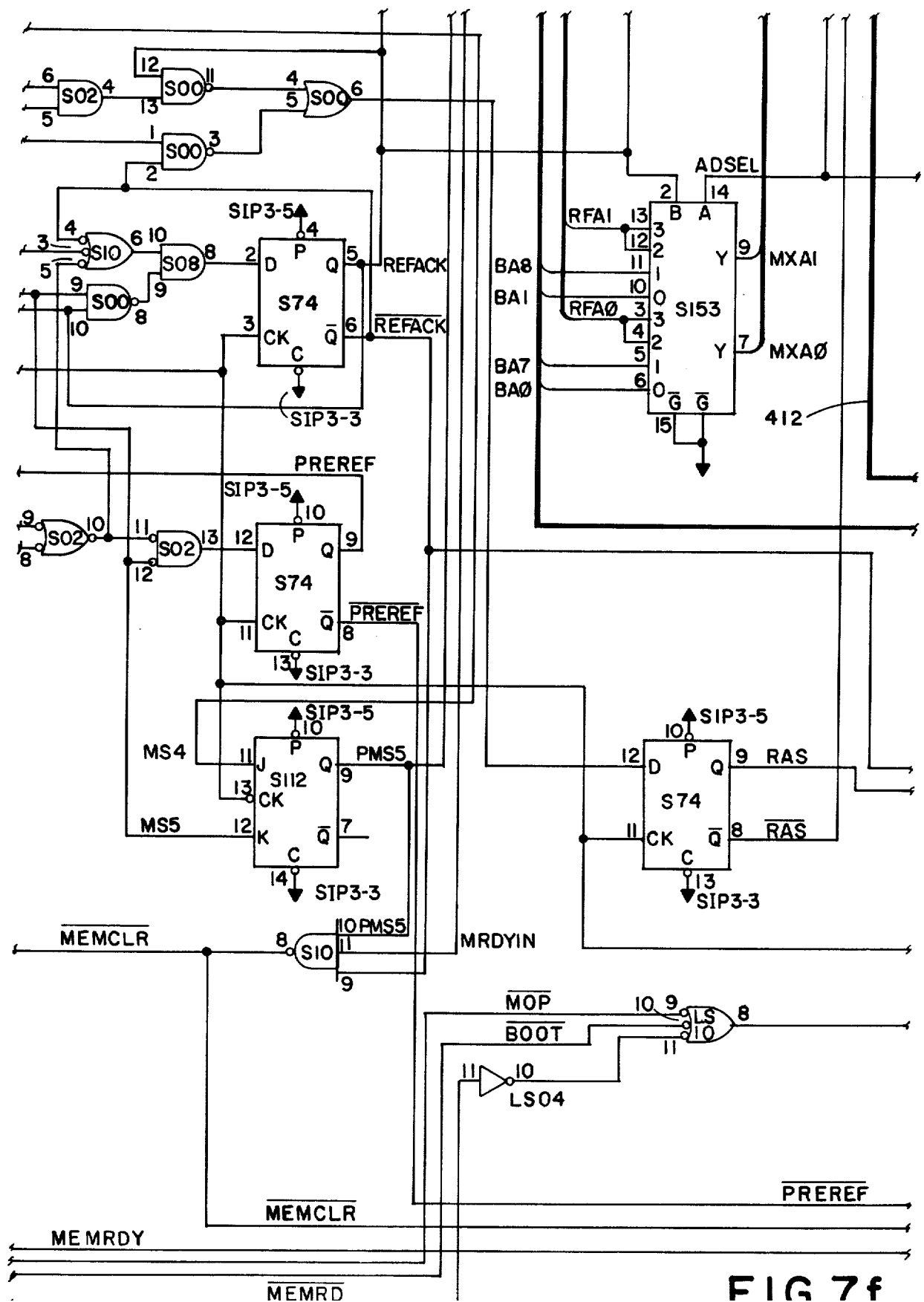
Figure 7G:
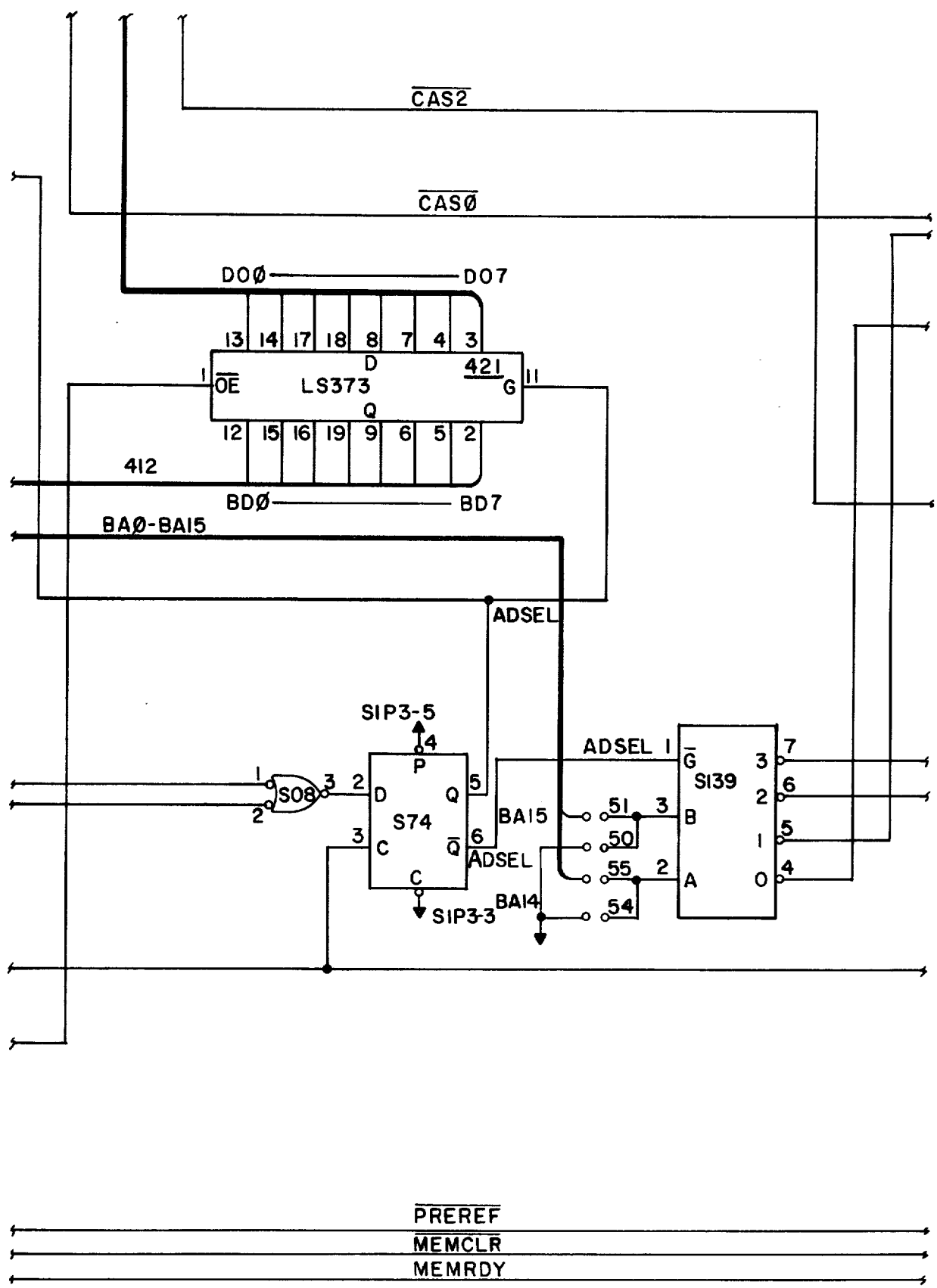
Figure 7H:
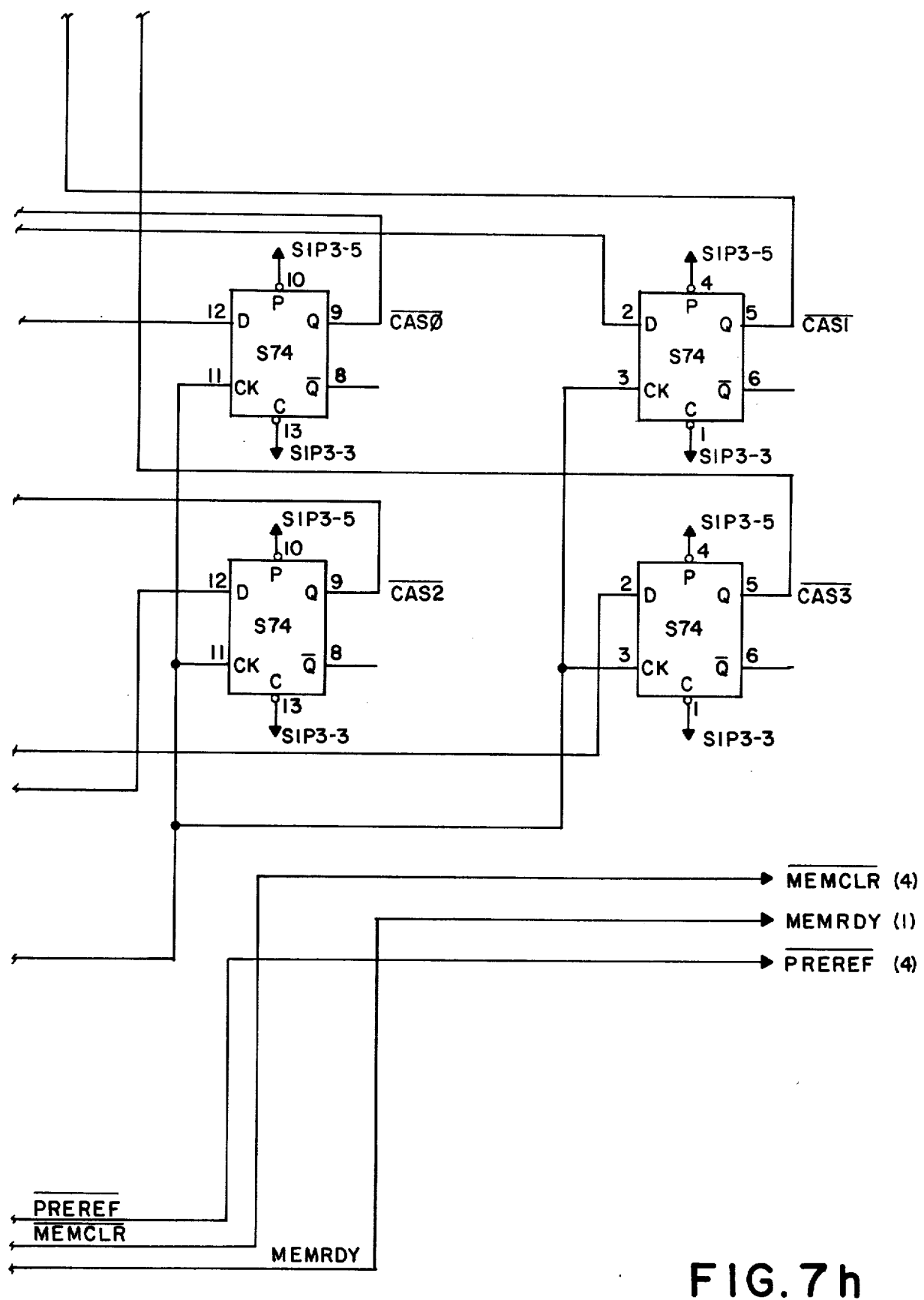

Referring now to FIG. 7, there is shown the random access memory (RAM) 420 which consists of four banks each of eight memory devices. These devices are Model No. 2118-4 supplied by the Intel Corp. Connected to the RAM 420 are address multiplexer devices shown generally at reference numeral 418. A latch 421 is connected between the RAM 420 and the data bus 412.

The remainder of the circuitry shown in this figure is required for memory controller operations. The memory controller is shown generally at reference numeral 422 and includes an S174 shift register and an LS393 counter. Refresh address lines RFA0-RFA7 are used to refresh memory locations in the RAM 420 and are generated by the memory controller circuitry 422.

Figure 8:
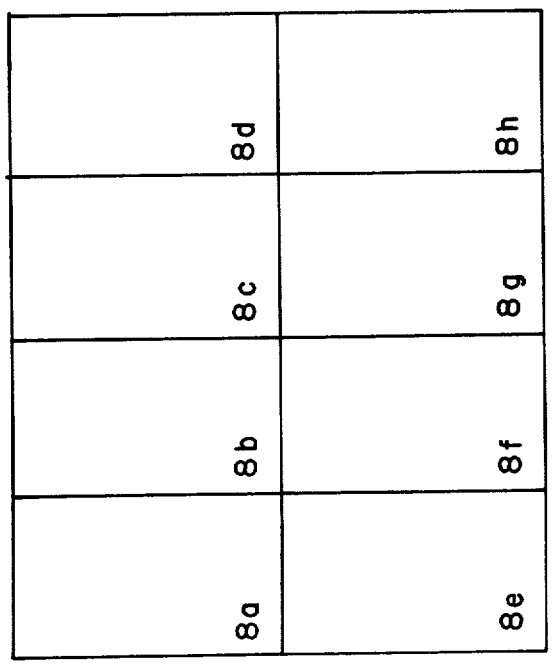
FIG. 8 is an interconnection diagram of FIGS. 8a-8h which when taken together are a schematic representation of the floppy disk processor interprocessor communications controller of the present invention.
Figure 8B:
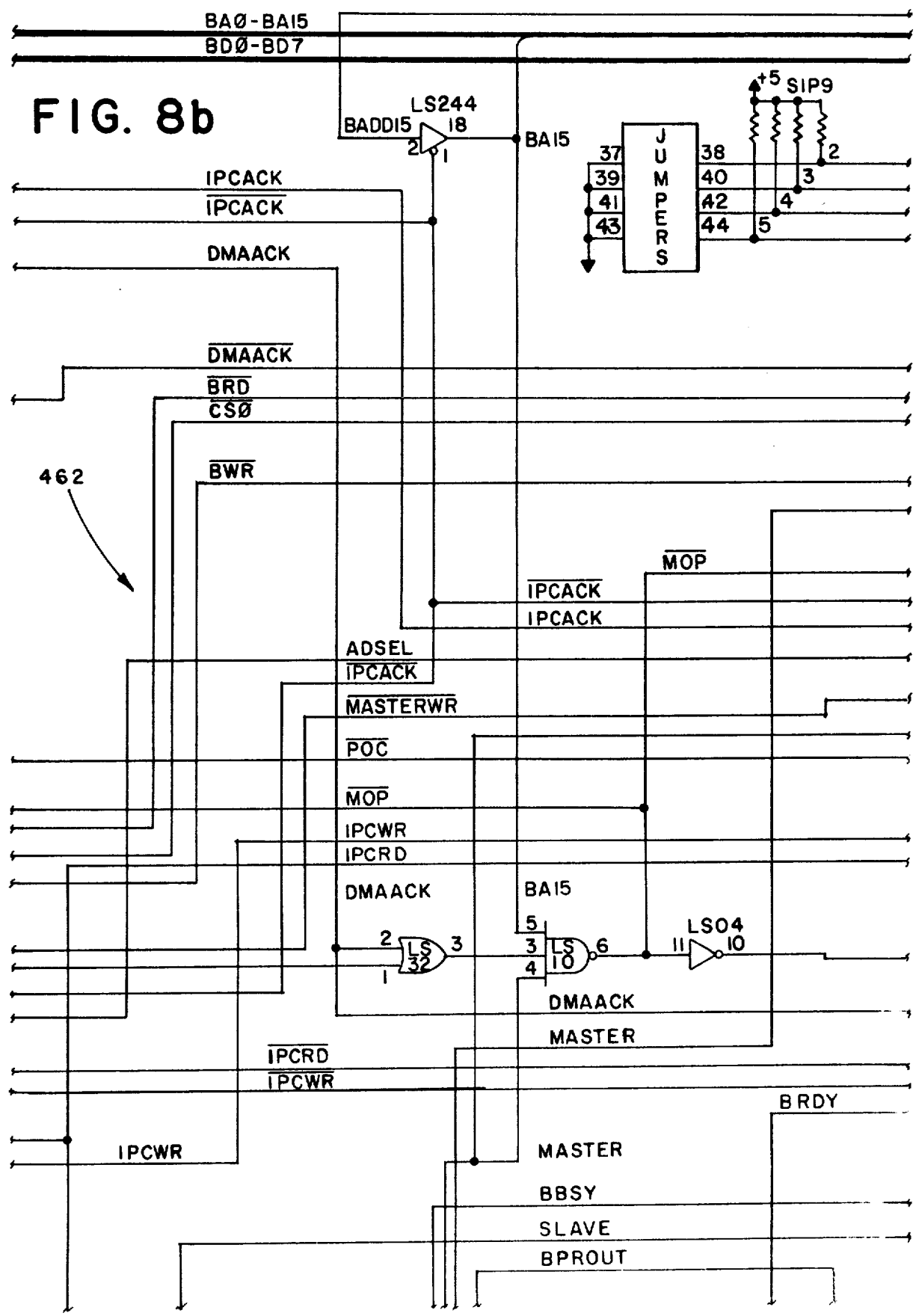
Figure 8C:
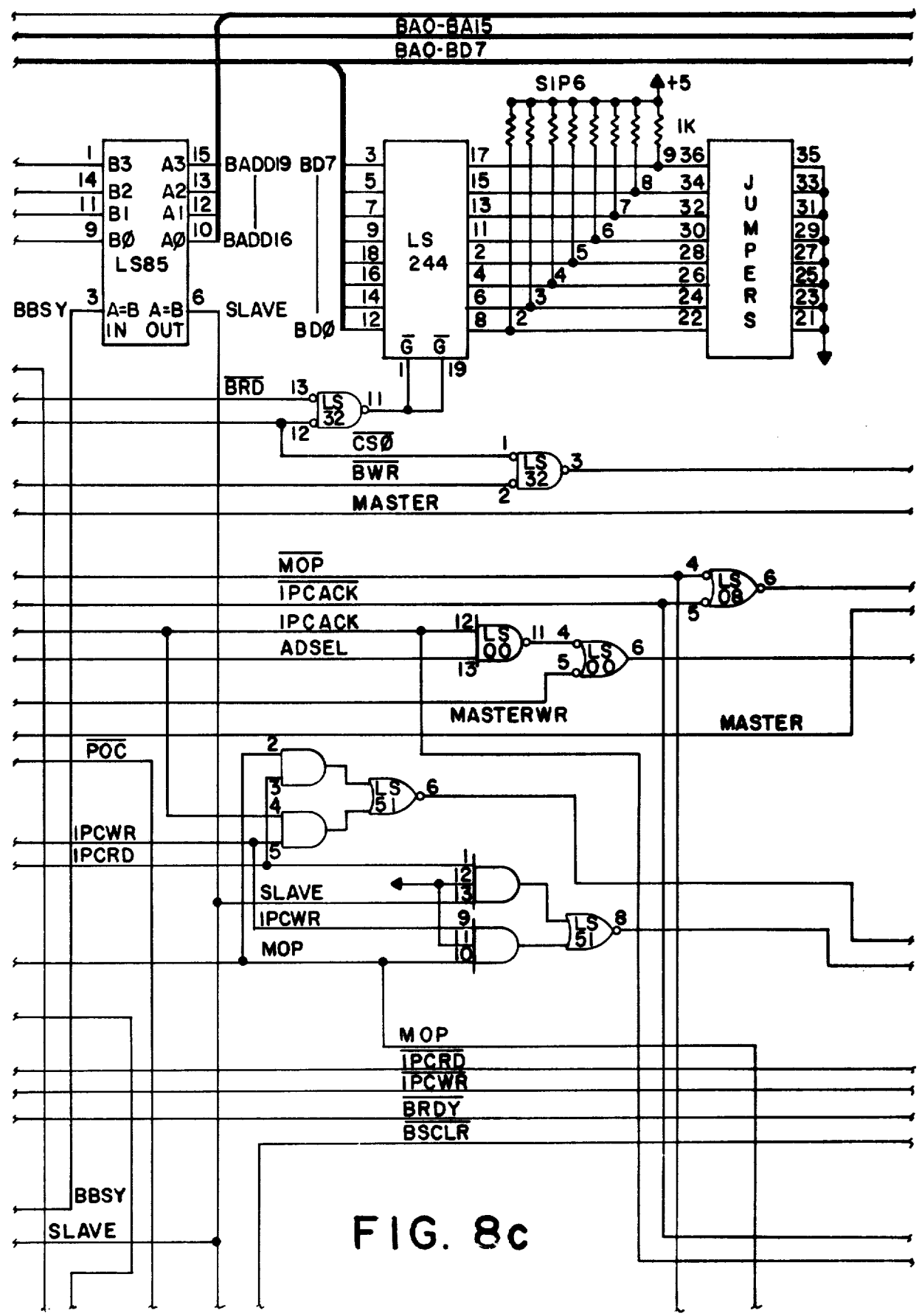
Figure 8D:
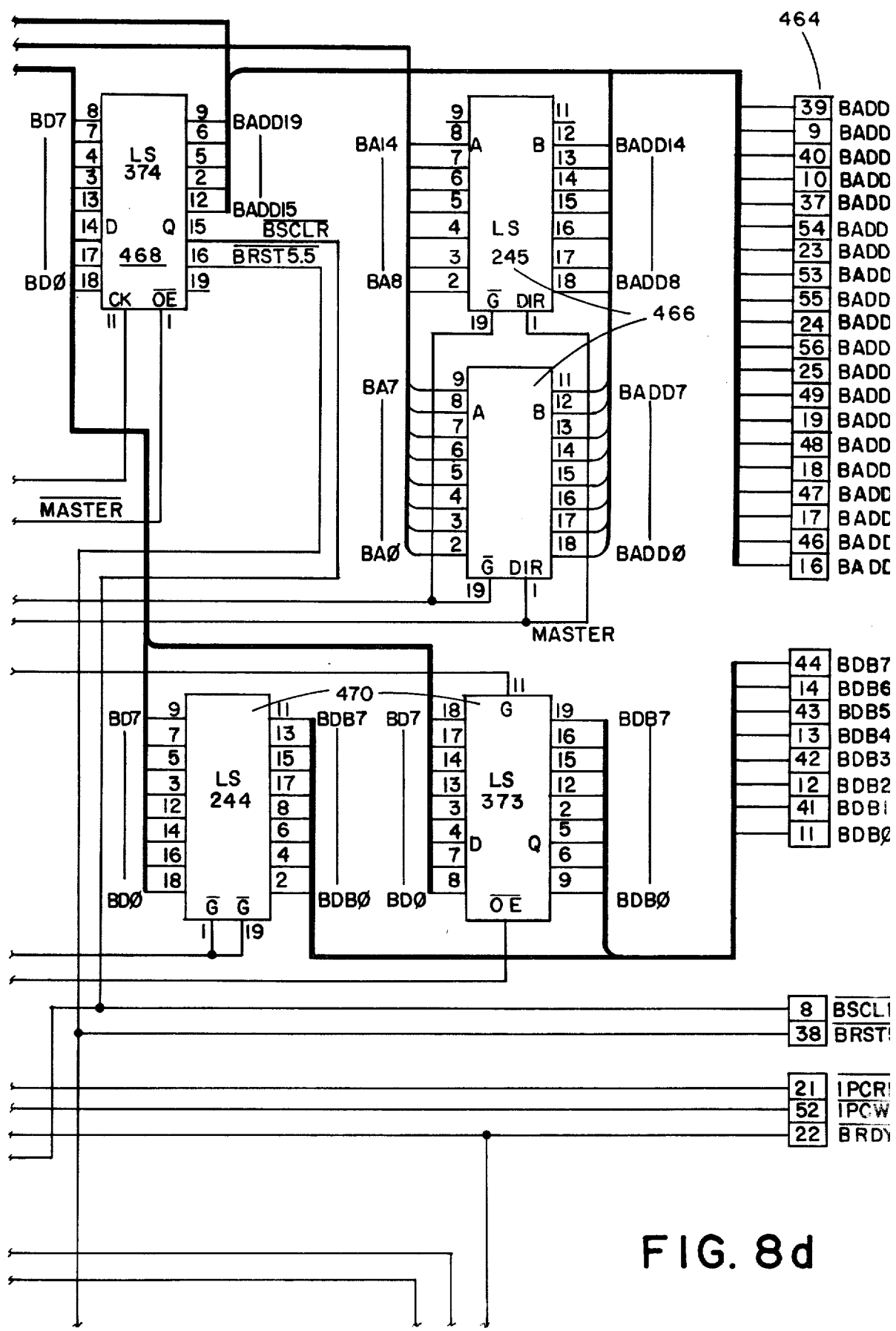
Figure 8E:
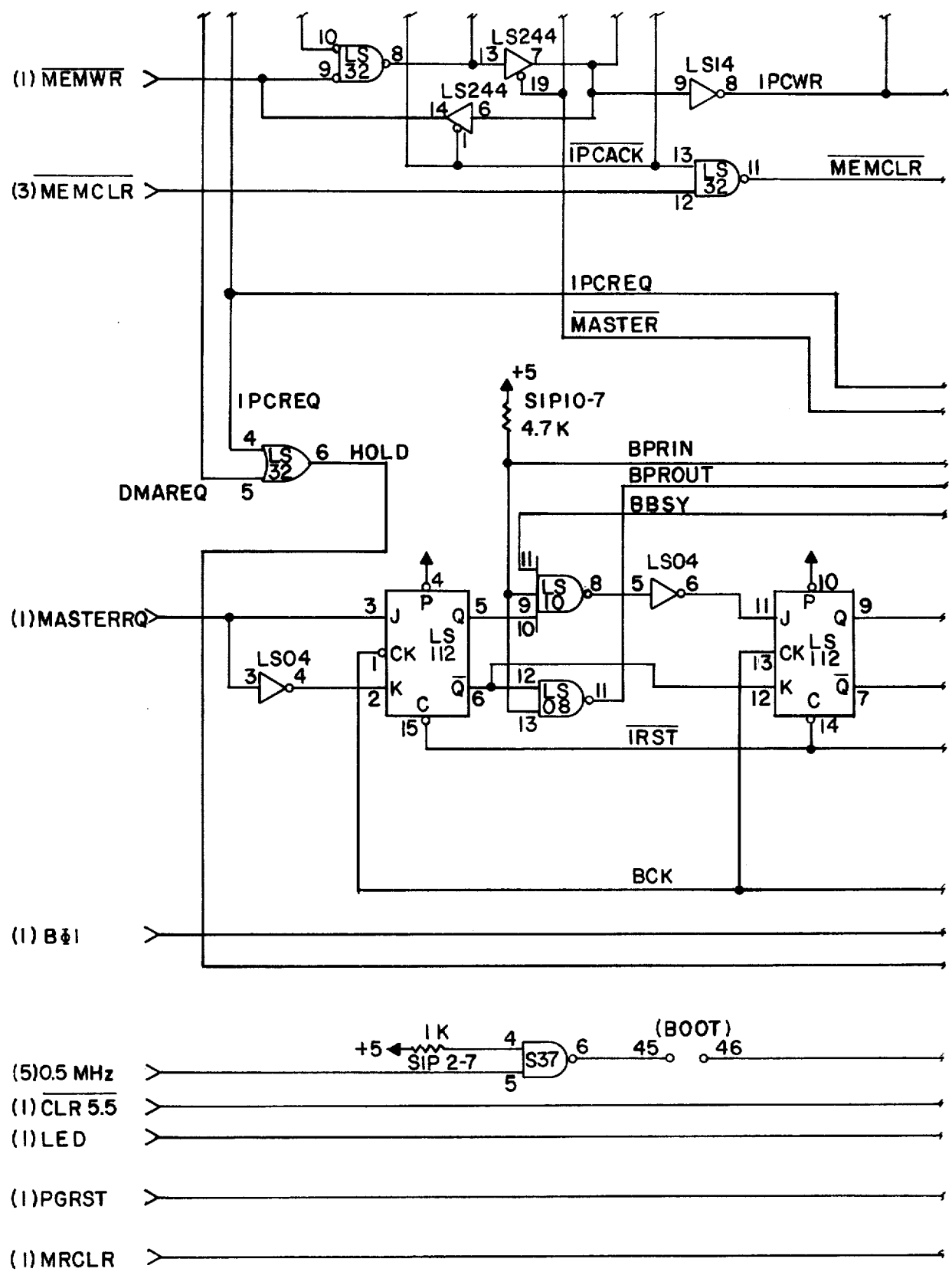
Figure 8F:
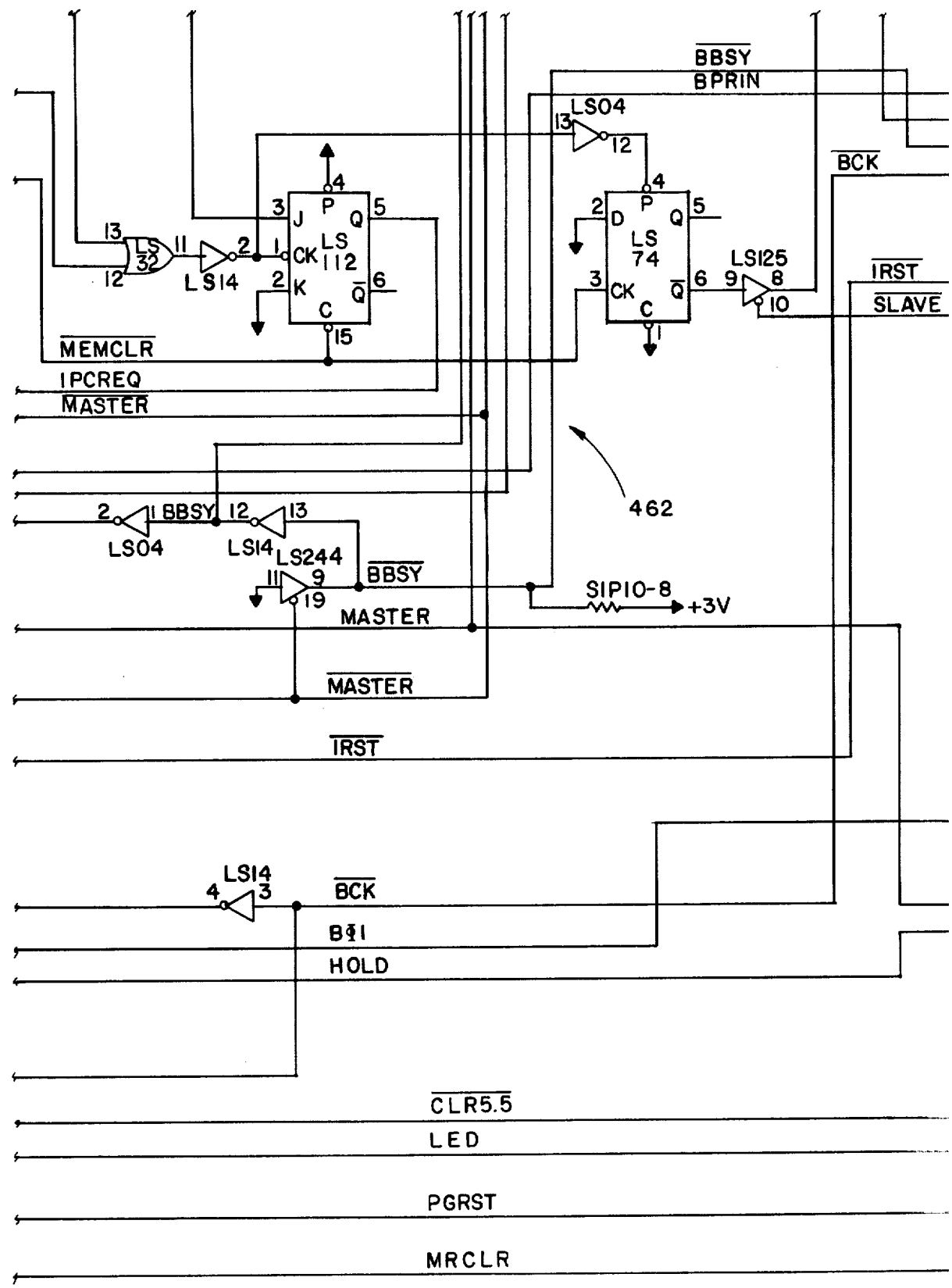
Figure 8A:
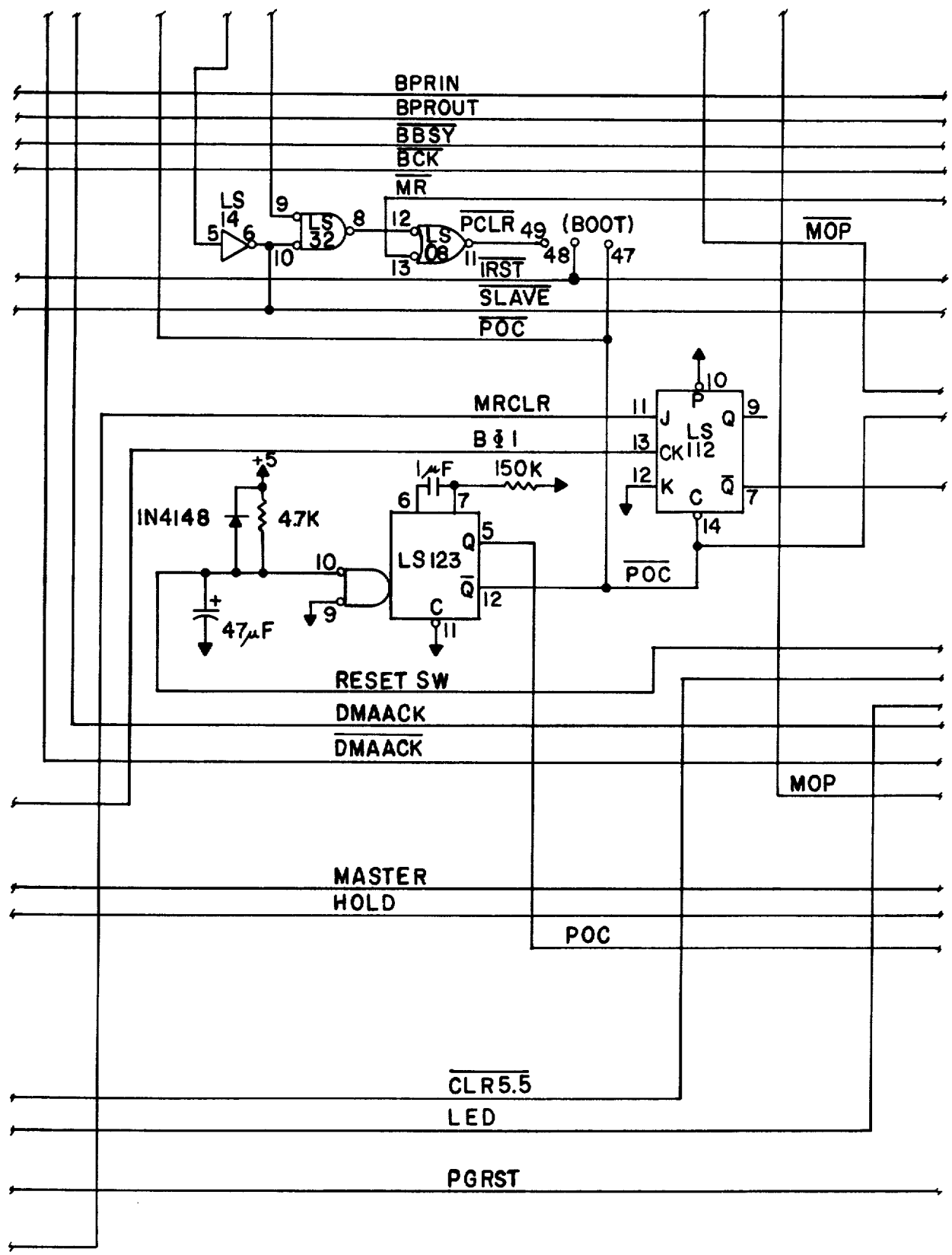
Figure 8H:
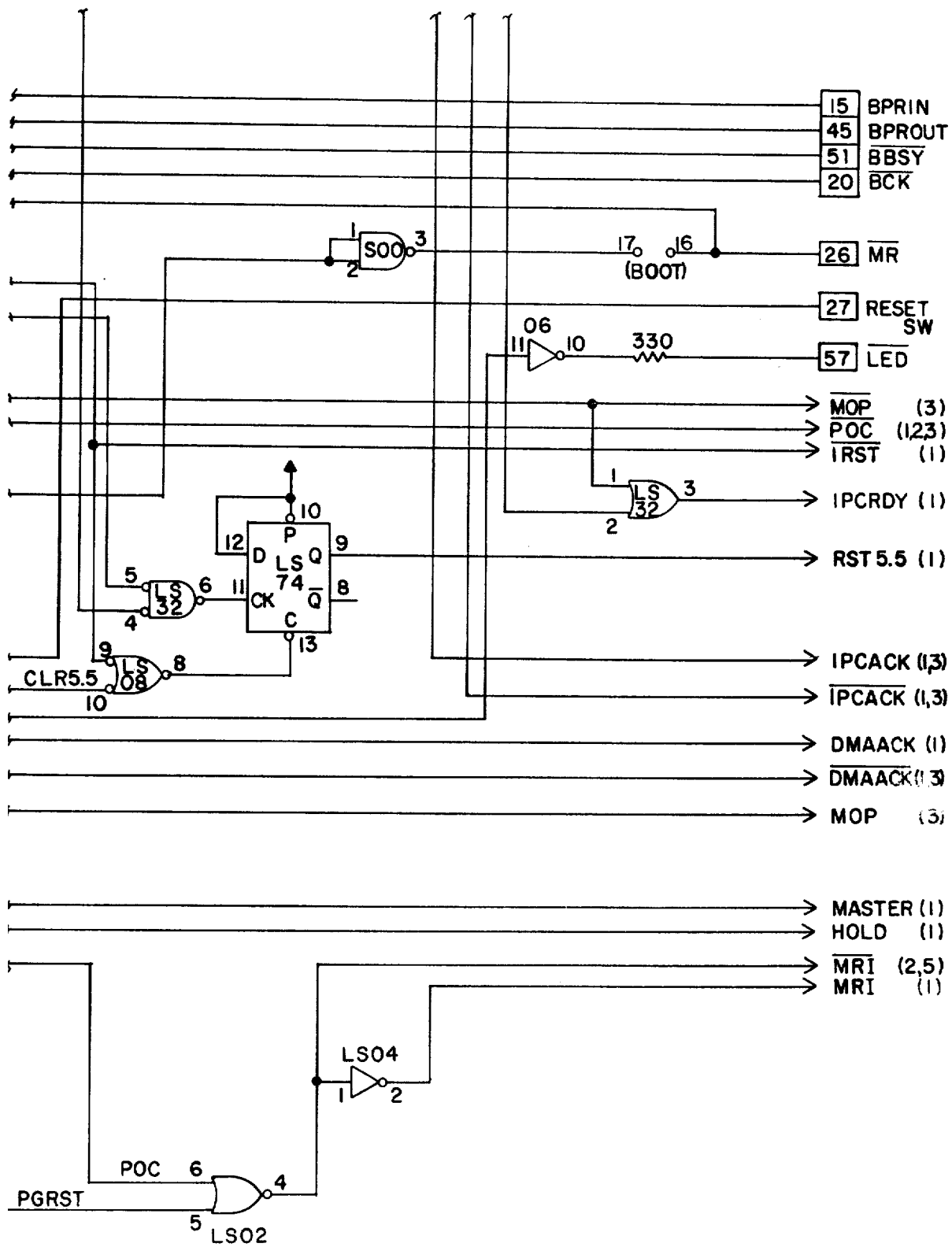
Figure 9A:
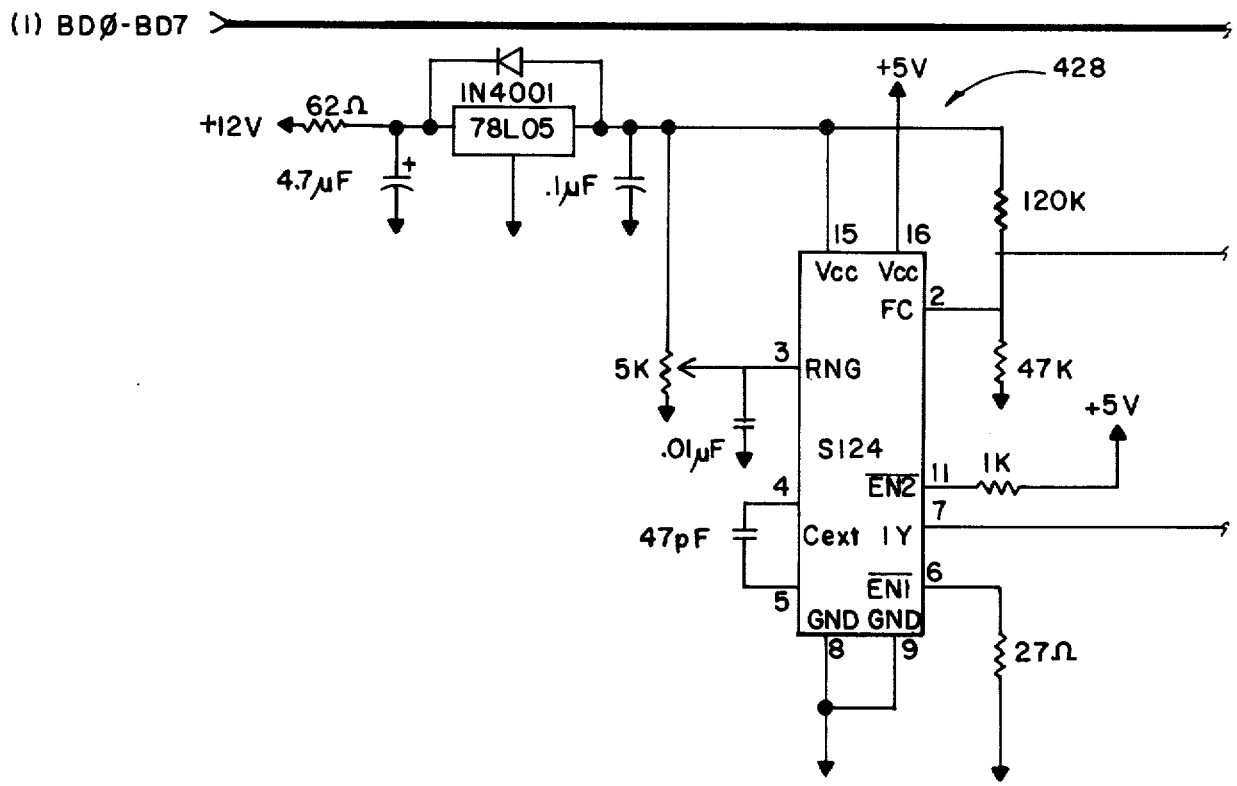
Figure 9B:
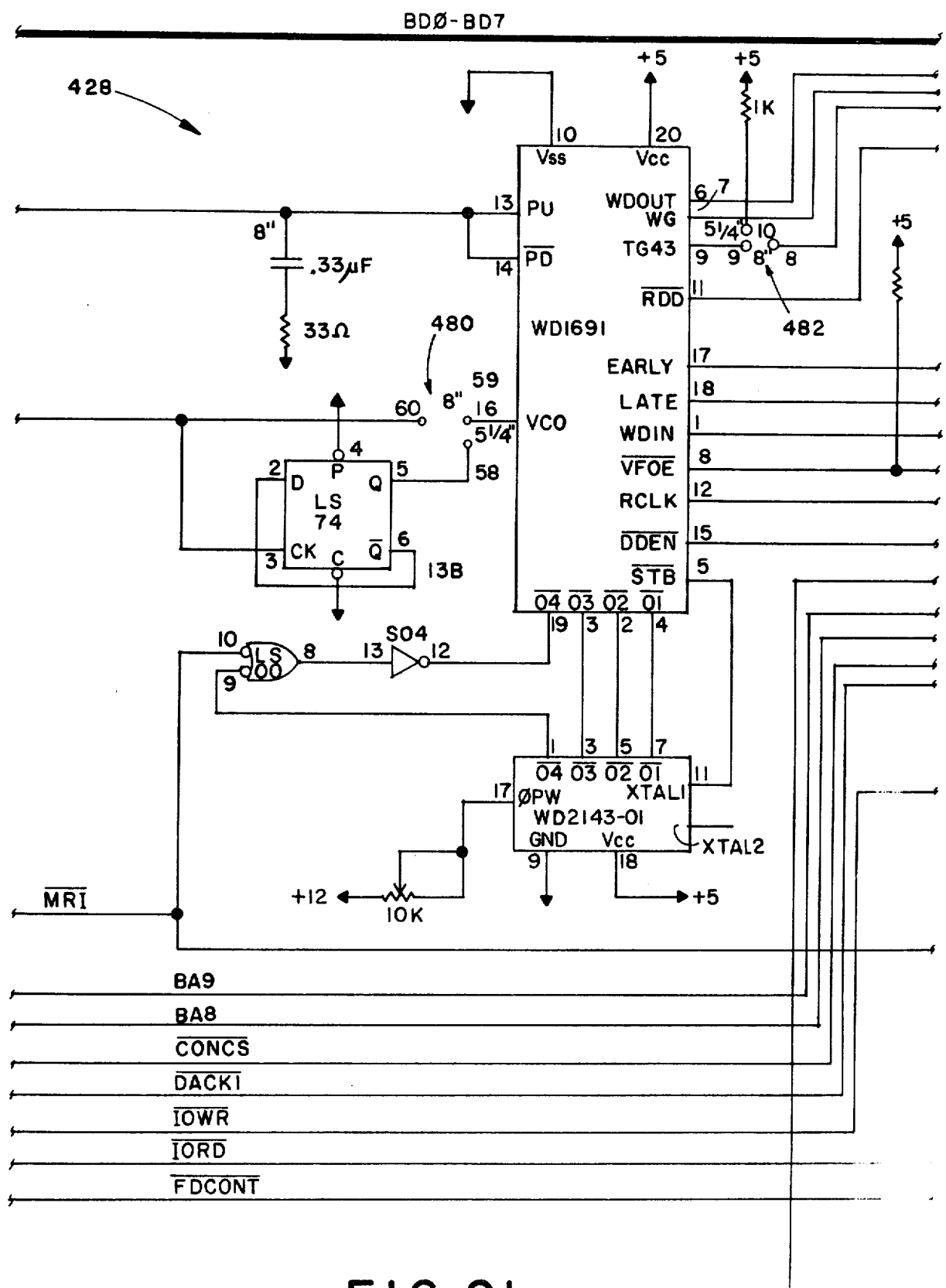
Figure 9C:
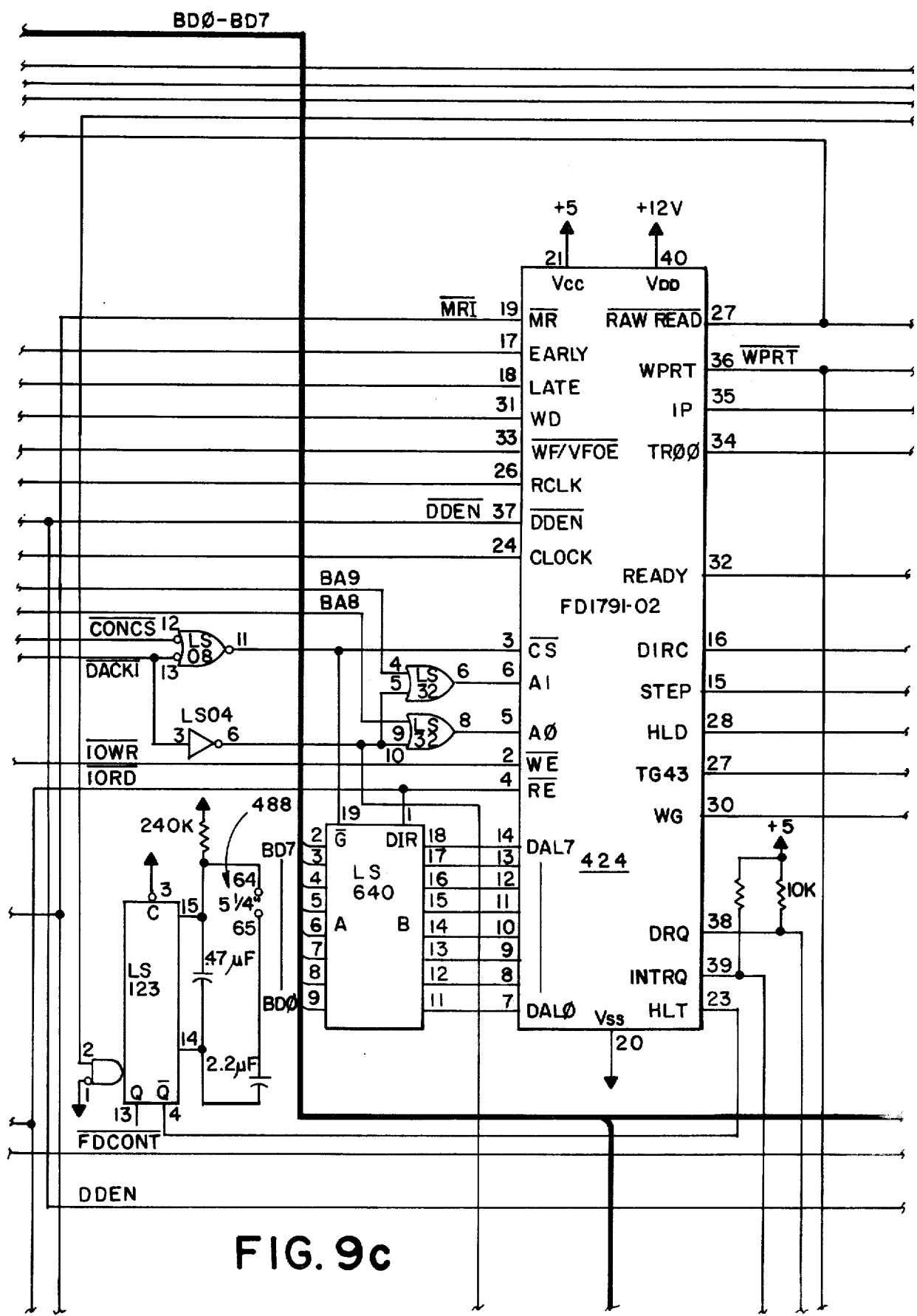
Figure 9D:
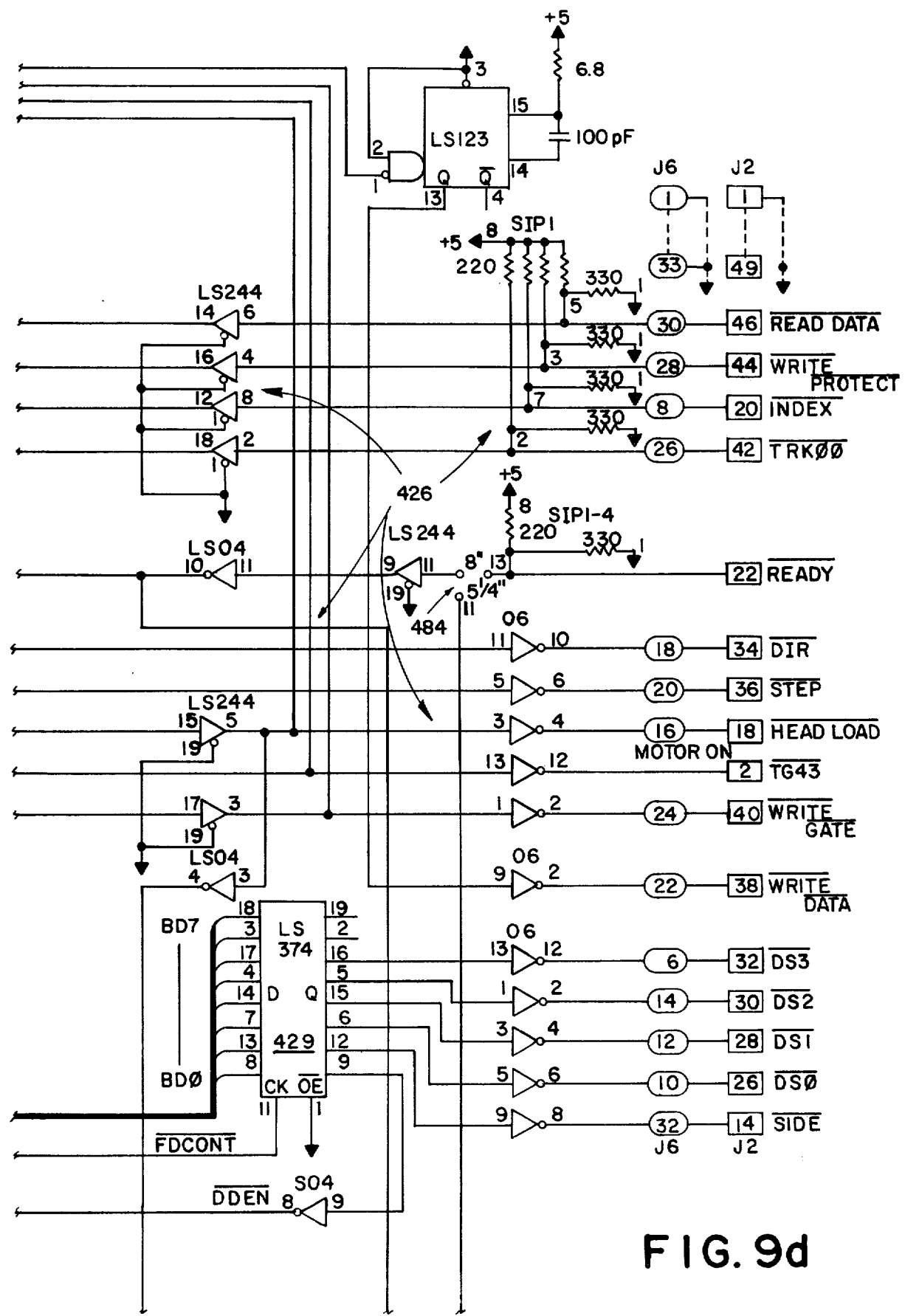
Figure 9E:
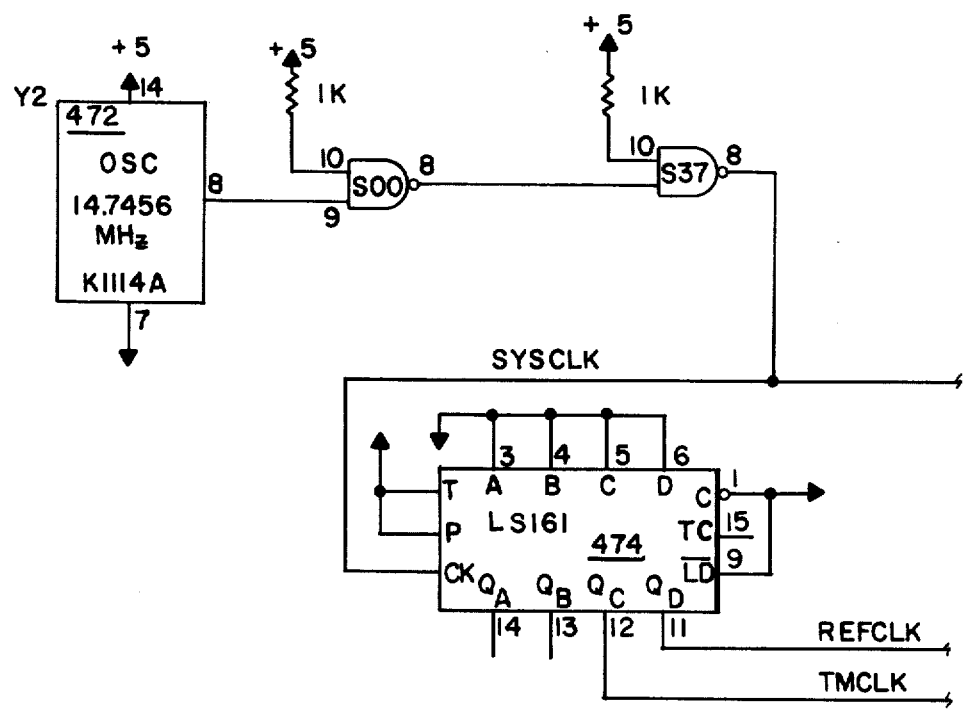
Figure 9E:
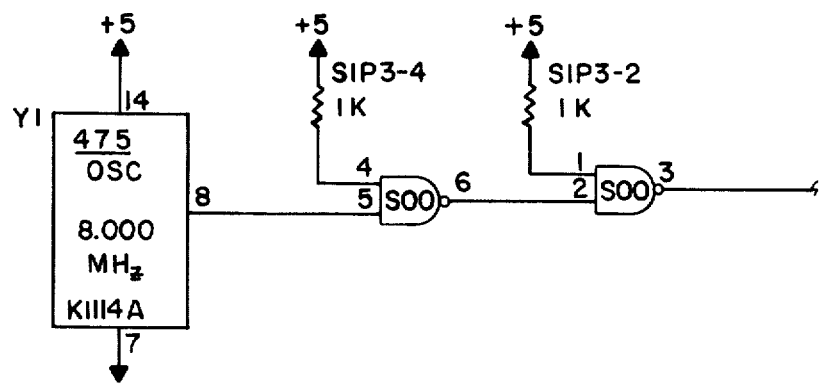
Figure 9F:
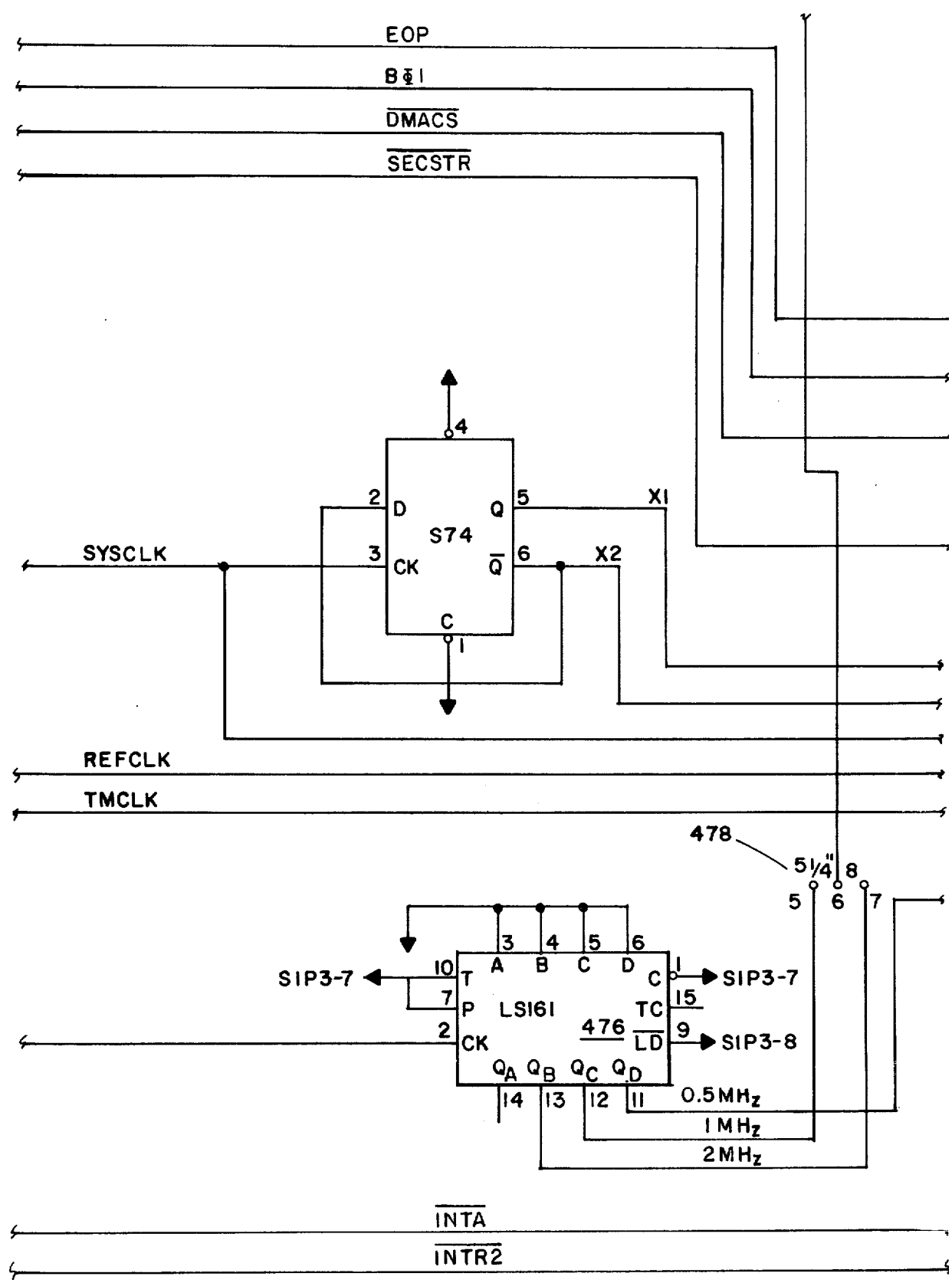
Figure 9G:
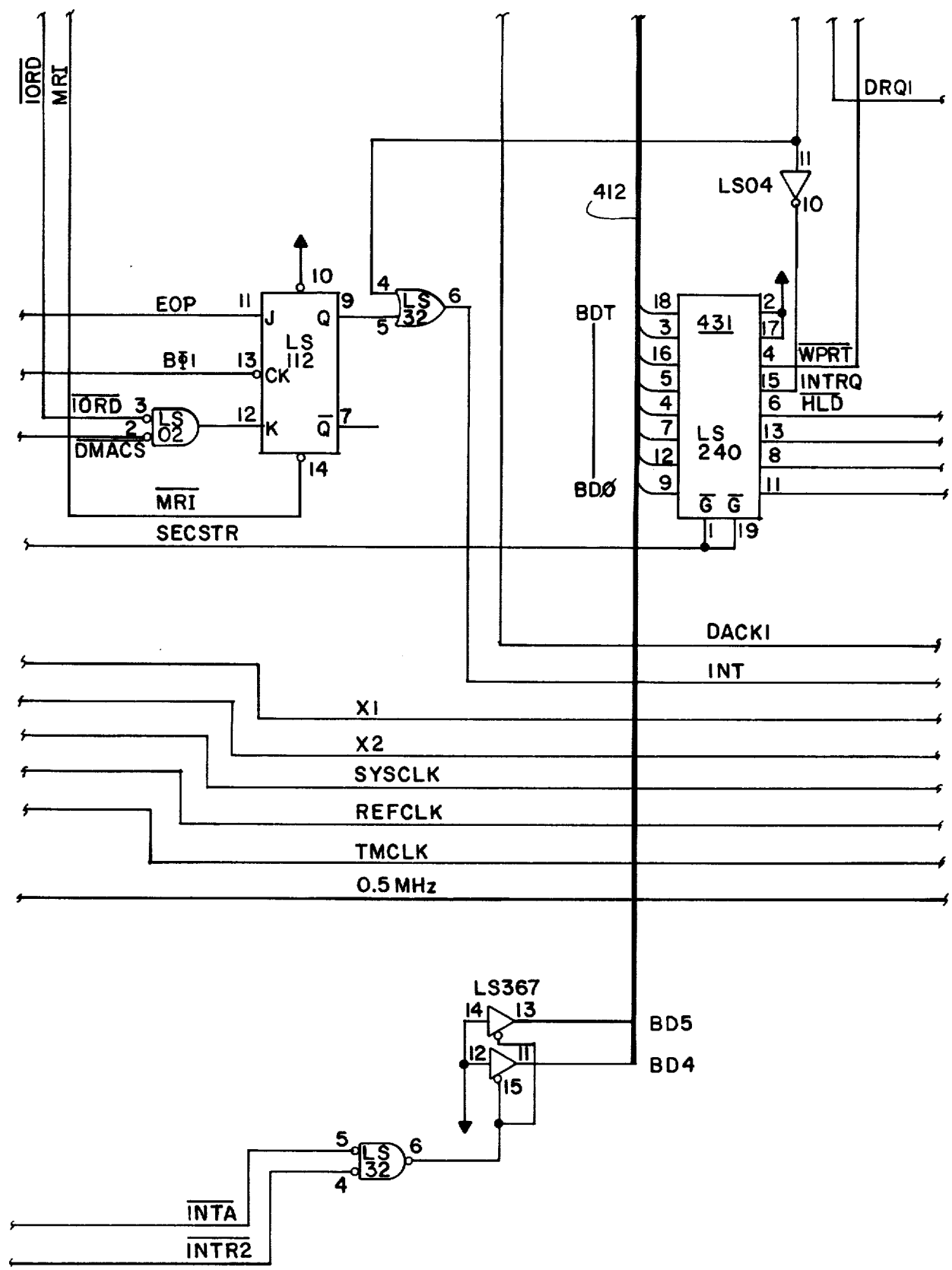
Figure 9H:
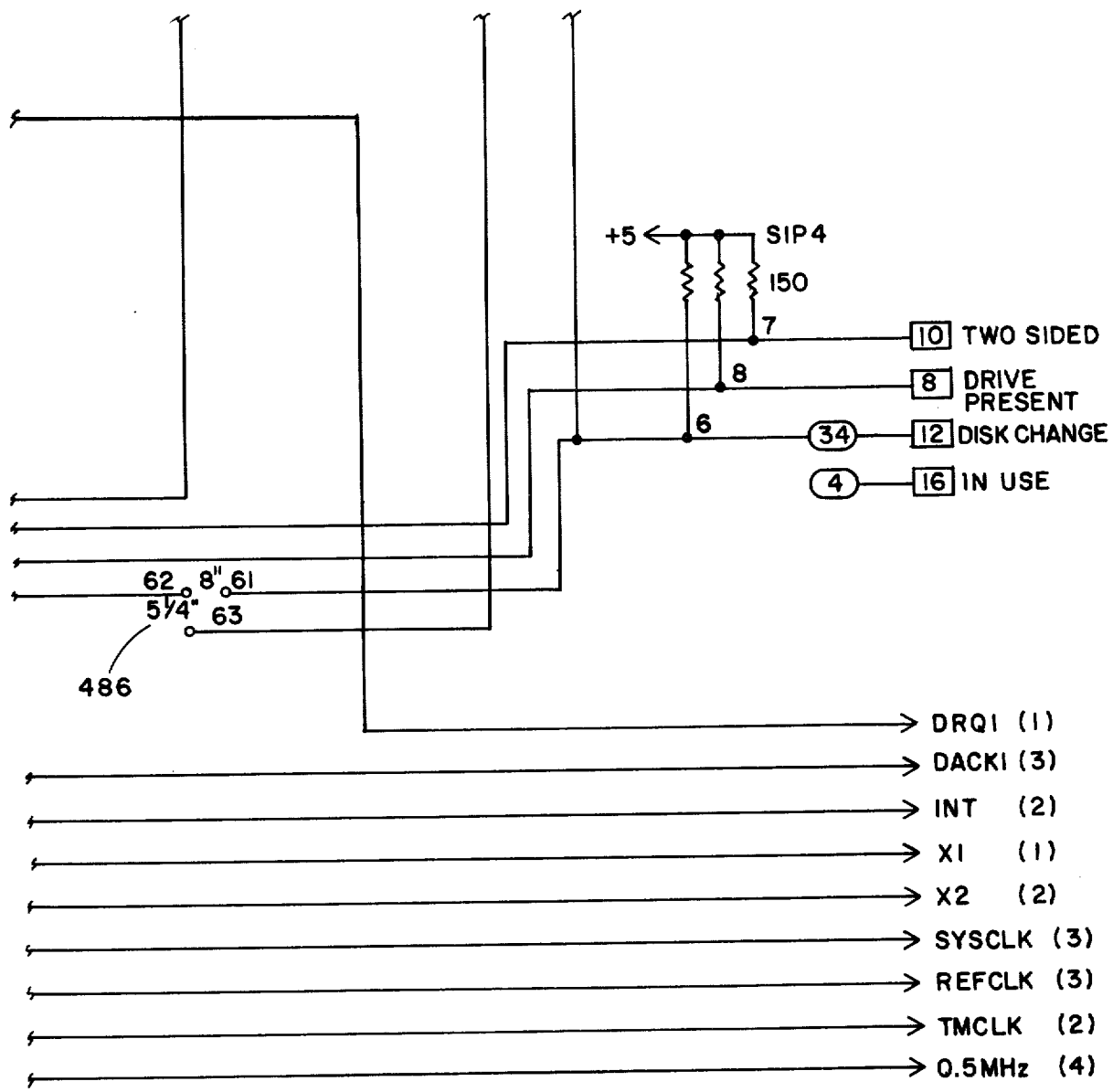
Figure 10A:
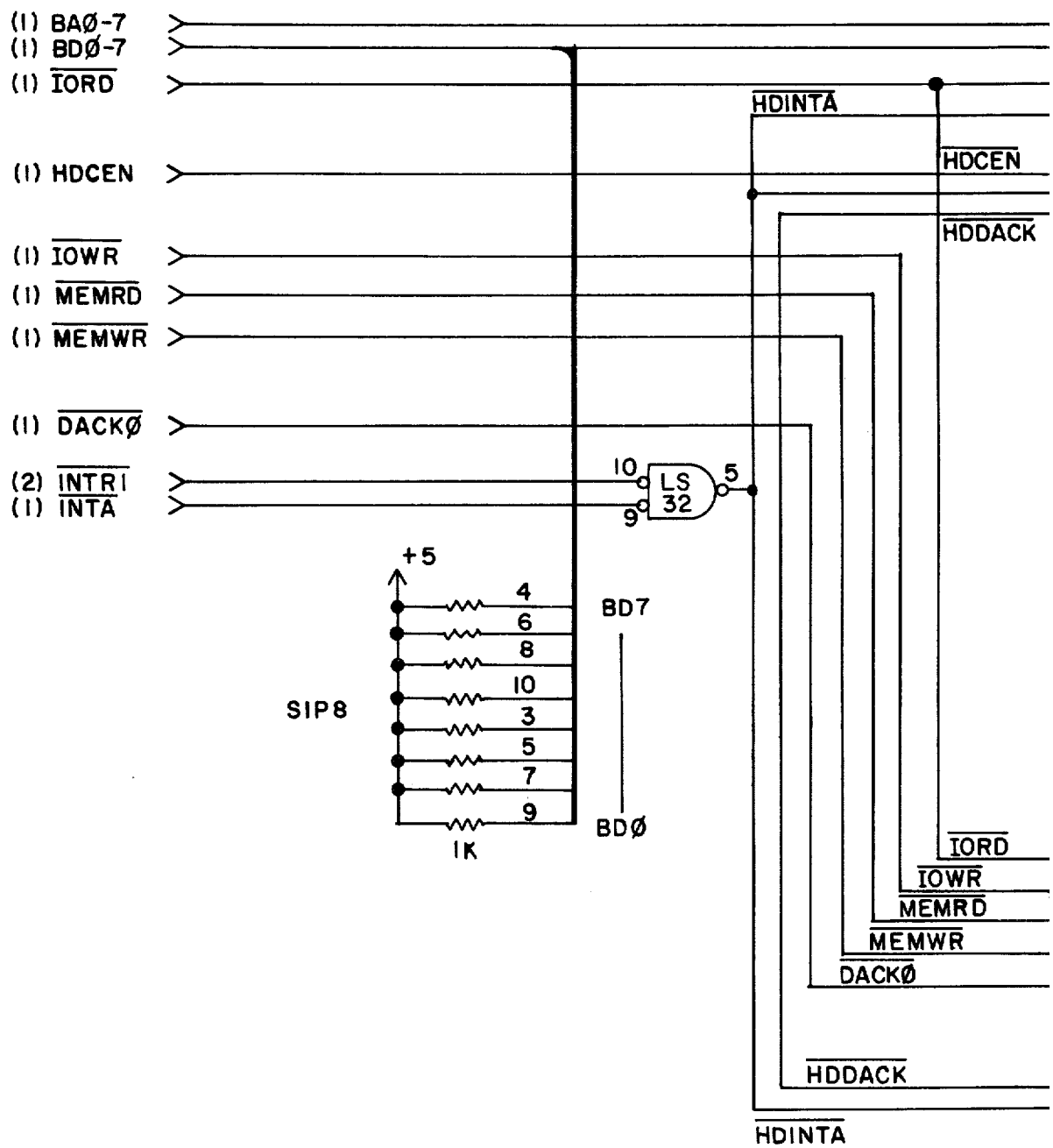
Figure 10B:
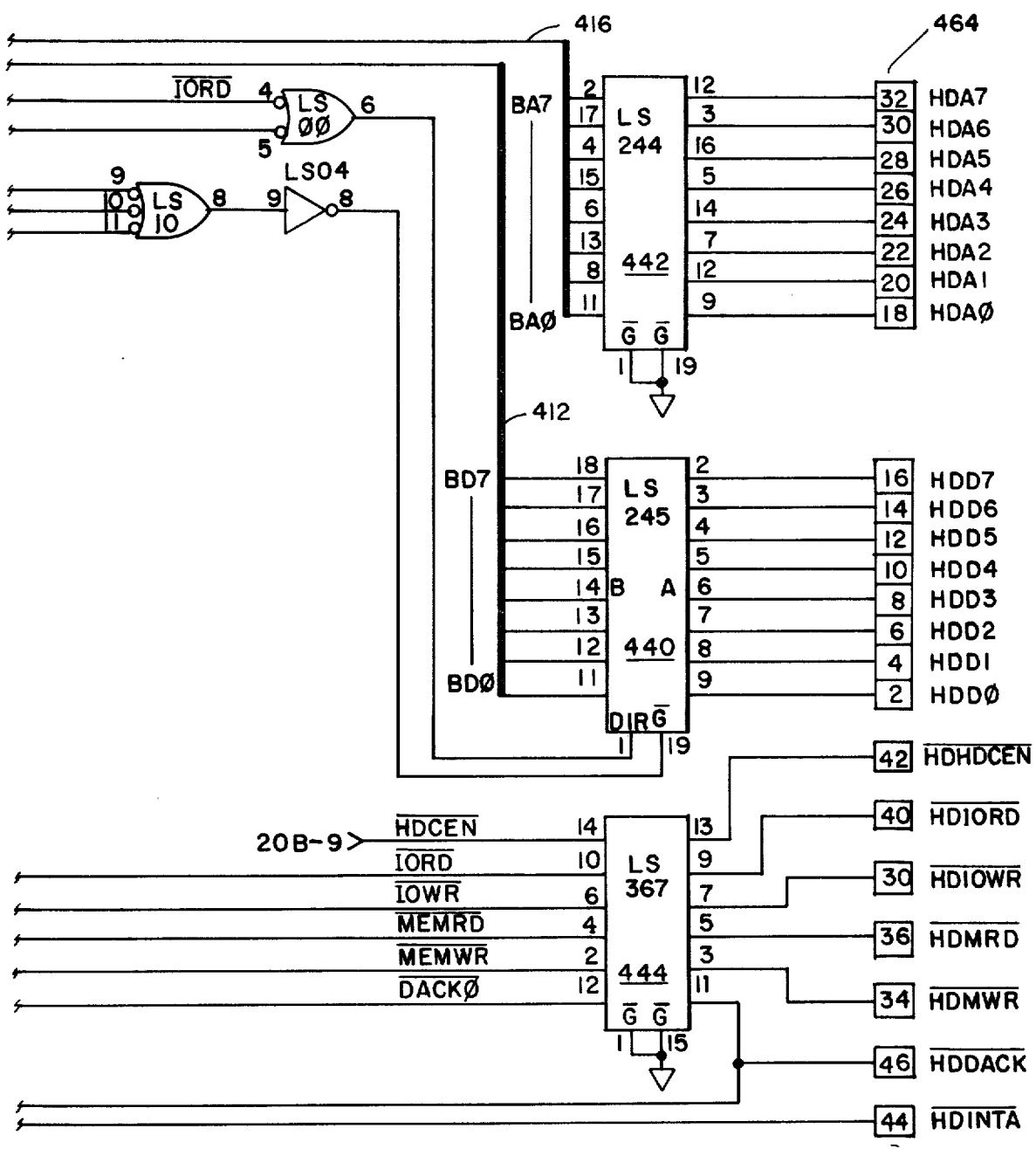
Figure 10C:
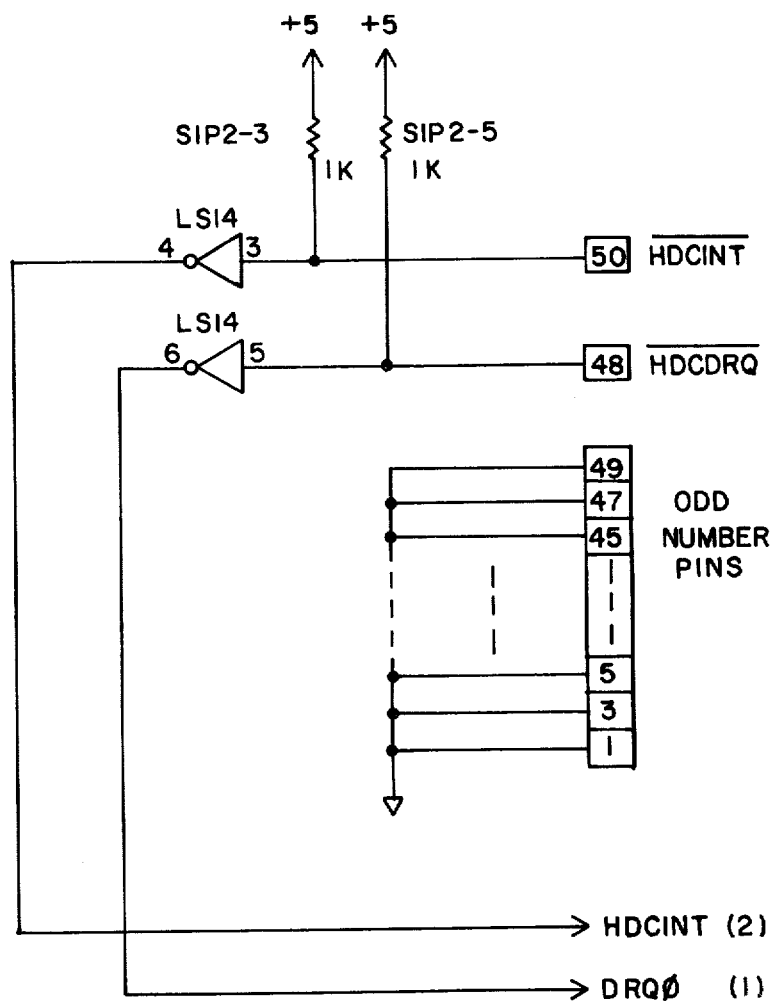

Referring now to FIG. 8 there is shown the interprocessor communications (IPC) controller shown generally as reference numeral 462. It consists of a number of flip flops and gates such as model numbers LS112 and LS74. Two LS245 devices are shown generally as reference numeral 466 and act as a buffer to the IPC bus. This buffer 466 is connected to the J1 IPC bus connector 464. Also connected to the J1 IPC bus connector 464 are a latch 468 from the data bus 412 and two devices, LS244 and LS373, which form a buffer 470 to the J1 IPC bus connector 464. An LS175 latch 463 acts as an arbitrator for hold requests of the microprocessor 410 which can originate either from the DMA controller 432 or from the IPC controller 462.

Figure 9:
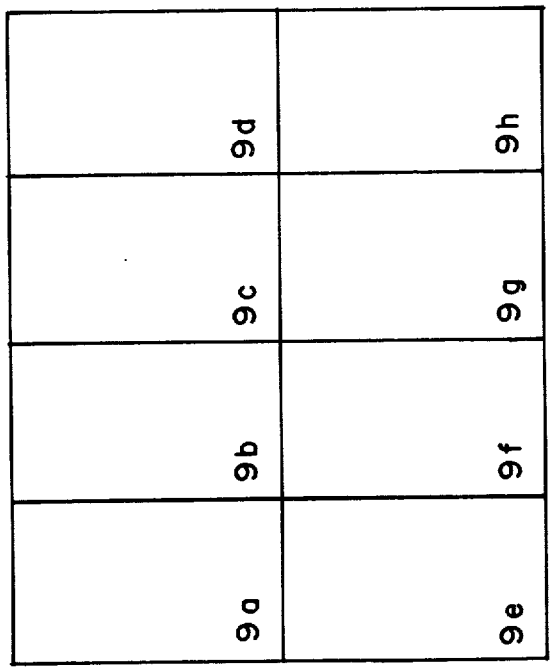
FIG. 9 is an interconnection diagram of FIGS. 9a-9h which when taken together are a schematic representation of the floppy disk controller interface and the system clock.

Referring now to FIG. 9, there is shown a schematic diagram of the floppy disk controller 424 and the system clock 472 and 474. The floppy disk controller 424 is connected to buffers for the controllers and data of the floppy disk drives 426. A Model No. LS374 latch is connected between the data bus 412 and the floppy disk drive select connector 430. Another buffer 431 is connected between the data bus 412 and the disk drive select connector 430.

Data recovery circuitry is shown generally at reference numeral 428. This consists primarily of a WD1691 floppy support logic device manufactured by Western Digital Corp. This data recovery circuitry is connected to the floppy disk controller 424 as well as to the buffer 426. The system clock includes a crystal oscillator 472 operating at a frequency of 14.7456 megahertz. Connected to this oscillator is an LS161 counter 474. A separate crystal oscillator 475 operates at 8.000 MHz and is connected to another LS161 counter 476 for controlling the operating frequency of the floppy disk processor 424.

A jumper type switch 478, such as Model No. 65474-001 manufactured by Berg Co., is used to select one of two operating frequencies depending upon whether the system is configured to drive a 5¼ inch floppy disk or an 8 inch floppy disk. The floppy disk controller 424 requires a 2 MHz clock input for 8 inch floppy disk drives and a 1 MHz clock input for 5¼ inch floppy disk drives. The operating frequency selected by switch 478 is used to drive the floppy disk controller 424 at a bit rate that can accommodate the disk drive to be selected. In addition to actuating the switch 478 to select one or the other sized floppy disks, five other jumper type switches 480, 482, 484, 486 and 488 must be selected.

Jumper switch 480 can specify a VCO frequency of 4 MHz, which is used in a phase lock loop circuit to configure the circuit for 8 inch floppy disk drives. When the switch 480 specifies a VCO frequency of 2 MHz, the circuit can accommodate 5¼ inch floppy disk drives. A window for sampling a pattern in the data stream is generated by this switch 480 to correspond to the data bit rate. A read clock (RCLK) signal is generated as a result of the frequency input by the floppy disk logic device 428 and is applied to the floppy disk controller 424.

Jumper switch 482 can specify that the floppy support logic 428 perform write pre-compensation. For 8 inch floppy disks, write pre-compensation to adjust for shifting of the relative positions of the bits from the disk must be performed on the inner tracks, greater than track number 43. For 5¼ inch floppy disks, however, write pre-compensation must be performed throughout the entire disk (all tracks). The switch 482 can be positioned to accommodate either one of these write pre-compensation conditions.

Jumper switch 484 allows a READY signal from an 8 inch floppy disk drive to be applied to the floppy disk controller 424. For 5¼ inch floppy disk drives, however, no READY signal is provided, but a DISK CHANGE signal is used, when the switch 484 is appropriately set.

Jumper switch 486 is used to allow the DISK CHANGE signal from an 8 inch floppy disk drive to be read through I/O port C0 or to convert the DISK CHANGE signal from a 5¼ inch floppy disk drive. The inversion procedure is required due to the fact that the 5¼ inch floppy disk signal sense is opposite from that of an 8 inch floppy disk signal.

Jumper switch 488 is used to adjust the disk read/write head settle time. When the jumper switch 488 is not installed, the head settle time is set to approximately 50 ms, which is required by 8 inch floppy disk drives. For 5¼ inch floppy disk drives, however, a HEAD LOAD signal is used to actuate the disk drive motor. Accordingly, when the jumper switch 488 is appropriately positioned for 5¼ inch disk drive operation, the head settle time is extended to approximately 200 ms, thus allowing the disk drive motor to come up to speed.

Figure 10:
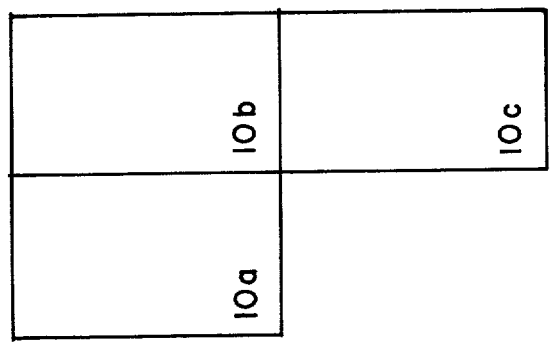
FIG. 10 is an interconnection diagram of FIGS. 10a-10c which when taken together are a schematic representation of the hard disk controller interface in accordance with the invention.

Referring now to FIG. 10, there is shown the hard disk controller interface which consists of three buffers 440, 442 and 444. One buffer 440 is connected between the hard disk controller interface connector 464 and the data bus 412. Another buffer 442 is connected between the hard disk controller interface connector 464 and the lower eight bit address bus 416. Another buffer 444 is connected to the control READ and WRITE lines.

In operation the bus master request is issued by setting this SOD line of the CRT microprocessor 10, as hereinabove described. The microprocessor 10 poles its SID line to determine whether it has been granted the bus request. The microprocessor 10 may generate signals through the bus control register 108 to address the slave processor, in this case the floppy disk processor.

The master processor determines the four-bit extended address of the desired slave processor number and applies it to its bus controller using an output F0 (bus control register 108) prior to a BUS MASTER request. The IPC controllers wait for BUS BUSY to be false. The controller having BUS PRIORITY and an active BUS REQUEST becomes BUS MASTER and sets BUS BUSY. Simultaneously requesting processors therefore become master processors in the order of bus priority. The processor must poll its SID line for internal bus master status to determine if it has become bus master. The processor may reset a pending bus request or relinquish its position as bus master simply by resetting its SOD line.

Once it is master, the slave processor number is presented on the IPC bus as ADD 16-19, and monitored by all processors. The processor having the corresponding four-bit address in its hardware address plug becomes the slave processor. The master processor may read or write a block of 32K of memory from the slave processor by addressing memory between 32K and 64K. This corresponds to the upper or lower 32K on the slave processor as determined by a fifth bit of the extended address sent to the IPC with the output F0. The bus controller on the master processor automatically generates a read/write command to the slave processor on a byte-by-byte basis when these addresses are accessed. The execution of the memory operation is transparent to the slave processor; it can continue its own processing undisturbed. In addition to reading or writing the slave processor memory, the master processor can generate a reset signal or a RST 5.5 interrupt signal to the slave processor also using output F0.

The master processor begins a communication with the slave processor by reading status in the slave memory to determine if the slave buffers are ready. If the slave processor is ready, the processor requesting a transfer writes a function request to a fixed buffer in the slave processor and sets a bit in the slave's status byte. Typically, the master processor causes a RST 5.5 to the slave processor to begin processing of the request, although polling could be done by the slave processor. The slave processor must then transfer the request to its queue. It executes requests from its queue in order of priority determined by the slave software.

When a request for a transfer is executed, the processor which had been slave makes the required buffer available in its memory and becomes master of the bus, making the requesting processor slave. The master processor first reads a function block specifying the requested operation. When the actual data transfer is ready, it makes the read or write transfer directly to/form the requesting processor's memory as specified in the function block, and interrupts the original requesting processor (now the slave) with an RST 5.5 signal to notify the requesting processor that the function has been completed. The master processor then releases the bus and a new transfer may begin.

Either the upper 32K bytes of memory or the lower 32K bytes of memory of the slave processor are mapped into the upper 32K byte portion of the master processor memory 12. The part of the slave processor memory accessed is determined by the control bus 18 and the bus control register 108 associated therewith.

To access a block of data in the slave processor memory, the DMA controller 432 is initialized. The DMA controller is informed that it will be transferring on a byte-by-byte basis. One channel of the DMA controller 432 is designated as the source register to transfer data from the slave memory to the temporary memory data holding register 434. A second channel in the DMA controller 432 is used to transfer data from the temporary memory data holding register 434 to the master memory.

This is the procedure for transferring data from the floppy disk (slave) processor memory to the CRT (master) processor memory. However in reversing the direction of memory transfer, the DMA internal register functions are not changed, but the source and destination memories are.

The address byte counter is loaded for both channels of the DMA controller 432. In one channel, the address byte counter represents the location of the source of memory; in the second channel, the byte counter represents the location of the destination memory. In this operation, both byte counter values are initially equal because the number of bytes of data being transferred from the source to the temporary memory data holding register is equal to the number of bytes being transferred from the temporary memory data holding register to the destination memory.

In this system, an automatic DMA request signal is constantly applied to the DMA controller. However, a register is used to mask the request signal. After DMA controller initialization, the mask is removed so that the automatic DMA request signal can be recognized by the DMA controller and operation thereof begins. When the byte counter of both channels in the DMA controller is reduced to zero, the DMA controller then masks itself so operation terminates.

In the case of a transfer initiated by the floppy disk processor, an interrupt is automatically generated upon completion of the DMA operation. The interrupt signal interrupts the floppy disk processor so that software control resumes for the DMA controller. The floppy disk processor interrupt signal is used to instruct the processor that the transfer is concluded and that the data can now be used for whatever purpose was originally intended.

Arbitration logic is required to allow data onto the IPC bus only when appropriate channels are activated and the microprocessor is a master, or conversely when the corresponding channels are activated for the processor to be a slave.

This memory to memory transfer operation can be performed in an identical manner for memory transfers that occur at the request of the floppy disk processor of the CRT memory. The memory transfers can also occur in this system within one memory, but not necessarily across the IPC bus. The procedure is identical, but no memory mapping occurs in this situation.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

What is claimed is:

1. Apparatus for transferring data comprising:
   (a) first processing means for handling data;
   (b) first data storage means operatively connected to said first processing means for storing data;
   (c) second processing means;
   (d) second data storage means operatively connected to said second processing means for storing data; and
   (e) data transfer means operatively connected to said first processing means, to said first data storage means and to said second data storage means for transferring data from said first data storage means to said second data storage means directly and without intervention of said porocessing means.

2. The apparatus in accordance with claim 1 wherein said data transfer means comprises a direct memory access controller.

3. The apparatus in accordance with claim 2 wherein said data transfer means further comprises an interprocessor communications bus operatively connected to said direct memory access controller.

4. The apparatus in accordance with claim 3 wherein said data transfer means further comprises an interprocessor communications controller operatively connected to said interprocessor communications bus for directing the transfer of data thereover.

5. The apparatus in accordance with claim 1 wherein said first processing means is a display processor and said second processing means is a mass memory data storage processor.

6. The apparatus in accordance with claim 5 wherein said display processor is a CRT processor.

7. The apparatus in accordance with claim 5 or 6 wherein said mass memory data storage processor is a disk processor.

8. The apparatus in accordance with claim 1 wherein said data storage means are random access memory devices.

9. The apparatus in accordance with claim 1 or 8 wherein said processing means are microprocessors.

10. Apparatus for transferring data from a first processor unit to a second processor unit, each of said processor units having a respective data storage means, comprising a direct memory access controller for transferring data from the first processor unit data storage means directly to the second processor unit data storage means.

* * * * *